United States Patent
Madrazo et al.

(10) Patent No.: US 9,081,374 B2
(45) Date of Patent: Jul. 14, 2015

(54) CALIBRATING ALGORITHMS FOR DETERMINING ELECTRICAL LOAD AND LIFESTYLE CHARACTERISTICS

(75) Inventors: Michael A. Madrazo, Escondido, CA (US); Jack E. Mott, Idaho Falls, ID (US); Michelle R. Keim, San Diego, CA (US); Paul D. Mendoza, San Marcos, CA (US)

(73) Assignee: Deteotent Inc., Escondido, CA (US)

( * ) Notice: Subject to any disclaimer, the term of this patent is extended or adjusted under 35 U.S.C. 154(b) by 695 days.

(21) Appl. No.: 13/418,308

(22) Filed: Mar. 12, 2012

(65) Prior Publication Data

US 2013/0073273 A1 Mar. 21, 2013

Related U.S. Application Data

(60) Provisional application No. 61/451,501, filed on Mar. 10, 2011, provisional application No. 61/609,872, filed on Mar. 12, 2012.

(51) Int. Cl.
*G06F 17/10* (2006.01)
*G05B 17/02* (2006.01)

(52) U.S. Cl.
CPC ........ *G05B 17/02* (2013.01); *G05B 2219/2642* (2013.01)

(58) Field of Classification Search
CPC .................................................... G06F 1/3231
USPC ............................................................ 703/2
See application file for complete search history.

(56) References Cited

U.S. PATENT DOCUMENTS

| 4,858,141 A | 8/1989 | Hart et al. |
| 5,566,084 A | 10/1996 | Cmar |
| 8,370,283 B2 * | 2/2013 | Pitcher et al. ................... 706/21 |
| 2009/0312969 A1 | 12/2009 | Sundaresh et al. |
| 2013/0110621 A1* | 5/2013 | Gupta et al. ............... 705/14.52 |

OTHER PUBLICATIONS

Hart, Nonintrusive Appliance Load Monitoring. Proceedings of the IEEE, vol. 80, No. 12, 1992; pp. 1870-1891.*
Liang et al.: Load Signature Study—Part II: Disaggregation Framework, Simulation, and Applications; IEEE Transactions on Power Delivery, vol. 25, No. 2, Apr. 2010; pp. 561-569.*
Laughman et al.: Power Signature Analysis; IEEE power & energy magazine; 2003; pp. 56-63.*

(Continued)

*Primary Examiner* — Hugh Jones
(74) *Attorney, Agent, or Firm* — Kunzler Law Group

(57) ABSTRACT

An apparatus, system, and method are disclosed for calibrating algorithms for determining electrical load and lifestyle characteristics. A model creation module creates an electrical usage model that includes an electrical device usage model for each electrical load assumed to be at simulated premises (an assumed load set). The simulated premises include characteristics from actual premises within an area serviced by an electric utility. A simulation module simulates a number of simulated electrical usages for a number of assumed load sets at the simulated premises. A load prediction module determines if a particular type of load is present within each simulated premises using a load prediction algorithm that includes algorithm parameters. An accuracy module determines an accuracy of the load prediction algorithm and an adjustment module adjusts the algorithm parameters of the load prediction algorithm in response to the determined accuracy.

26 Claims, 27 Drawing Sheets

(56) References Cited

OTHER PUBLICATIONS

Liang et al.; Load Signature Study—Part I: Basic Concept, Structure, and Methodology; IEEE Transactions on Power Delivery, vol. 25, No. 2, Apr. 2010; pp. 551-560.*

Ruzzelli et al.: Real-Time Recognition and Profiling of Appliances through a Single Electricity Sensor; IEEE Secon 2010; 2010; 9 pages.*

Cheng et al. "Electric-Load Intelligence (E-LI): Concept and Applications," TENCON 2006. 2006 IEEE Region 10 Conference, vol., No., pp. 1-4, Nov. 14-17, 2006.*

Lisovich et al.: Inferring Personal Information from Demand-Response Systems, Security & Privacy, IEEE , vol. 8, No. 1, 2010; pp. 11-20.*

Molina-Markham et al.: Private Memoirs of a Smart Meter; BuildSys '10 Proceedings of the 2nd ACM Workshop on Embedded Sensing Systems for Energy-Efficiency in Building; 2010; pp. 61-66.*

W. K. Lee, G. S. K. Fung, H. Y. Lam, F. H. Y. Chan and Mark Lucente, Exploration on Load Signatures, Reference No. 725, International Conference on Electrical Engineering (ICEE), p. Nos. 1-5 (5 pages), Japan, 2004.

L. K .Norford and S. B. Leeb, "Nonintrusive Electrical Load Monitoring", Energy and Buildings, vol. 24, p. Nos. 51-64 (14 pages), 1996.

P.R. Armstrong, C.R. Laughman, S.B. Leeb, and L.K Norford, "Fault detection based on motor start transients and shaft harmonics measured at the RTU electrical service." Proc., 10th Int'l Refrigeration and Air Conditioning Conference. p. Nos. 1-10 (10 pages), Purdue University, Jul. 12-15, 2004.

L. Farinaccio and R. Zmeureanu, "Using a pattern recognition approach to disaggregate the total electricity consumption in a house into the major end-uses" Department of Building, Civil and Environmental Engineering, Centre for Building Studies, Concordia University, Montreal, Quebec, Canada, 1999. p. Nos. 245-259 (15 pages).

U.S. Appl. No. 13/418,304, Office Action Summary, Nov. 20, 2014, 26 pp.

* cited by examiner

CALIBRATING ALGORITHMS FOR DETERMINING ELECTRICAL LOAD AND LIFESTYLE CHARACTERISTICS

CROSS-REFERENCES TO RELATED APPLICATIONS

This application claims the benefit of U.S. Provisional Patent Application No. 61/451,501 entitled "METHOD FOR DERIVING ELECTRICAL UTILITY RESIDENTIAL CUSTOMER INFORMATION FROM DISAGGREGATION OF SHORT-INTERVAL AUTOMATED METER READINGS" and filed on Mar. 10, 2011 for Madrazo et al., and U.S. Provisional Patent Application No. 61/609,872 entitled "CALIBRATING ALGORITHMS FOR DETERMINING ELECTRICAL DEVICE AND LIFESTYLE CHARACTERISTICS" and filed on Mar. 12, 2012 for Michael A. Madrazo, et al., which are incorporated herein by reference. In addition, U.S. patent application Ser. No. 13/418,304 entitled "DETERMINING ELECTRICAL LOAD AND LIFESTYLE CHARACTERISTICS" and filed on Mar. 12, 2012 for Michael A. Madrazo, et al., which is incorporated herein by reference.

FIELD

This subject matter relates to electrical consumption in residential and business premises and more particularly relates to disaggregation of electrical usage profiles.

BACKGROUND

The U.S. Department of Energy has estimated that residential electricity usage in the U.S. amounts to approximately 33% for cooling (air conditioners, refrigerators, and freezers), 25% for heating (space heaters, water heaters, and clothes dryers), 9% for lighting, and 33% for other appliances. This usage distribution is most likely not optimal and one of the significant challenges to an electric utility is planning, evaluating, and offering various energy efficiency and demand response programs to optimize the situation. For example, if most swimming-pool pumps in the utility's service territory run completely or partially during peak electricity usage hours during the day in the summer then a pool pump demand response program is extremely desirable.

SUMMARY

From the foregoing discussion, it should be apparent that a need exists for an apparatus, system, and method for determining one or more of an electrical device and a lifestyle characteristic for a premises. Beneficially, such an apparatus, system, and method would simulate electrical usage at a plurality of simulated premises and use the simulated electrical usage for the simulated premises to disaggregate an actual electrical utility record for a particular premises serviced by the electrical utility.

The present subject matter has been developed in response to the present state of the art, and in particular, in response to the problems and needs in the art that have not yet been fully solved by currently available electrical utility record simulated and disaggregation methods and systems. Accordingly, the present subject matter has been developed to provide an apparatus, system, and method to simulate electrical usage for a plurality of simulated premises and disaggregate a particular electrical utility customer's records. The apparatus, system, and method overcome many or all of the above-discussed shortcomings in the art.

The apparatus to simulate electrical usage for a plurality of simulated premises is provided with a number of modules including a model creation module, a simulation module, a load prediction module, an accuracy module, and an adjustment module.

In certain embodiments, the model creation module creates an electrical usage model. The electrical usage model includes an electrical device usage model for each electrical load assumed to be at simulated premises. The assumed electrical loads make up an assumed load set and the simulated premises include characteristics from actual premises within an area serviced by an electric utility.

The simulation module, in one embodiment, simulates electrical usage at the simulated premises during a specified time period. The electrical usage model includes a set of location-specific parameters for the simulated premises. The simulation module simulates electrical usage for a number of simulated premises and for a number of assumed load sets for each simulated premises.

In one aspect of the present invention, the load prediction module uses a load prediction algorithm to determine if a particular type of electrical load is present within each of a number of the simulated premises. The number of simulated premises derived from at least a subset of the simulated premises used for simulations by the simulation module. Each load prediction algorithm includes one or more algorithm parameters.

In certain embodiments, the accuracy module determines an accuracy of the load prediction algorithm in determining if the particular type of electrical load is present in the subset of simulations. The adjustment module adjusts one or more of the algorithm parameters for the load prediction algorithm used by the load prediction module in response to the determined accuracy.

In one embodiment, the simulated electrical usage model includes electrical usage data for a number of time periods for each day within the specified time period. The location-specific parameters, in certain embodiments, include parameters derived from one or more of physical characteristics from the actual premises within the area served by the electrical utility, environmental variations for the actual premises within the specified time period, assumed electrical usage by one or more assumed users of actual electrical equipment corresponding to the electrical equipment of the assumed load set, and time of day variations in actual electrical usage of the electrical equipment of the assumed load set for days within the specified time period.

In one aspect of the present invention, the electrical device usage model for each electrical load assumed to be at the simulated premises includes a time-based projected electrical usage of an electrical device at the simulated premises. In another aspect of the present invention, the time-based projected electrical usage of the electrical device includes at least one of a time of use of the electrical device and an amplitude of the electrical usage of the electrical device.

In one embodiment, the accuracy module determines the accuracy of the load prediction algorithm by comparing a particular type of electrical load predicted to be at a plurality of simulated premises with load sets used in simulating the electrical usages for those simulated premises and determine a percentage of times that the load prediction module accurately predicted that the particular type of electrical load was present in the plurality of simulated premises. In certain embodiments, the accuracy module determines a percentage of times that the prediction module accurately determined that the particular type of electrical load is present in the subset of simulations.

In certain aspects of the present invention, the adjustment module adjusts one or more of the algorithm parameters for the load prediction algorithm to maximize the percentage of times that the prediction module accurately determines that the particular type of electrical load is present in the subset of simulations. The adjustment module adjusts one or more of the algorithm parameters to optimize the accuracy, as determined by the accuracy module, of the load prediction module in determining if the particular type of electrical load is present in the particular simulated premises. In various aspects of the present invention, the adjustment module may adjust the one or more algorithm parameters in according to a number of methods.

For example, in certain embodiments, the adjustment module may adjust one or more of the algorithm parameters for a particular type of electrical load in the load set while holding the algorithm parameters for other types of electrical loads in the load set constant. In another embodiment, the adjustment module may adjust one or more of the algorithm parameters for a plurality of types of electrical loads in the load set simultaneously. In yet another embodiment, the adjustment module may adjust one or more of the algorithm parameters for a first type of electrical load in the load set and then iterate through adjusting one or more of the algorithm parameters for additional types of electrical loads present in the load set. The adjustment module may then repeat adjusting the one or more of the algorithm parameters for at least one electrical load.

In certain embodiments, the one or more algorithm parameters of the load prediction algorithm include one or more of an amplitude of electrical usage for the particular type of electrical load, a frequency of the electrical usage for the particular type of electrical load, and a time of day of the electrical usage for the particular type of electrical load. In another embodiment, the one or more algorithm parameters of the load prediction algorithm may also include one or more of a duration of electrical usage for the particular type of electrical load, a temperature dependent electrical usage for the particular type of electrical load, and a lifestyle dependent electrical usage pattern for the particular type of electrical load.

In one aspect of the present invention, the particular type of electrical load is a load for an air conditioning unit. In such an embodiment, the load prediction algorithm for the air conditioning unit may include defining criteria for a hot weather day during the specified time period and defining criteria for a neutral weather day during the specified time period. The load prediction algorithm for the air conditioning unit may also include comparing a simulated electrical usage for the simulated premises for at least a portion of the hot weather days with a simulated electrical usage for at least a portion of the neutral weather days. The load prediction algorithm determines that the simulated premises includes the air conditioning unit if the simulated electrical usages for the hot weather days is greater than the simulated electrical usages for the neutral weather days.

In another aspect of the present invention, the particular type of electrical load is a load for an electric heating unit. In such an embodiment, the load prediction algorithm for the electric heating unit defines for a cold weather day during specified hours of a day in the specified time period and defines criteria for a neutral weather day during specified hours of a day in the specified time period. The load prediction algorithm compares a simulated electrical usage for the simulated premises for at least a portion of the cold weather days with a simulated electrical usage for at least a portion of the neutral weather days. If the simulated electrical usages for the at least a portion of the cold weather days is less than the simulated electrical usages for the at least a portion of neutral weather days, the load prediction algorithm determines that the simulated premises includes the electric heating unit.

In another embodiment of the present invention, the load prediction algorithm for the electric heating unit defines for a cold weather day during specified hours of a day in the specified time period. The load prediction algorithm for the electric heating unit calculates a variation in a distribution of simulated electrical usages during the specified hours of the day for a plurality of cold weather days. The load prediction algorithm for the electric heating unit determines that the simulated premises includes the electric heating unit in response to determining that the variation in the distribution of simulated electrical usages during the specified hours of the day for the plurality of cold weather days is greater than a specified threshold.

In certain embodiments, the particular type of electrical load is a load for a timed electrical device and the load prediction algorithm includes identifying a rise in a simulated hourly electrical usage at a simulated premises having an magnitude greater than a specified threshold and identifying a drop in the simulated hourly electrical usage at the simulated premises having a magnitude greater than the specified threshold. If the rise in the simulated hourly electrical usage at the simulated premises having a magnitude greater than the specified threshold occurs at approximately a same starting time in a threshold number of consecutive days during the specified time period, and if the drop in the simulated hourly electrical usage at the premises having a magnitude greater than the specified threshold occurs at approximately a same finishing time in the threshold number of consecutive days during the specified time period, the load prediction algorithm determines that the simulated premises includes the timed electrical device. In one embodiment, the timed electrical device includes either pool pumping equipment or timed lighting. In another embodiment, the time electrical device may be any electrical device that is on a timer.

In one aspect of the present invention, the particular type of electrical load may be an electrical load for an electric water heater. In such an embodiment, the load prediction algorithm may identify a rise in a simulated hourly electrical usage at a simulated premises having a magnitude greater than a specified threshold. The algorithm may also identify a drop in the simulated hourly electrical usage at the simulated premises having a magnitude greater than the specified threshold. The algorithm for determining the electrical load for the electrical water heater determines that the simulated premises includes an electrical water heater if the rise and fall in the simulated electrical usage at the simulated premises has a magnitude greater than the specified threshold and occurs within a specified time period in a specified percentage of a number of days during the specified time period. In one embodiment, the rise and fall of the electrical usage occur during time periods in which water heaters typically operate.

In yet another aspect of the present invention the particular type of electrical load may be an electrical load for an electric clothes dryer. In such an embodiment, the load prediction algorithm may identify a rise in a simulated hourly electrical usage and a fall in the simulated hourly electrical usage at the simulated premises having a magnitude greater than a specified threshold. The algorithm for determining the electrical load for the electric clothes dryer determines that the simulated premises includes an electric clothes dryer if the rise and fall in the simulated electrical usage at the simulated premises has a magnitude greater than the specified threshold and occurs within a specified time period in a specified percentage of a number of days during the specified time period. In one embodiment, the rise and fall of the electrical usage occur during time periods in which clothes dryers typically operate.

In one embodiment, the particular type of electrical load may be a vacation day taken by one or more users of the simulated premises. In such an embodiment, the load prediction algorithm for the vacation day typically includes identifying a number of first pass vacation days as days within specified time period having daily simulated electrical usage ranges at the simulated premises that are in a lowest specified percent of all daily electrical usage ranges for days within the specified time period. The daily simulated electrical use range is a difference between a maximum simulated electrical usage for a day and a minimum simulated electrical usage for the day. The algorithm also typically includes identifying a number of second pass vacation days as first pass vacation days that are consecutive. A number of third pass vacation days are also identified as second pass vacation days that have patterns of hourly simulated electrical usage throughout a day that are substantially similar. The algorithm determines that a particular day is a vacation day if that the particular day is the third pass vacation day.

In certain embodiments, the particular type of electrical load may be a use of the simulated premises as a primary premises. In such an embodiment, the load prediction algorithm for the use of the simulated premises as a primary premises includes identifying one or more vacation days taken by one or more users of the simulated premises and determining whether the one or more vacation days taken by the one or more users of the simulated premises is less than a specified threshold. If so, the load prediction algorithm determines that the simulated premises is a primary premises.

In yet another embodiment, the particular type of electrical load may be a use of the simulated premises as a vacation premises. In such an embodiment, the load prediction algorithm for the use of the simulated premises as a primary premises includes identifying one or more vacation days taken by one or more users of the simulated premises and determining whether the one or more vacation days taken by the one or more users of the simulated premises is greater than a specified threshold. If so, the load prediction algorithm determines that the simulated premises is a vacation premises.

In another aspect of the present invention, the particular type of electrical load includes a use of the simulated premises by one or more school-aged child. In such an embodiment, the load prediction algorithm includes calculating a first average daily electrical usage for a specified range of time during days that include a specified percentage of non-school days and calculating a second average daily electrical usage for a specified range of time that include a specified percentage of school days. If the first average is greater than the second average by a specified amount, the load prediction algorithm determines that the simulated premises is used by one or more school-aged child.

A method of the present subject matter is also presented for determining one or more of an electrical device and a lifestyle characteristic. The method in the disclosed embodiments substantially includes the steps necessary to carry out the functions presented above with respect to the operation of the described apparatus.

Reference throughout this specification to features, advantages, or similar language does not imply that all of the features and advantages that may be realized with the present subject matter should be or are in any single embodiment of the subject matter. Rather, language referring to the features and advantages is understood to mean that a specific feature, advantage, or characteristic described in connection with an embodiment is included in at least one embodiment of the present subject matter. Thus, discussion of the features and advantages, and similar language, throughout this specification may, but do not necessarily, refer to the same embodiment.

Furthermore, the described features, advantages, and characteristics of the subject matter may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments of the subject matter.

These features and advantages of the present subject matter will become more fully apparent from the following description and appended claims, or may be learned by the practice of the subject matter as set forth hereinafter.

BRIEF DESCRIPTION OF THE DRAWINGS

In order that the advantages of the subject matter will be readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the accompanying drawings, in which.

DETAILED DESCRIPTION

Figure 1:
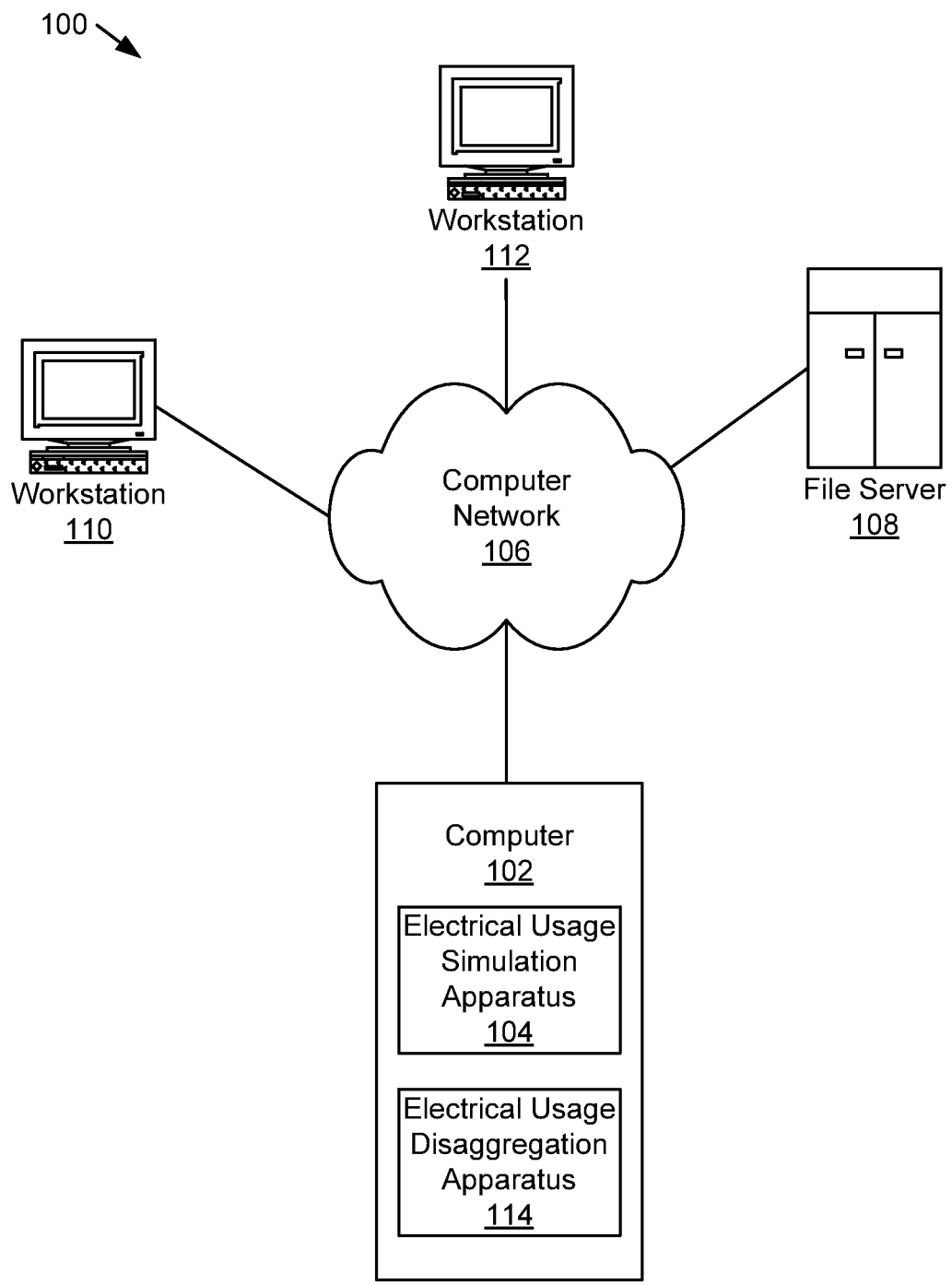
FIG. 1 is a schematic block diagram illustrating a system for determining one or more of an electrical device at a premises and a lifestyle characteristic in accordance with the present invention.

As will be appreciated by one skilled in the art, aspects of the present subject matter may be embodied as a system, method or computer program product. Accordingly, aspects of the present subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present subject matter may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present subject matter. Thus, appearances of the phrases "in one embodiment," "in an embodiment," and similar language throughout this specification may, but do not necessarily, all refer to the same embodiment.

Furthermore, the described features, structures, or characteristics of the subject matter may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the subject matter.

Aspects of the present subject matter are described below with reference to schematic flowchart diagrams and/or schematic block diagrams of methods, apparatuses, systems, and computer program products according to embodiments of the subject matter. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present subject matter. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The U.S. Department of Energy has estimated that residential electricity usage in the U.S. amounts to approximately 33% for cooling (air conditioners, refrigerators, and freezers), 25% for heating (space heaters, water heaters, and clothes dryers), 9% for lighting, and 33% for other appliances. This usage distribution is not optimal and one of the significant challenges to an electric utility is planning, evaluating, and offering various energy efficiency and demand response programs to optimize the situation. For example, if most swimming-pool pumps in the utility's service territory run completely or partially during peak electricity usage hours during the day in the summer then a pool pump demand response program is extremely desirable.

The potential of using residential equipment predictions to offer new bundled solutions to customers has much more appeal to an electrical utility provider than marketing several disparate programs to all customers, for whom many of the programs don't even apply. An example is using specific equipment predictions to target specific programs, like clothes dryers or water heaters, only to customers that have these appliances. The marketing costs for these programs are greatly reduced using this approach thus lowering the overall cost of electricity to the customer. These challenges are being met by the installation of automated metering systems that use radio frequency technologies to transmit a customer's electricity consumption to a central location, typically every 15 minutes. The widespread use of such systems now opens the way to derive customer intelligence from their data.

Accordingly, the present subject matter seeks to derive customer information important for some of a utility's strategic decisions and tactical operations by employing their automated meter readings augmented with additional inputs as necessary. Customer information includes identification of electrical equipment that may be present at a customer's residential premises and typical daily electricity usage profiles for such equipment.

Utilities are also interested in using short-interval meter data to validate the response of the distribution system during a demand response call. The apparatus, system, and method of the present subject matter could be used to validate the response of calls at the individual residence level and even identify demand response equipment that is not operating properly.

The present subject matter employs electric utility short-interval, typically 15 minutes to 1 hour, automated meter readings augmented with additional inputs as necessary to derive customer information important for the utility's strategic decisions and tactical operations. The present subject matter may be used for identification of electrical equipment that may be present at a customer's premises and the daily electricity usage profiles for such equipment. Electrical equipment identified by the apparatus, system, and method of the present subject matter may include air conditioning units, electric heating units, timed electrical devices (i.e., swimming-pool pumping equipment, timed lighting, etc.), electric water heaters, electric clothes dryers, etc.

The apparatus, system, and method may also be used to identify lifestyle characteristics of the owners or users of the premises. Lifestyle characteristics include whether a residence is a primary one or is used mostly for vacations, whether there are schoolchildren present, whether there are people at home during weekday daytime hours, when vacation days are taken by users of the premises, etc.

Residential energy use is usually relatively low and is driven high by large loads that come on periodically. Which of these large loads exists in which home is not known prior to performing disaggregation. The apparatus, system, and method of the present subject matter develops simulations of electrical usage at simulated premises during a specified time period. The simulations can be used to derive load prediction algorithms that can be used to predict electrical device present at a premises and lifestyle characteristics of users of the premises.

FIG. 1 illustrates a schematic block diagram of a system 100 for determining one or more of an electrical device at a premises and a lifestyle characteristic in accordance with the present invention. The system 100 includes a computer 102 that includes an electrical usage electrical usage simulation apparatus 104 and an electrical usage disaggregation apparatus 114. In certain embodiments the system 100 also includes a computer network 106, a file server 108, and a number of work stations such as work stations 110 and 112.

While the embodiment illustrated in FIG. 1 shows the simulation apparatus 104 and the electrical usage disaggregation apparatus 114 as being stored on a computer 102, one skilled in the art will recognize that the electrical usage simulation apparatus 104 and the electrical usage disaggregation apparatus 114 may be contained within a file server 108, a mainframe, a personal computer, a laptop, a personal digital assistant, or other computing device. The computer 102 and the file server 108 are connected to the computer network 106 providing remote access to the electrical usage simulation apparatus 104 and the electrical usage disaggregation apparatus 114 via a computer network 106.

The electrical usage simulation apparatus 104 and the electrical usage disaggregation apparatus 114 may be accessed directly through input/output devices connected to the computer 102 or through the computer network 106 in a client-server relationship, remote access, or other network-related operation. One of skill in the art will recognize other ways to access the electrical the electrical usage simulation apparatus 104 and the electrical usage disaggregation apparatus 114.

In one embodiment, the electrical usage simulation apparatus 104 and the electrical usage disaggregation apparatus 114 are stored on a data storage device in or connected to a computer 102. In another embodiment, the electrical usage simulation apparatus 104 and the electrical usage disaggregation apparatus 114 may be distributed in different locations throughout the system 100. In certain embodiments the electrical usage simulation apparatus 104 may be stored on one device within the system 100 and the identification apparatus may be stored on another device within the system 100. One of skill in the art will recognize other ways to store and execute portions of the electrical usage simulation apparatus 104 and the electrical usage disaggregation apparatus 114.

In certain embodiments, the electrical usage simulation apparatus 104 and the electrical usage disaggregation apparatus 114 may operate independently. For example, in one embodiment, as further discussed below, the simulation module 104 may develop a plurality of simulations for use by other devices, methods, or apparatus for a variety of purposes where such simulations may be beneficial.

Similarly, as further discussed below, in some embodiments, the electrical usage disaggregation apparatus 114 may use simulations developed by an apparatus other than the electrical usage simulation apparatus 104 to identify one or more of an electrical device at a premises and a lifestyle characteristic of a user of the premises.

Figure 2:
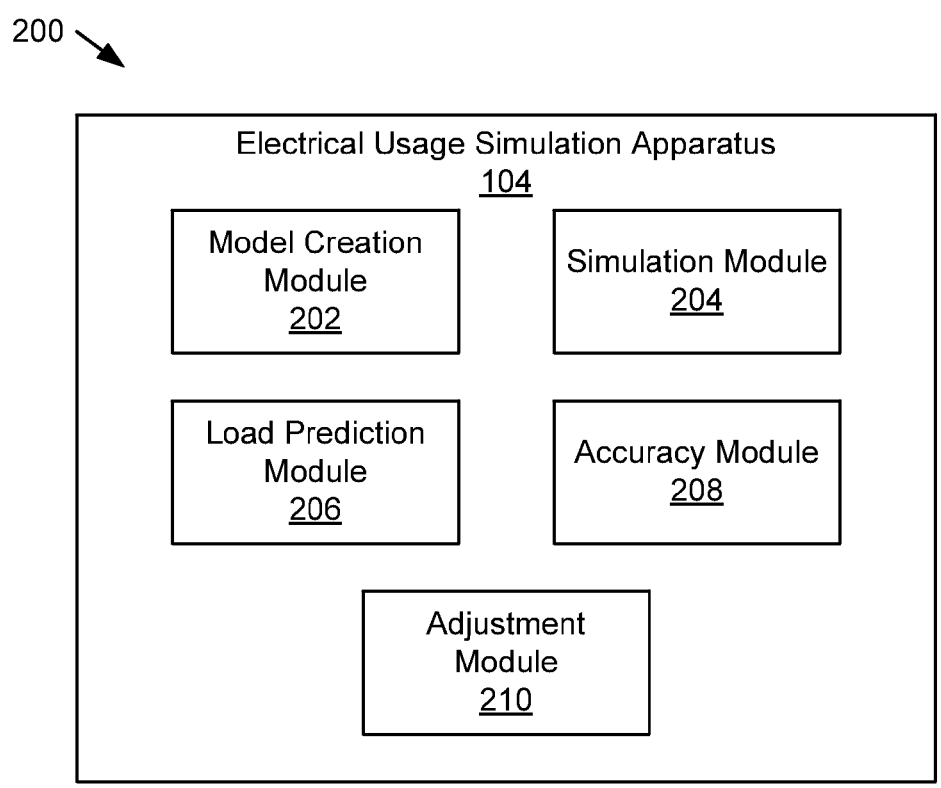
FIG. 2 is a schematic block diagram illustrating one embodiment of an apparatus for determining electrical and lifestyle characteristics in accordance with the present invention.

FIG. 2 is a schematic block diagram illustrating one embodiment an apparatus 200 for simulating electrical and lifestyle characteristics in accordance with the present invention. The apparatus 200 includes an embodiment of the electrical usage electrical usage simulation apparatus 104 with a model creation module 202, a simulation module 204, a load prediction module 206, an accuracy module 208, and an adjustment module 201 which are described below. In various embodiments, the electrical usage electrical usage simulation apparatus 104 may include other modules mentioned below.

In certain embodiments, the model creation module 202 creates an electrical usage model that includes an electrical device usage model for each electrical load (or electrical devices) assumed to be at a simulated premises. The electrical device usage models typically include electrical energy usage algorithms for a particular electrical load that express the electrical energy usage of that particular electrical load as a function of characteristics of the simulated premises. In certain embodiments, the electrical device usage model for a particular electrical load is developed using engineering knowledge for that particular device. For example, an air conditioning unit of a particular size uses a known amount of electricity when the air conditioning unit is operated. Similarly, electrical usage by electric heating units, timed electrical devices, electric water heaters, electric clothes dryers, etc. are all within the engineering knowledge in the art.

In one embodiment, the electrical device usage models express the electrical energy usage for an electrical load as electrical usage data for a plurality of time periods for each day within a specified time period. For example, the electrical usage data may include quarter-hourly, hourly, daily, etc. electrical usage of a particular electrical load as may be found in a conventional electrical usage record recorded by a conventional electrical meter. Typically the electrical usage data is expressed as in kilowatts from a simulated electric meter. In various embodiments, the energy usage data includes demand information, power factor information, etc. One of skill in the art will recognize other ways of expressing the electrical usage data.

The assumed electrical loads make up a load set that includes all of the electrical loads for all of the electrical devices assumed to be at a premises. Each of the electrical device usage models typically include an algorithm that represents the electrical usage for the particular electrical load. The algorithms include characteristic specific functions that determine the electrical usage for the particular electrical load as a function of the characteristics of a particular simulated premises. In one embodiment, the electrical usage model is a sum of all of the electrical device usage models for a particular assumed load set. For example, if a particular simulated premises includes an air conditioning unit, an electric heating unit, a timed electrical device and an electric water heater, the electrical usage model for that simulated premises is the sum of an electrical device usage model (an algorithm) for the air conditioning unit, an electrical device usage model (an algorithm) for the electric heating unit, an electrical device usage model (an algorithm) for the timed electrical device, and an electrical device usage model (an algorithm) for the electric water heater. One of skill in the art will recognize that the electrical usage models for simulated premises having a different assumed load sets will include different electrical device usage models.

Other simulated premises may include a different assumed load set having different assumed electrical devices. In certain embodiments, an assumed load set for a particular simulated premises may include a number of assumed electrical devices that are the same as another simulated premises and a number of assumed electrical devices that are different. The electrical devices that make up a particular load set may be one or more of an electrical device such as an air conditioning unit, an electric heating unit, a time electrical device (i.e., pool pumping equipment, timed lighting, timed heating units, etc.), an electric water heater, an electric clothes dryer, etc. In other embodiments, the electrical devices that make up the load set may be any electrical device having a predictable or predefined electrical load.

In certain embodiments, the model creation module 202 creates an electrical usage module for each simulated premises using all of the electrical device usage models for each electrical load assumed to be the simulated premises. In such an embodiment, for a particular simulated premises, the electrical usage module includes an aggregate of all of the assumed electrical usage at the premises for all of the electrical loads assumed to be at that premises.

In another embodiment, instead of creating an electrical usage model that includes electrical device usage models for all of the electrical loads assumed to be at the simulated premises, the model creation module 202 may create an electrical device usage model for a single electrical load without aggregating the device usage models into an assumed load set. In such an embodiment, the model creation module 202 may independently create additional electrical device usage models for additional electrical loads. Thus, for example, the model creation module 202 may independently create an electrical device usage model for an air conditioning unit, independently create an electrical device usage model for an electric heating unit, independently create an electrical device usage model for an electric clothes dryer, etc.

In one embodiment, the simulated electrical usage model includes electrical usage data for a plurality of time periods for each day within the specified time period. The electrical usage data is typically be divided into discrete time intervals such as a quarter-hour, half-hour, hour, daily, etc. In another embodiment, the electrical usage data may be broken down into other increments depending on the sensitivity of data recording instruments and/or on a desired precision of the apparatus 200. The electrical usage data may be in tabular or graphical form.

The characteristics of the simulated premises are typically derived from characteristics from actual premises within an area serviced by an electrical utility. The amount of electricity used for a particular electrical load typically varies depending on characteristics of a particular simulated premises. The algorithms of the electrical device usage models typically incorporate the affects of the characteristics of the particular simulated premises. For example, with reference to an air conditioning or heating unit, the electrical usage of such device may depend on characteristics of the simulated premises such as the premises size, outside temperatures at the premises, whether the premises is a single story or multistory premises, insulation values from surrounding structures such as would be found in an apartment, the efficiency of insulating materials used in building the premises, etc. Accordingly, in certain embodiments, the algorithms of the electrical usage models are developed to take into account the characteristics of the simulated premises. These characteristics are typically derived from actual premises within an area serviced by an electrical utility.

The characteristics used for the simulated premises may include physical characteristics of the premises serviced by the electrical utility, environmental characteristics for the premises serviced by the electrical utility over a specified time period, and/or lifestyle characteristics of users of the premises serviced by the electrical utility. The characteristics may be available from customer surveys, premises inspection, from government records, aerial photographs, etc. Some of the characteristics may not vary and some may vary over time so are applicable during the specified time period. For example, a community type for a particular premises typically remains constant. However, environmental characteristics, such as weather surrounding the premises, typically varies throughout the specified time period.

The physical characteristics used for the simulated premises may include a premises size, a premises type, a premises community type, or other information about the premise that typically affect electrical load size and type. Other physical characteristics may include age of a structure on the premises, climate, altitude of the premises, community type, etc. This information may be used to deduce construction type, insulation type, etc. for the structure. Orientation and layout of a structure may be other physical characteristics that may be used to determine heat load, sun exposure, etc. which may affect the electrical device usage model for one or more of the electrical loads at the simulated premises.

The physical characteristics may include one or more known electrical devices at the premises. For example, survey data and/or aerial photography may indicate pools at a number of premises. Accordingly, pool pumps may be assumed at a number of the simulated premises. The physical characteristics may also include structure types of the premises. For example, single family dwellings, multifamily dwellings, etc. Construction type, such as brick, stucco, aluminum siding, etc. may also be a physical characteristic used in developing the simulate premises. One of skill in the art will recognize other physical characteristics available and useful in creating the electrical device usage models for the simulated premises.

As discussed above, environmental characteristics for the simulated premises typically vary over time. Examples of environmental characteristics include weather data for the simulated premises over the predefined time period, sunrise data for the simulated premises over the predefined time period, sunset data for the premises over the predefined time period, etc. In certain embodiments, the environmental characteristics include temperatures at or near the simulated premises during the predefined time period. In another embodiment, the environmental characteristics may include rain, wind, snowfall, etc. characteristics. The environmental characteristics may include hourly, daily, weekly, seasonal, or yearly averages. One of skill in the art will recognize other environmental characteristics available and useful in creating the electrical device usage models for the simulated premises.

The lifestyle characteristics for the premises may include a use of the premises as a vacation residence, a use of the premises as a primary residence, whether and when vacation days are taken by the user of the premises, whether a school aged child uses the premises, and whether one or more users use the premises during weekday daylight hours. One of skill in the art will recognize other lifestyle characteristics for the premises available and useful in creating the electrical device usage models for the simulated premises.

In creating the electrical usage models for the community as a whole, the characteristics used for each simulated premises are varied such that a distribution of characteristics amongst the simulated premises approximates a distribution of actual characteristics for the actual premises serviced by the electrical utility. Thus, in certain embodiments, a plurality of electrical usage models are created for a plurality of simulated premises with the simulated premises having characteristics that approximate the characteristics of the actual premises serviced by the electrical utility. By varying the characteristics of the simulated premises to approximate the characteristics of the actual premises serviced by the electrical utility, the electrical usage models created by the simulation module 204 are representative of actual electrical usage by actual properties serviced by the electrical utility.

The simulation module 204 simulates, using the electrical usage model, electrical usage at the simulated premises during the specified time period. Typically, the specified time period is six months to a year to accommodate seasonal changes in electrical usage and to incorporate periodic changes electrical equipment at the premises. For example, seasonal changes in electrical usage may include summer use of pool pumping equipment.

By simulating the electrical usage at the simulated premises during the specified time period, weather characteristics for the area serviced by the electrical utility can be incorporated into the simulations. Weather variations may affect the amount of electricity used by certain electrical equipment such as air conditioning units or electric heating devices. Additionally, by simulating the electrical usage at the simulated premises during the specified time period, time of day dependant electrical usage may be incorporated into the simulations. For example, shorter days and longer nights that occur during the winter may affect a time that a particular type of time of day dependent electrical device, such as lighting or timed lighting, is used. By simulating the electrical usage at the simulated premises during a specified time period, these affects are incorporated into the simulations.

The electrical usage model created by the model creation module 202 includes a set of location-specific parameters for the simulated premises. The set-of location specific parameters are typically held constant for a particular simulated premises and the electrical usage at that simulated premises is simulated for a plurality of assumed load sets. The simulated electrical usage at that simulated premises is varied depending on electrical loads assumed to be at the simulated premises.

The set of location-specific parameters are typically unique to a particular simulated premises. For example, in certain embodiments, a first simulated premises may be simulated to include a specific set of location-specific parameters (i.e., a specific premises size, a specific premises type, a specific community type, a specific set of environmental characteristics, etc.). Using the first simulated premises with its specific set of location-specific parameters, a plurality of simulations for electrical usage at the first simulated property are developed. The plurality of electrical usage simulations for the first simulated property vary depending on which electrical loads are assumed to be included within the load set. For example, a first electrical usage simulation for the first simulated premises may be simulated with electrical loads for an air conditioning unit, pool pumping equipment, and an electric clothes dryer. A second electrical usage simulation for the first simulated premises may be simulated with electrical loads for an electric heating unit, timed lighting, and an electric water heater. Additional electrical usage simulations are developed for the first simulated premises with each additional electrical usage simulation including a different set of assumed electrical loads. In certain embodiments, an electrical usage simulation may be developed for each possible electrical load combination.

Even though the location-specific parameters remain the same for the first simulated premises for each of these simulations, the first electrical usage simulation differs from the second electrical usage simulation in that the electrical equipment used in the simulations are different. This process may be repeated for additional simulated premises. In this manner, a plurality of electrical usage simulations are developed for each simulated premises with each electrical usage simulation differing according to the electrical loads used in creating the simulated electrical usage. Thus, the simulation module 204 simulates electrical usage for a plurality of simulated premises and for a plurality of assumed load sets for each simulated premises. The aggregate of all of the electrical usage simulations for all of the simulated premises make up a simulation record set.

The simulation module 204 uses the electrical usage model created by the model creation module 202 to simulate electrical usage at the simulated premises during the specified time period. In one embodiment, the electrical usage model includes a number of electrical device usage models for each electrical load assumed to be at the simulated premises. Each electrical device usage model for each electrical load assumed to be at the premises is a time-based projection of electrical usage of an electrical device at the simulated premises. In certain embodiments, the time based projected electrical usage includes one or more of a time of use for the electrical device and an amplitude of electrical usage of the electrical device.

The electrical device usage models indicate the amount of electricity a particular electrical load uses and a time that the particular load uses the electricity given a specific set of the characteristics for the particular simulated premises. Thus, the electrical device usage models incorporate location-specific parameters into the simulated electrical usage at a particular simulated premises over the specified time period. Additionally, because the electrical device usage models incorporate time dependent parameters (i.e., temperature, daylight hours, etc.) the electrical device usage models reflect electrical usage based on temperatures, time period within a day, etc. The simulated electrical usage at the simulated premises includes the sum of electrical usage for all of the electrical device models and is typically simulated for a number of time intervals (i.e., quarter-hourly, half-hourly, hourly, etc.) over the specified time period.

In certain embodiments, the simulated premises in the simulation record set are developed such that a distribution of their location-specific parameters approximates a distribution of location-specific parameters for the actual premises serviced by the electrical utility. In one embodiment, the simulated premises may be grouped into types of simulated premises with the types of simulated premises defined by ranges of one or more of the location-specific parameters. For example, in one embodiment, a group of simulated premises may include premises that have a square footage that falls within a specific range (i.e., 1500-2000 square feet, 2001-2500 square feet, 2501-3000 square feet, etc.). In other embodiments, an individual simulated premises may be simulated to include location-specific parameters corresponding to the location-specific for each actual premises serviced the electrical utility.

In one embodiment, the location-specific parameters used for each simulated premises may include parameters derived from the characteristics of the premises serviced by the electrical utility, i.e., the physical characteristics of the premises serviced by the electrical utility, the environmental characteristics for the premises serviced by the electrical utility over a specified time period, and/or the lifestyle characteristics of users of the premises serviced by the electrical utility. These characteristics are described above with reference to the model creation module 202.

In certain embodiments, the location-specific parameters used for each simulated premises may also include parameters such as an average base electrical usage for the simulated premises, relative weekday and weekend electrical usage for the simulated premises during specified time periods within a day (i.e., breakfast hours, dinner hours, etc.), relative seasonal electrical usage (i.e., spring, summer, fall, winter) during specified time periods within a day (i.e., nighttime, morning, afternoon, evening), a dependence of heating and air conditioning on outside temperature, a physical efficiency of heating and air conditioning equipment, a start and stop time of timed electrical devices, refrigerator defrost intervals, a use of a swimming pool, and use of a hot tub, a number of space heaters at a simulated premises, etc.

The location-specific parameters, in one embodiment, may also include parameters that reflect lifestyle characteristics of users of the premises. Location-specific lifestyle characteristics may include use of the simulated premises as a vacation premises, a length of a vacation taken by users of the premises, a number of users at home during weekday daylight hours, etc.

The load prediction module 206 uses a load prediction algorithm to determine if a particular type of electrical load is present within each of a plurality of the simulated premises. In certain embodiments, the load prediction module 206 determines whether a particular type of electrical load is present within each of the simulated premises used for the simulations simulated by the simulation module 204. In other embodiments, the load prediction module determines whether a particular type of electrical load is present within a subset of the simulated premises used for simulations by the simulation module.

In certain embodiments, it may not make logical sense to test a particular simulated premises for the presence of a particular type of electrical load. For example, while apartment complexes may or may not include a swimming pool, an individual apartment typically does not include a swimming pool. In such a case, it may be a waste of computing resources to test an individual apartment for the presence of an electrical load corresponding to swimming pool pumping equipment. Accordingly, in certain embodiments the load prediction module 206 may only test non-apartment type simulated premises for the presence of swimming pool pumping equipment. One of skill in the art will recognize other instances where a particular premises type may make testing for a particular electrical load illogical or unpractical.

In certain embodiments, the load prediction algorithm includes one or more algorithm parameters that are typical of electrical usage for a particular electrical load. Examples of algorithm parameters may include an amplitude of electrical usage, a time of day of electrical usage, a time interval of electrical usage, a repeating pattern of electrical usage over a number of days, etc.

Types of electrical loads may include air conditioning equipment, an electric heating unit, lighting, timed lighting, appliances, an electric dryer, an electric range, a pool pump, an electric water heater, an electric clothes dryer, etc. Load prediction algorithms have been developed for several types of electrical loads and the load prediction module 206 selects a load prediction algorithm for a particular type electrical load suspected to be at the simulated premises. Examples of several load prediction algorithms that may be used by the load prediction module 206 are discussed below.

In certain embodiments, the load prediction module 206 reviews the simulated electrical usage for a first simulated premises to determine whether that simulated premises includes a first type of electrical load. The load prediction module 206 may then review electrical usage for the first simulated premises to determine whether the first simulated premises includes a second type of electrical load. The load prediction module 206 repeats this process until the load prediction module 206 determines each type of electrical load in the load set used for the first simulated premises. The load prediction module may then repeat this process for each simulated premises in the subset of the simulated premises used for simulations by the simulation module 204. In another embodiment, the load prediction module 206 may review all of the electrical usages for all of the simulated premises to determine which premises include the first type of load; review all of the electrical usages for all of the simulated premises to determine which simulated premises include the second type of load, etc. In one embodiment, instead of reviewing the simulated electrical usage for a particular simulated premises to determine all of the types of electrical loads in the load set used for that particular simulated premises, the load prediction module 206 may review the simulated electrical usage for a particular simulated premises to determine less than all of the types of loads in the load set used for that particular simulated premises.

The accuracy module 208 determines an accuracy of the load prediction algorithm in determining if the particular type of electrical load is present in the subset of simulations. In certain embodiments, the accuracy module 208 determines a percentage of times that the prediction module accurately determines that the particular type of electrical load is present in the subset of simulations.

The types of electrical loads used in simulating the electrical usage at the simulated premises are known because the simulation module 204 used such types of electrical loads in simulating the electrical usage. Therefore, the accuracy module 208 compares the types of loads used in simulating the electrical usage at the simulated premises with the types of loads predicted to be at the simulated premises by the prediction module 206 to determine the accuracy of the prediction module 206.

In one embodiment, the accuracy module 208 reviews the predictions made by the load prediction module 206 and compares them with load sets used in simulating the electrical usages for the plurality of simulated premises to determine a percentage of times that the load prediction module 208 accurately predicted that the particular type of electrical load is present in the plurality of simulated premises. For example, if the simulation module 204 used a particular type of load in simulating electrical usage at a first simulated premises, a second simulated premises and a third simulated premises and the load prediction module 206 predicted that the particular type of load is present in the first and second simulated premises but not the third, the accuracy module 208 would determine that the load prediction module 206 accurately predicted the load type at ⅔ (66%) of the simulated premises.

In other embodiments, the load prediction module 206 may predict that a particular simulated premises includes a particular type of load when in fact the particular type of load is not present in the simulated premises. For example, if the simulation module 204 used a particular type of load in simulating electrical usage at a first simulated premises, a second simulated premises but not a third simulated premises and the load prediction module 206 predicted that the particular type of load is present in the first, second, and third simulated premises, the accuracy module 208 would again determine that the load prediction module 206 accurately predicted the load type at ⅔ (66%) of the simulated premises.

The adjustment module 210 adjusts one or more of the algorithm parameters for the load prediction algorithm used by the load prediction module 206 in response to the determined accuracy. If the determined accuracy is below a specified threshold, the adjustment module 210 adjusts one or more of the algorithm parameters to increase the accuracy of the load prediction algorithm.

The adjustment module 210 typically adjusts one or more of the algorithm parameters for the load prediction algorithm to maximize the percentage of times that the prediction module 206 accurately determines that the particular type of electrical load is present in the subset of simulations. For example, in one embodiment, if the accuracy module 208 determines that the accuracy of the load prediction algorithm for a particular type of load is below a specified threshold, the adjustment module adjusts the algorithm parameters used by the load prediction algorithm for that type of load. The load prediction module 206 then uses the load prediction algorithm with the adjusted algorithm parameters to determine whether that type of load is present within each of the plurality of the simulated premises.

The accuracy module 208 determines the accuracy of the load prediction algorithm in using the adjusted one or more algorithm parameters. If the accuracy is still below a predefined threshold, the adjustment module 210 again adjusts one or more of the algorithm parameters and the process is repeated until the accuracy of the prediction module is above the predefined threshold.

In certain embodiments, rather than adjusting the one or more algorithm parameters until the accuracy of the prediction module 206 is above a predefined threshold, the one or more algorithm parameters may be adjusted until the accuracy of the prediction module 206 is maximized. The adjustment module 210 may adjust the one or more algorithm parameters in a number of ways. For example, in certain embodiments, the adjustment module 210 may adjust one or more of the algorithm parameters for a particular type of electrical load in the load set while holding the algorithm parameters for other types of electrical loads in the load set constant. In another embodiment, the adjustment module 210 may adjust one or more of the algorithm parameters for a number of types of electrical loads in the load set. In such an embodiment, the algorithm parameters for the particular type of electrical load of interest may be adjusted in addition to the algorithm parameters for other types of loads. Additionally, in one embodiment, the algorithm parameters for other types of loads may be adjusted while the algorithm parameters for the particular type of electrical load of interest may be held constant. In yet another embodiment, the adjustment module 210 may adjust one or more of the algorithm parameters for a first type of electrical load in the load set. The adjustment module 210 may iterate through adjusting one or more of the algorithm parameters for additional types of electrical loads present in the load set and then repeating adjusting the one or more of the algorithm parameters for at least one electrical load in the load set. One of skill in the art will recognize other methods of adjusting the algorithm parameters to maximize the accuracy of the prediction module 206 in determining whether a particular type of electrical load is present in a load set.

Examples of algorithm parameters that may be used in the load prediction algorithm and which may be adjusted by the adjustment module 210 include an amplitude of electrical usage for the particular type of electrical load, a frequency of the electrical usage for the particular type of electrical load, a time of day of the electrical usage for the particular type of electrical load, a duration of electrical usage for the particular type of electrical load, a temperature dependent electrical usage for the particular type of electrical load, and a lifestyle dependent electrical usage pattern for the particular type of electrical load. One of skill in the art will recognize other algorithm parameters that may be used in the load prediction algorithm and which may be adjusted by the adjustment module 210 to maximize the accuracy of the load prediction algorithm.

Figure 3:
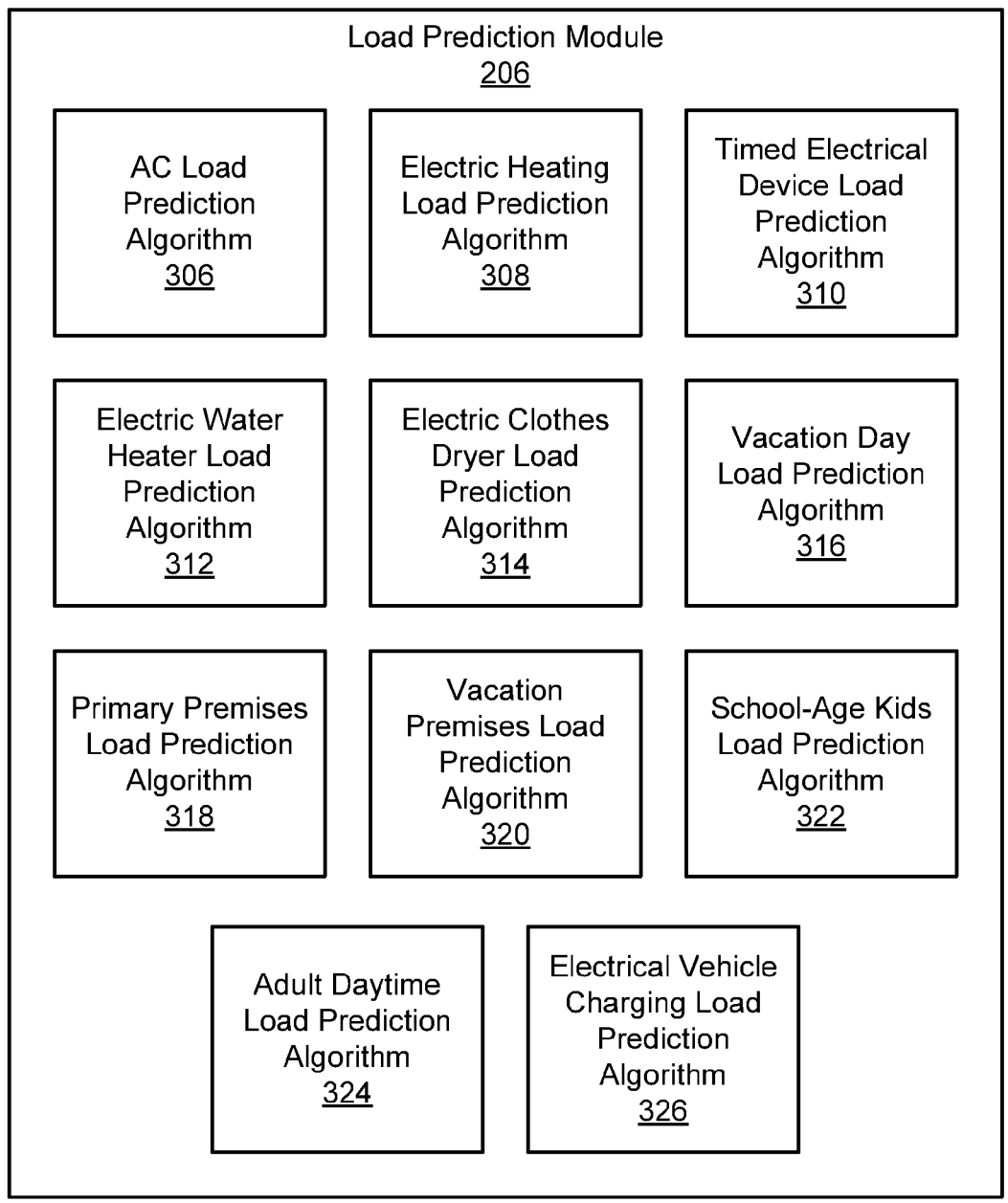
FIG. 3 is a schematic block diagram illustrating another embodiment of an apparatus for determining electrical and lifestyle characteristics in accordance with the present invention.

FIG. 3 is a schematic block diagram illustrating an embodiment of a load prediction module 206 for determining whether a particular type of electrical load is present within each of a plurality of simulated premises in accordance with the present invention. In certain embodiments, the load prediction module 206 may include one or more load prediction algorithms such as an air conditioning load prediction algorithm 306, an electric heating load prediction algorithm 308, a timed electrical device load prediction algorithm 310, an electric water heater load prediction algorithm 312, an electric clothes dryer load prediction algorithm 314, a vacation day load prediction algorithm 316, a primary premises load prediction algorithm 318, a vacation premises load prediction algorithm 320, a school-age kids load prediction algorithm 322, adult daytime load prediction algorithm 324, and an electrical vehicle charging load prediction algorithm 326. The load prediction algorithms 306-326 are discussed below.

As discussed above, in certain embodiments, the load prediction module 206 uses the load prediction algorithms 306-326 to determine if a particular type of electrical load is present within each of a number of simulated premises. In one embodiment, the load prediction module 206 uses the load prediction algorithms 306-326 to determine if the particular types of electrical loads are present with all of the simulated premises. In other embodiments, the load prediction module 206 uses the load prediction algorithms 306-326 to determine if the particular types of electrical loads are present in at least a subset of the simulated premises.

In certain embodiments, the load prediction module 206 uses each of the load prediction algorithms 306-326 to determine if each of the types of electrical loads corresponding to the load prediction algorithms 306-326 are present within each of the simulated premises. In other embodiments, the load prediction module 206 may use one or more of the load prediction algorithms 306-326 to test for one or more of the types of electrical loads corresponding to the load prediction algorithms 306-326. In yet another embodiment, the load prediction module 206 may only use one of the load prediction algorithms 306-326 to test for a particular type of electrical load corresponding to one of the load prediction algorithms 306-326.

Figure 4:
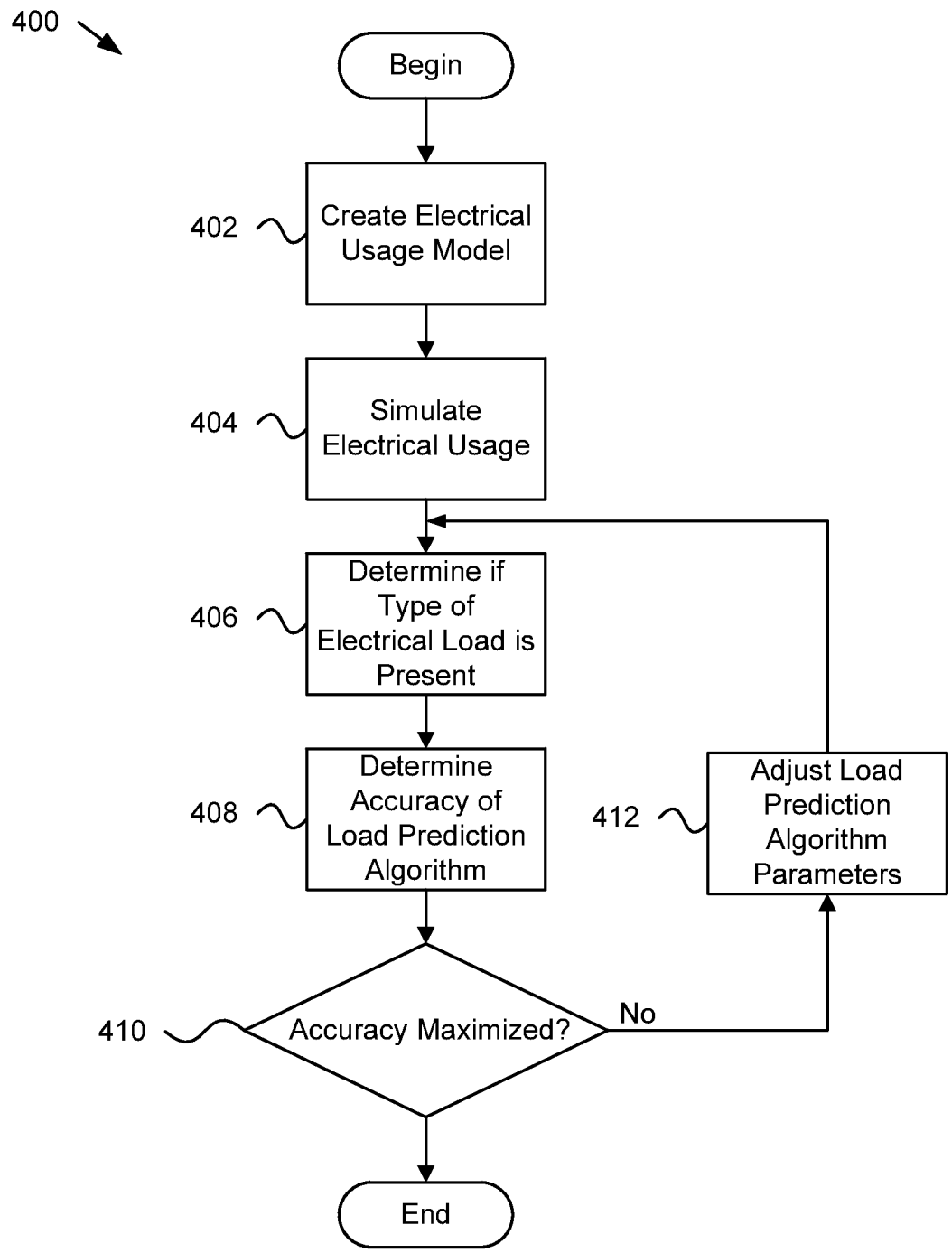
FIG. 4 is a schematic flow chart diagram illustrating one embodiment of a method for simulating electrical and lifestyle characteristics in accordance with the present invention.

FIG. 4 is a schematic flow chart diagram illustrating one embodiment of a method 400 for simulating electrical and lifestyle characteristics in accordance with the present invention. The method 400 begins and the model creation module 202 creates 402 an electrical usage model. In certain embodiments, the electrical usage model includes an electrical device for each electrical load assumed to be at a simulated premises. The assumed electrical loads make up a load set and the simulated premises include characteristics from actual premises within an area serviced by an electrical utility. The characteristics typically include characteristics such as physical characteristics for the simulated premises, environmental characteristics for the area surrounding the simulated premises over a specified time period, and/or lifestyle characteristics for users of the simulated premises.

The simulation module 204 simulates 404 electrical usage at the simulated premises during the specified time period using the electrical usage model created by the model creation module 202. The electrical usage model includes a set of location-specific parameters for a particular simulated premises. In certain embodiments, the set of location-specific parameters include parameters such as specific physical characteristics for the simulated premises. The location-specific parameters typically also include specific environmental characteristics for the simulated premises (i.e., weather histories, sunset times, sunrise times, etc.) and specific lifestyle characteristics of users of the simulated premises. The simulation module 204 simulates 404 electrical usage for a number of simulated premises and for a number of assumed load sets for each simulated premises.

The load prediction module 206 uses a load prediction algorithm to determine 406 if a particular type of electrical load is present within each of the simulated premises. In one embodiment, the load prediction module 206 determines 406 if the particular type of electrical load is present within at least a subset of the total of all of the simulated premises. In other embodiments, the prediction module 206 determines 406 if the particular type of electrical load is present within all of the simulated premises. Each load prediction model includes one or more algorithm parameters that indicate energy usage characteristics for the particular electrical load.

The accuracy module 208 determines 404 an accuracy of the load prediction algorithm in determining whether the particular type of electrical load is present in the subset of simulations (or in all of the simulations). In certain embodiments, the accuracy module 208 reviews the determinations for a particular electrical load for the subset of simulations made by the load prediction module 206 with the actual loads used in the subset of simulations to determine 404 a percentage of times that load prediction module 206 accurately determined that the type of electrical load was present in the simulations.

If the accuracy module 208 determines that the accuracy of the load prediction algorithm is greater than a specified threshold, the method 400 ends. If the accuracy module 208 determines that the accuracy of the load prediction algorithm is less than the specified threshold, the adjustment module 210 adjusts 412 the algorithm parameters used by the prediction module 206 and the load prediction module 406 determines the type of electrical loads present in the simulated premises. In certain embodiments, the adjustment module 210 keeps adjusting the algorithm parameters until the accuracy module determines that the load prediction module 206 is greater than the specified threshold. In other embodiments, the adjustment module 210 keeps adjusting the algorithm parameters until the number of times that the load prediction algorithm accurately determines that the particular type of electrical load is present in the subset of simulations is maximized.

Figure 5:
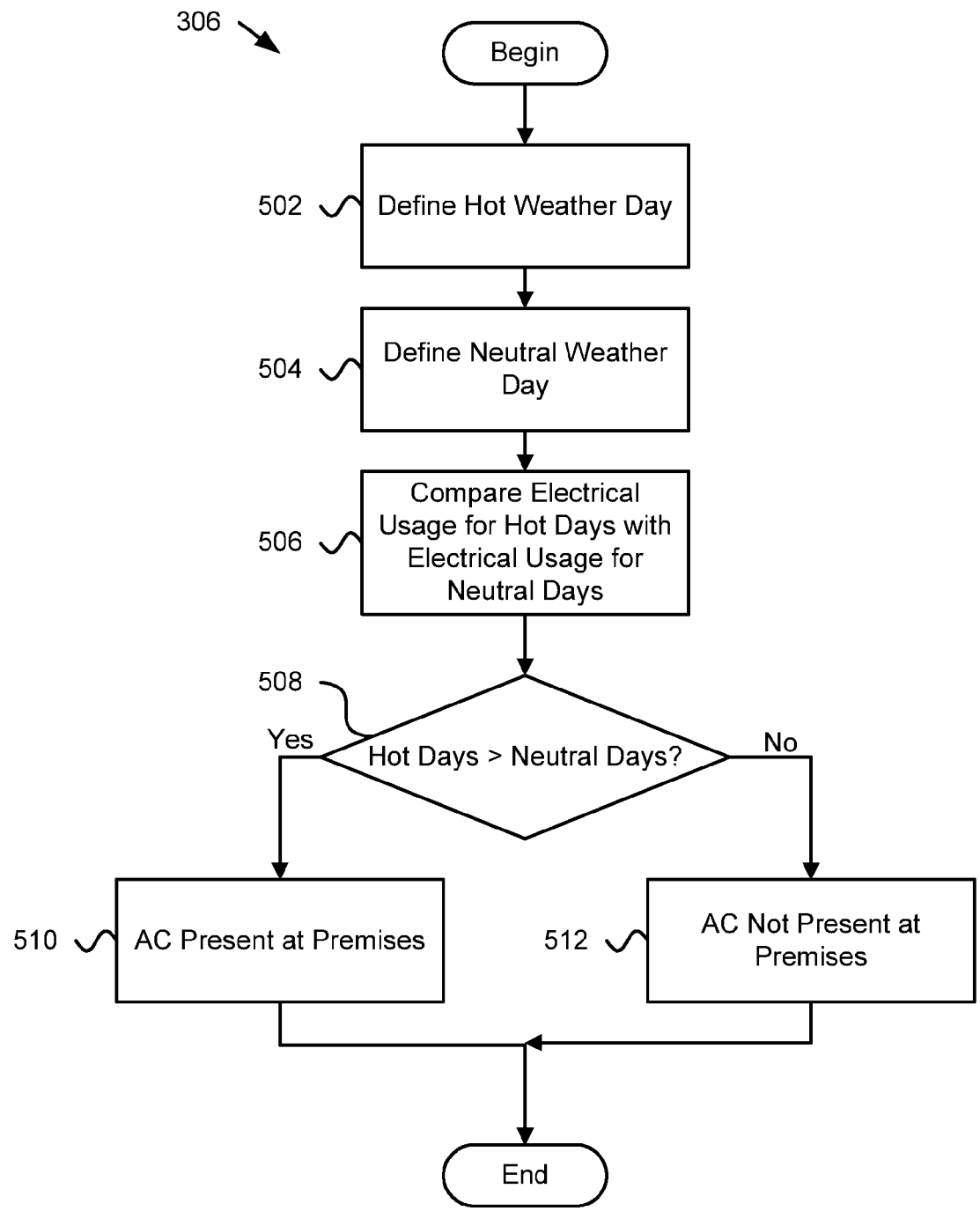
FIG. 5 is a schematic flow chart diagram illustrating one embodiment of a load prediction algorithm for determining whether an air conditioner is present on a premises in accordance with the present invention.

FIG. 5 is a schematic flow chart diagram illustrating one embodiment of a load prediction algorithm 306 for determining whether an air conditioner is present on a simulated premises in accordance with the present invention. The load prediction algorithm 306 begins by defining 502 a hot weather day. For example, a hot weather day may be a day above a certain temperature. In another embodiment, a hot weather day may use a combination of temperature, humidity, and/or cloudiness to define a hot weather day. The load prediction algorithm 306 then defines 504 a neutral weather day. For example, a neutral weather day may be a day that has a temperature within a specified range. The temperatures that define a hot or a neutral day may be maximum temperature, temperature at a particular hour, average temperature, etc.

The load prediction algorithm 306 compares 506 electrical usage from the simulated electrical energy usage record for the simulated premises for at least a portion of the hot weather days with a simulated electrical usage from the simulated electrical energy usage record for at least a portion of the neutral weather days. In one embodiment, the load prediction algorithm 306 selects hot weather days that have a simulated energy usage that is within a specified percentage of the highest energy usage among hot weather days. For example, the load prediction algorithm 306 may select hot weather days that have an energy usage that are among the highest 20% of simulated energy usage for the hot weather days. The load prediction algorithm 306 may use average simulated electrical energy usage, peak simulated energy usage, etc. and may use a portion of the hot weather days or all of the hot weather days. In one embodiment, a first simulated hourly average electrical usage for a specified upper percentage of the electrical usage during each hour in a multiplicity of hot days is compared with a second hourly simulated average electrical usage for a specified upper percentage of simulated electrical usage during each comparison hour in a multiplicity of neutral weather days. One of skill in the art will recognize other ways to determine a simulated energy usage for comparison among hot weather days.

The load prediction algorithm 306 may select neutral weather days that have a simulated energy usage that is within a specified percentage of some metric, such as highest energy usage, midpoint energy usage, etc. For example the load prediction algorithm 306 may select neutral weather days with a simulated energy usage among the highest simulated energy usage for neutral weather days. In one embodiment, the load prediction algorithm 306 selects neutral weather days with simulated energy usages within the highest 20% of simulated energy usages among neutral weather days. The load prediction algorithm 306 may select a comparison period during a particular season, such as summer or may simply choose hot and neutral weather days among all days in the record period.

The load prediction algorithm 306 determines 508 that the premises includes air conditioning equipment if the simulated energy usage for a hot weather day is greater than the simulated energy usage for the neutral weather days. In one embodiment, the load prediction algorithm 306 determines 508 that the premises includes air conditioning equipment if the difference between simulated energy usage for hot weather days and neutral weather days is above an AC load threshold. In one embodiment, if the load prediction algorithm 306 determines 508 that the simulated electrical usage for the hot weather days is greater than the simulated electrical usage for the neutral weather days, the load prediction algorithm determines 508 that simulated premises includes air conditioning equipment and the load prediction algorithm 306 ends. In other embodiments, if the load prediction algorithm 306 determines 508 that the difference is above the AC load threshold, the load prediction algorithm 306 determines 510 that the premises include air conditioning equipment, and the load prediction algorithm 306 ends. In one embodiment, if the load prediction algorithm 306 determines 508 that the simulated electrical usage for the hot weather days is less than the simulated electrical usage for the neutral weather days, the load prediction algorithm determines 508 that simulated premises does not include air conditioning equipment and the load prediction algorithm 306 ends. In another embodiment, if the load prediction algorithm 306 determines 508 that the difference is not above the AC load threshold, the load prediction algorithm 306 determines 512 that the simulated premises does not include air conditioning equipment, and the load prediction algorithm 306 ends.

In an exemplary embodiment, the load prediction algorithm 306 for determining whether an air conditioner is present on a simulated premises defines 502 a hot day as a day that has a maximum outdoor temperature above a specified temperature threshold. The load prediction algorithm 306, defines a neutral day as a day that has a maximum outdoor temperature within a specified temperature range. The load prediction algorithm 306 may also specify comparison hours in the afternoon and evening of a day and may calculate a distribution of the energy usage during each of the comparison hours in a day for a multiplicity of hot days. The load prediction algorithm 306 calculates a first hourly average energy usage for a specified upper percentage of the energy usages during each comparison hour in the multiplicity of hot days and calculates a first overall average energy usage as the average of first hourly average energy usages over all comparison hours. The load prediction algorithm 306 then calculates a distribution of the energy usage during each of the comparison hours in a day for a multiplicity of neutral days and calculates a second hourly average energy usage for a specified upper percentage of the energy usages during each comparison hour in the multiplicity of neutral days. The load prediction algorithm 306 calculates a second overall average energy usage as the average of second hourly average energy usages over all comparison hours. The calculations for the hot weather days and the neutral weather days are compared 506 and the load prediction algorithm 306 detects an air conditioning unit by requiring the first overall average energy usage to be larger than the second overall average energy usage.

In the exemplary embodiment, the parameters that control the performance of the load prediction algorithm 306 for an air conditioning unit may include the specified temperature threshold, the specified temperature range, the specified comparison hours, and the specified upper percentages. The parameters that define the acceptable performance of other load prediction algorithm 306 for an air conditioning unit may be specific for a particular electric utility.

Figure 6A:
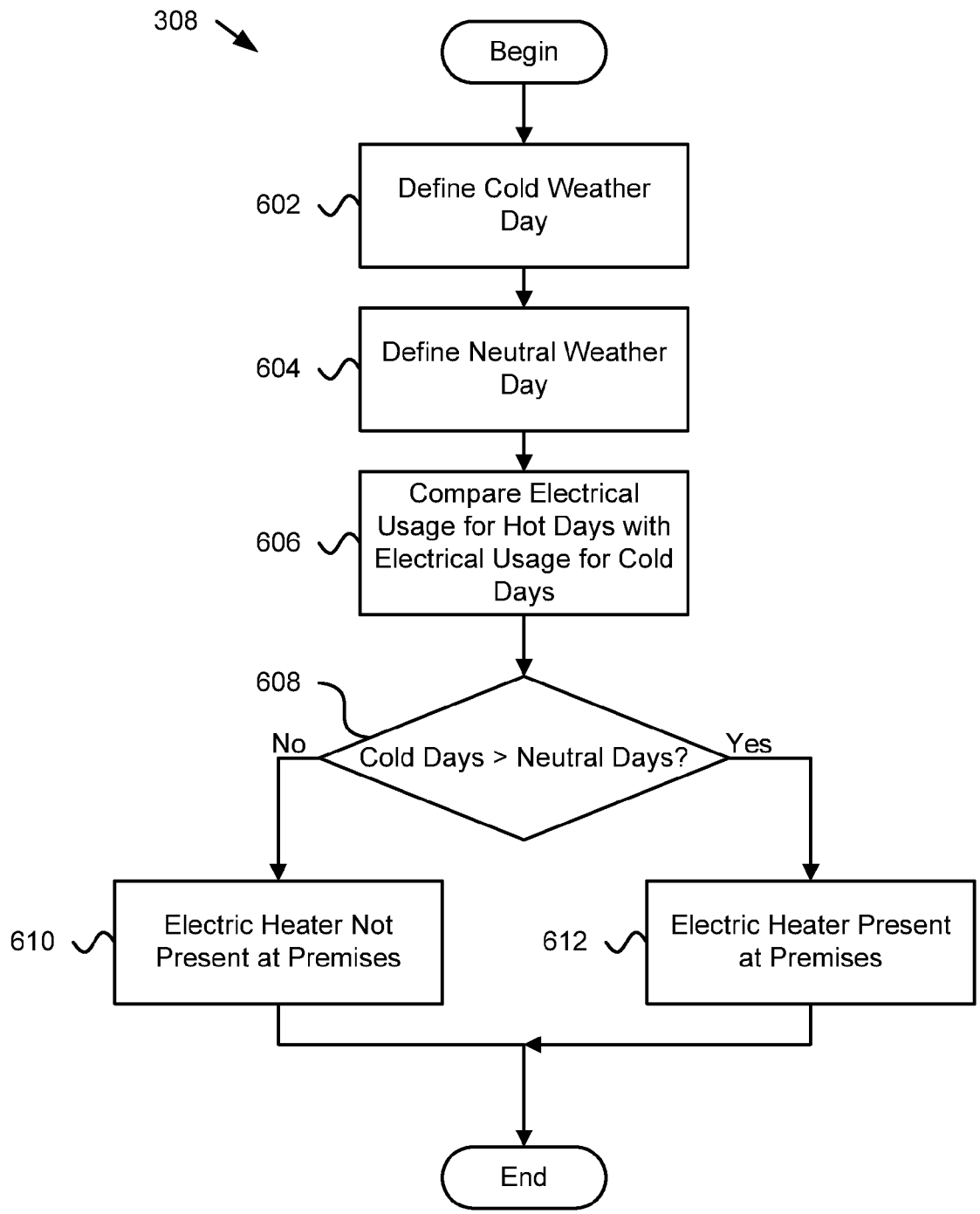
FIG. 6A is a schematic flow chart diagram illustrating one embodiment of a load prediction algorithm for determining whether an electric heating unit is present on a premises in accordance with the present invention.

FIG. 6A is a schematic flow chart diagram illustrating one embodiment of a load prediction algorithm 308 for determining whether an electric heating unit is present on a simulated premises in accordance with the present invention. The load prediction algorithm 308 begins by defining 602 a cold weather day. For example, a cold weather day may be a day below a certain temperature. In another embodiment, a cold weather day may use a combination of temperature, humidity, and/or cloudiness to define a cold weather day. The load prediction algorithm 308 then defines 604 a neutral weather day. For example, a neutral weather day may be a day that has a temperature within a specified range. The temperatures to define a cold or a neutral day may be maximum temperature, temperature at a particular hour, average temperature, etc.

The load prediction algorithm 308 compares 606 simulated electrical usage for the simulated premises for at least a portion of the cold weather days with a simulated electrical usage for at least a portion of the neutral weather days. In one embodiment, the load prediction algorithm 308 selects cold weather days that have a simulated energy usage that is within a specified percentage of the highest simulated energy usage among cold weather days. For example, the load prediction algorithm 308 may select cold weather days that have a simulated energy usage that are among the highest 20% of simulated energy usage for the cold weather days. The load prediction algorithm 308 may use average simulated electrical energy usage, peak simulated energy usage, etc. and may use a portion of the cold weather days or all of the cold weather days. One of skill in the art will recognize other ways to determine a simulated energy usage for comparison among cold weather days.

The load prediction algorithm 308 may select neutral weather days that have a simulated energy usage that is within a specified percentage of some metric, such as highest simulated energy usage, midpoint simulated energy usage, etc. For example the load prediction algorithm 308 may select neutral weather days with a simulated energy usage among the highest simulated energy usage for neutral weather days. In one embodiment, the load prediction algorithm 308 selects neutral weather days with simulated energy usages within the highest 20% of simulated energy usages among neutral weather days. The load prediction algorithm 308 may select a comparison period during a particular season, such as winter or may simply choose cold and neutral weather days among all days in the specified period.

In one embodiment, the load prediction algorithm 308 determines 608 if the simulated premises include an electric heating unit if the difference between simulated energy usage for cold weather days and neutral weather days is above an electric heater load threshold. If the load prediction algorithm 308 determines 608 that the difference is above the electric heater load threshold, the load prediction algorithm 308 determines 610 that the simulated premises include an electric heating unit, and the load prediction algorithm 308 ends. If the load prediction algorithm 308 determines 608 that the difference is not above the electric heater load threshold, the load prediction algorithm 308 determines 614 that the simulated premises do not include an electric heating unit, and the load prediction algorithm 308 ends.

In another embodiment, the load prediction algorithm 308 determines 608 if the simulated premises include an electric heating unit if the simulated energy usage for cold weather days is greater than the simulated energy usage for neutral weather days. If the load prediction algorithm 308 determines 608 that the simulated energy usage for cold weather days is greater than the simulated energy usage for neutral weather days, the load prediction algorithm 308 determines 610 that the simulated premises include an electric heating unit, and the load prediction algorithm 308 ends. If the load prediction algorithm 308 determines 608 that the simulated energy usage for cold weather days is less than the simulated energy usage for neutral weather days, the load prediction algorithm 308 determines 614 that the simulated premises do not include an electric heating unit, and the load prediction algorithm 308 ends.

Figure 6B:
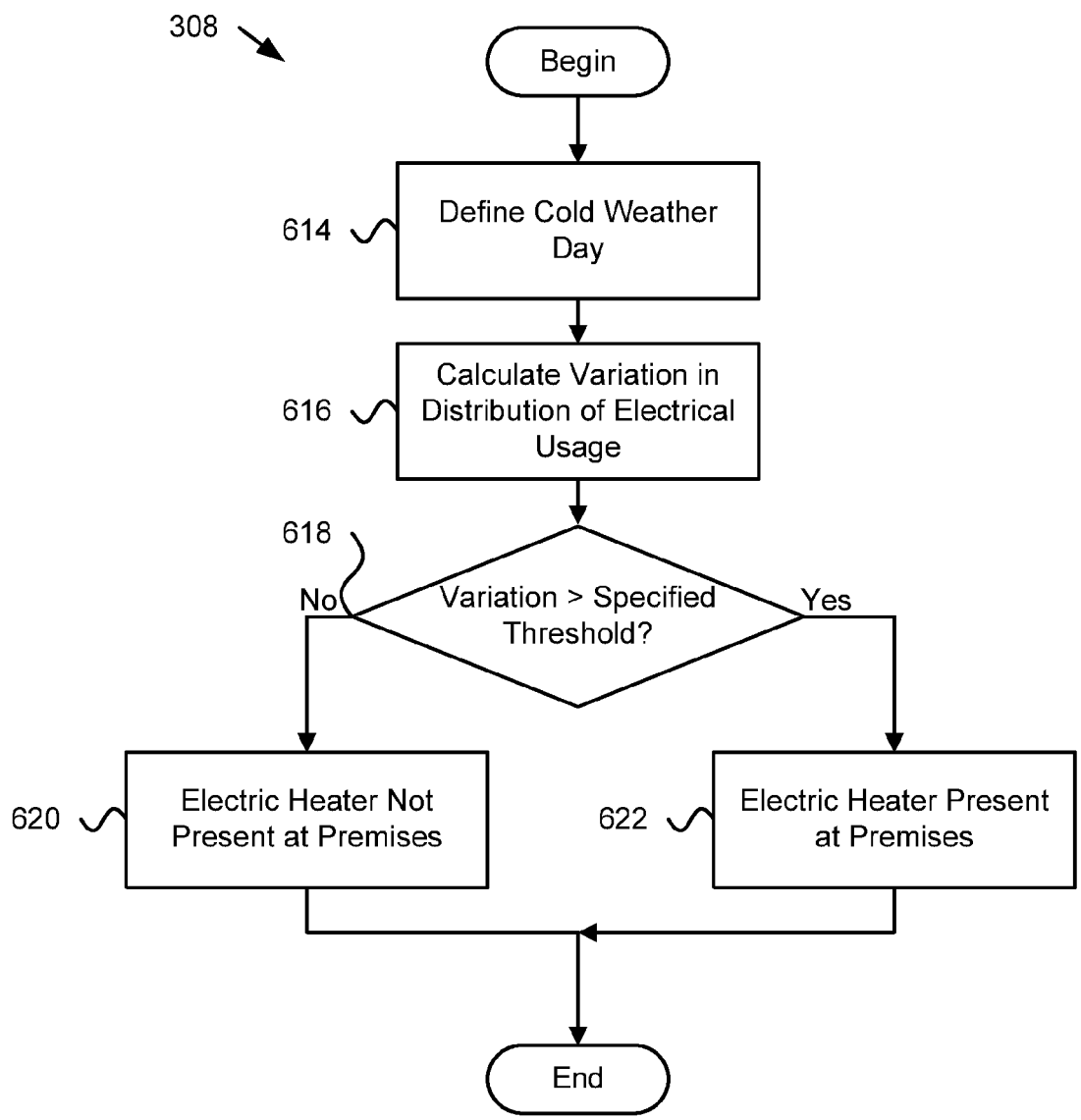
FIG. 6B is a schematic flow chart diagram illustrating another embodiment of a load prediction algorithm for determining whether an electric heating unit is present on a simulated premises in accordance with the present invention.

FIG. 6B is a schematic flow chart diagram illustrating another embodiment of a load prediction algorithm 308 for determining whether an electric heating unit is present on a simulated premises in accordance with the present invention. The load prediction algorithm 308 begins by defining 614 criteria for a cold weather day during specified hours of a day. For example, a cold weather day may be a day below a certain temperature during the specified hours. In another embodiment, a cold weather day may use a combination of temperature, humidity, and/or cloudiness to define a cold weather day during the specified hours. In one embodiment the specified hours may be at least one of breakfast hours (i.e., about 5:00 AM through about 9:00 AM) and dinner hours (i.e., about 6:00 PM through about 9:00 PM). In other embodiments, the specified hours may include a single breakfast time hour or a single dinner time hour.

The load prediction algorithm 308 calculates 616 a variation in a distribution of simulated electrical usages during the specified hours for a plurality of cold weather days. For example, in certain embodiments, an average of the simulated electrical usages during the specified hours of the plurality of cold weather days and the variation is the standard deviation from the average. One of skill in the art will recognize other ways of calculating 616 the variation in the distribution of electrical usages during the specified hours in the cold weather days.

The prediction algorithm 308 determines 618 whether the variation in the average of the electrical usages during the specified hours is greater than a specified threshold. If the load prediction algorithm 308 determines 620 that the variation in the average of the electrical usages during the specified hours is less than a specified threshold, the load prediction algorithm 308 determines that the premises does not include the electric heating unit and the load prediction algorithm 308 ends. If the load prediction algorithm 308 determines 622 that the variation in the average of the electrical usages during the specified hours is greater than a specified threshold, the load prediction algorithm 1308 determines that the premises includes the electric heating unit and the load prediction algorithm 1308 ends.

In an exemplary embodiment, the load prediction algorithm 308 defines 614 a cold weather day as a day wherein an hourly outdoor temperature during a breakfast hour is below a specified threshold. In such an embodiment, the load prediction algorithm 308 calculates 616 a standard deviation in energy usages during the breakfast hour for a distribution of all days that are determined 614 to be a cold weather day during breakfast hours. The standard deviation in energy usages during the breakfast hour is calculated 616 for all of the multiplicity of cold weather breakfast days. In certain embodiments the load prediction algorithm 308 also defines 614 a cold weather day as a day wherein an hourly outdoor temperature during a dinner hours in a day. The cold weather day during the dinner hours may be a day having an hourly outdoor temperature below a specified threshold during dinner hours. The load prediction algorithm 308 calculates 616 the standard deviation in energy usages for the distribution of all cool dinner hours in the multiplicity of cool dinner days. The load prediction algorithm 308 determines that the simulated premises includes an electrical heating unit if the breakfast standard deviation is greater than a specified limit or if the dinner standard deviation is greater than a specified limit.

In the exemplary embodiment, the parameters that control the performance of the load prediction algorithm 308 for an electrical heating unit may include the specified breakfast hours, the specified temperature threshold during breakfast hours, the specified dinner hours, the specified temperature threshold during dinner hours, the specified limit for the breakfast standard deviation, and the specified limit for the dinner standard deviation. In one embodiment, the parameters that define the acceptable performance of the load prediction algorithm 308 for an electrical heating unit may be specific for a particular electric utility.

Figure 7:
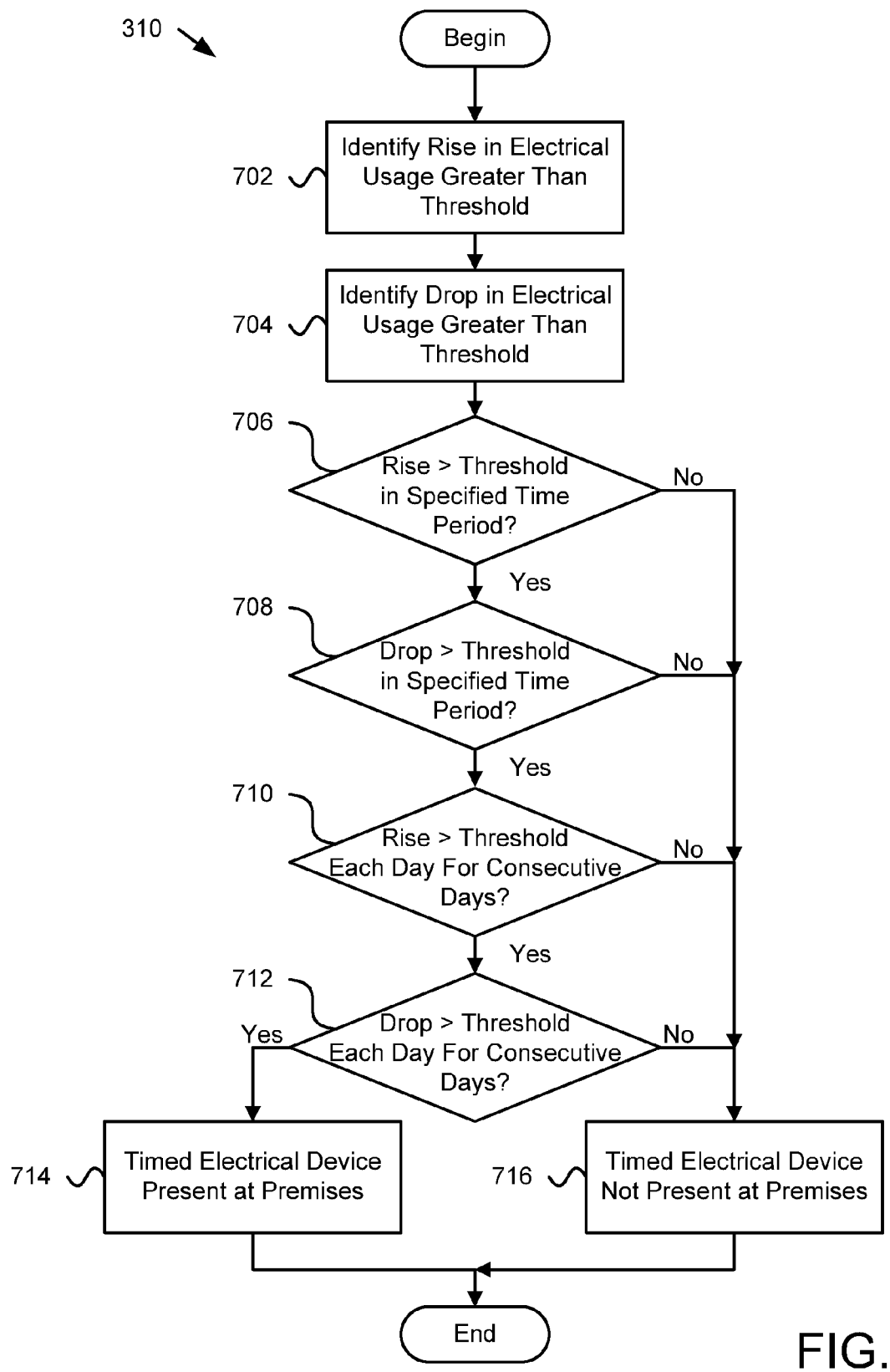
FIG. 7 is a schematic flow chart diagram illustrating one embodiment of a load prediction algorithm for determining whether a timed electrical device is present on a premises in accordance with the present invention.

FIG. 7 is a schematic flow chart diagram illustrating one embodiment of a load prediction algorithm 310 for determining whether a timed electrical load is present on a simulated premises in accordance with the present invention. The load prediction algorithm 310 begins and the load prediction algorithm 310 identifies 702 a rise in an hourly simulated electrical usage of the electrical energy usage record having a magnitude greater than a specified threshold. The timed electrical load, in various embodiments, may be pool pumping equipment, timed lighting, and the like. The rise in hourly simulated electrical usage typically corresponds with turning on electrical equipment and may potentially be a timer turning on a timed electrical load. Typically the specified threshold is selected to reflect an expected size of the timed electrical load. For example, if a pool pump is expected to be greater than 2 kilowatt ("kW"), the specified threshold may be set at 1 kW or some other value less than 2 kW. Typically the load prediction algorithm 310 identifies 702 rises and identifies 704 drops within a 24-hour period, but shorter or longer time periods may be used depending upon the timed electrical load.

The load prediction algorithm 310 identifies 704 a drop in an hourly simulated electrical usage of the simulated electrical energy usage record having a magnitude greater than the specified threshold. The load prediction algorithm 310 determines 706 if the rise in the hourly simulated electrical usage having a magnitude greater than the specified threshold occurs during a specified time period. For example, for timed outdoor lighting, the specified time period may be in the evening hours, maybe between 5:00 PM and 10:00 PM. If the load prediction algorithm 310 determines 708 that the rise in the hourly simulated electrical usage having a magnitude greater than the specified threshold occurs during a specified time period, the load prediction algorithm 310 determines 708 if the drop in the hourly simulated electrical usage having a magnitude greater than the specified threshold occurs during a specified time period. For example, for timed outdoor lighting, the specified time period for a drop in electrical load may be in the late night hours or early morning, maybe between 11:00 PM and 7:00 AM.

If the load prediction algorithm 310 determines 708 that the drop in the hourly simulated electrical usage having a magnitude greater than the specified threshold occurs during a specified time period, the load prediction algorithm 310 determines 710 if the rise in the simulated electrical load occurs at approximately a same starting time in a threshold number of consecutive days. For example, the threshold number of days may be 30 days, or some other amount of days that typically indicates a repeated pattern of a timed electrical load. The rise may vary due to various reasons, such as sunset changes over time. If the load prediction algorithm 310 determines 710 that the rise in the simulated electrical load occurs at approximately a same starting time in a threshold number of consecutive days, the load prediction algorithm 310 determines 712 if the drop in the hourly simulated electrical usage having a magnitude greater than the specified threshold occurs at approximately a same finishing time in the threshold number of consecutive days. Typically the consecutive number of days for a rise should approximately correspond to the consecutive number of days for a drop.

If the load prediction algorithm 310 determines 712 that the drop in the hourly simulated electrical usage having a magnitude greater than the specified threshold occurs at approximately a same finishing time in the threshold number of consecutive days, the load prediction algorithm 310 determines 714 that the simulated premises includes the particular timed electric load being predicted, and the algorithm 310 ends. If the load prediction algorithm 310 determines 706, 708, 710, 712 that the tested conditions are not met, the load prediction algorithm 310 determines 714 that the particular timed electric load is not present at the simulated premises, and the algorithm 310 ends.

In an exemplary embodiment, load prediction algorithm 310 for a timed electrical device requires that a specified number of predefined days have rises in energy usage with a magnitude greater than a specified threshold and falls in energy usage with a magnitude greater than a specified threshold load prediction algorithm 310 may also require that the energy usages between the rises and the falls are greater than a specified threshold and may require that the rise in energy usage occurs at approximately the same starting time of day in the specified number of predefined days that the fall in energy usage occurs at approximately the same finishing time of day in the specified number of predefined days.

In one embodiment, a load prediction algorithm 310 is an algorithm for detecting electrical pumping equipment for a swimming pool. In such an embodiment, the parameters that control the performance of the load prediction algorithm 310 for detecting electrical pumping equipment may include the predefined days, specified thresholds, and specified limits on starting and finishing times that typical for electrical pumping equipment for a swimming pool.

In another embodiment, the load prediction algorithm 310 is an algorithm for detecting timed lighting. In such an embodiment, the parameters that control the performance of the load prediction algorithm 310 for the timed lighting may include predefined days, specified thresholds, and specified limits on starting and finishing times that are typical for timed lighting.

In the exemplary embodiment, the parameters that control the performance of the load prediction algorithm 310 for a timed electrical device may include the predefined days, the specified number of predefined days, the specified thresholds, and specified limits on starting and finishing times. The parameters that define the acceptable performance of the load prediction algorithm 310 for a timed electrical device may be specific for a particular electric utility.

Figure 8:
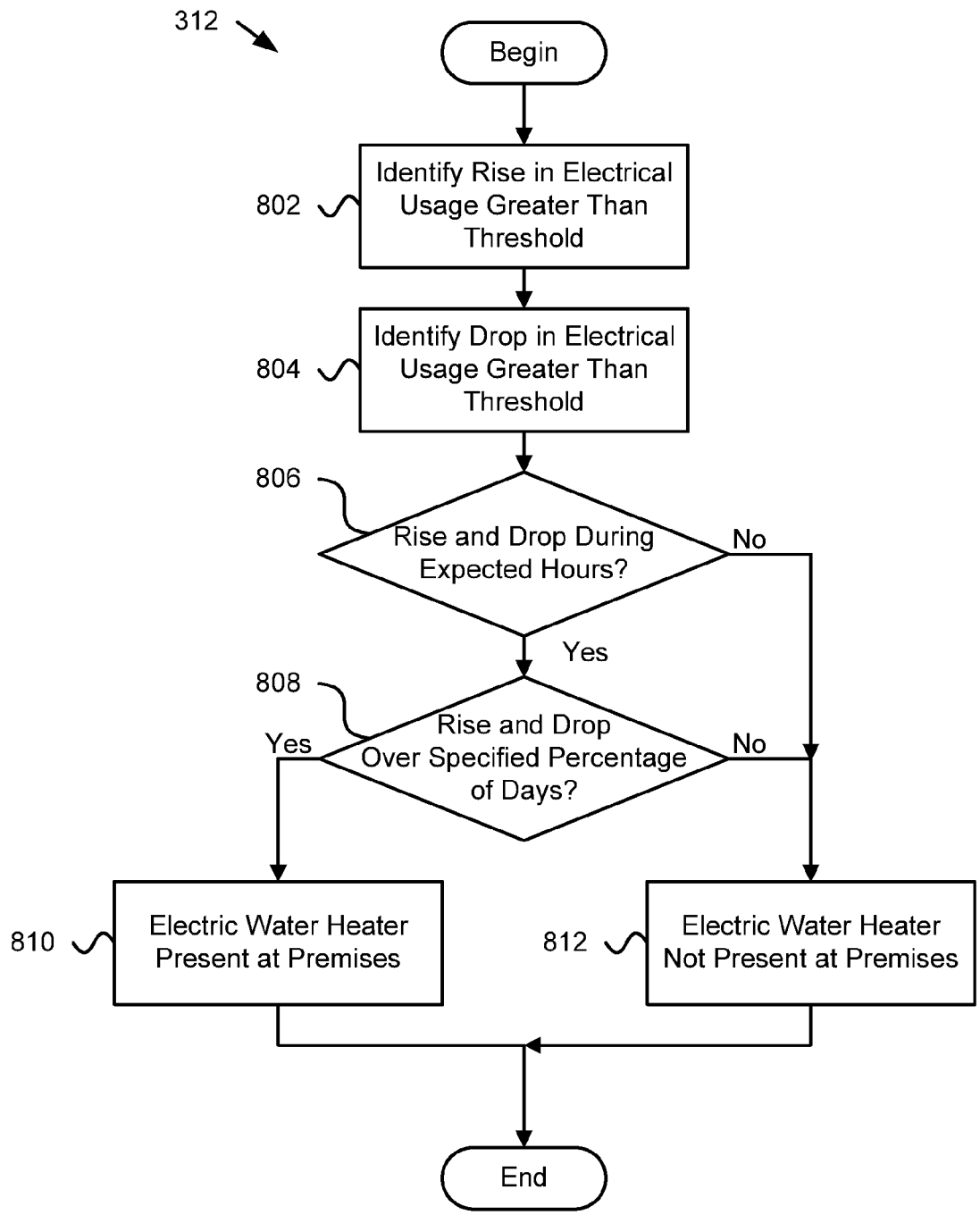
FIG. 8 is a schematic flow chart diagram illustrating one embodiment of a load determination algorithm for determining whether an electric water heater is present on a premises in accordance with the present invention.

FIG. 8 is a schematic flow chart diagram illustrating one embodiment of a load prediction algorithm 312 for determining whether an electric water heater is present on a simulated premises in accordance with the present invention. The load prediction algorithm 312 starts and the load prediction algorithm 312 identifies 802 a rise in a simulated hourly electrical usage of the electrical energy usage record having a magnitude greater than a specified threshold. The specified threshold is typically set to a value below an expected electrical load for an electric water heater. For example, the specified threshold may be set to 90% of the expected electrical load for an electric water heater.

The load prediction algorithm 312 identifies 804 a drop in an hourly simulated electrical usage having a magnitude greater than the specified threshold. The load prediction algorithm 312 determines 806 if the rise in the simulated electrical usage that has a magnitude greater than the specified threshold and the drop in the simulated electrical usage that has a magnitude greater than the specified threshold occurs within an expected usage time for a water heater. For example, an electric water heater may operate at various times throughout the day and night, while other similar loads, such as an electric clothes dryer, typically would not often occur in the middle of the night. The expected usage time may be selected in the middle of the night or at early morning hours (i.e., before about 9:00 AM) so that the simulated electrical load is not confused with a simulated electric clothes dryer load.

If the load prediction algorithm 312 determines 806 that the rise in the simulated electrical usage that has a magnitude greater than the specified threshold and the drop in the simulated electrical usage that has a magnitude greater than the specified threshold occurs within the expected usage time for a water heater, the load prediction algorithm 312 determines 808 if the rise in the electrical usage that has a magnitude greater than the specified threshold and the drop in the simulated electrical usage that has a magnitude greater than the specified threshold occurs in a specified percentage of a number of days during the specified time period. A water heater may not turn on during the specified time every day so the load prediction algorithm 806 may require a rise and drop during the expected usage time for a specified percentage of days less than 100%. However, in another embodiment, the specified percentage of days may be 100%. The specified number of days typically is chosen to be enough days to indicate a pattern for an electric water heater rather than another electrical load that may change over time.

If the load prediction algorithm 312 determines 808 that the rise in the simulated electrical usage that has a magnitude greater than the specified threshold and the drop in the simu- lated electrical usage that has a magnitude greater than the specified threshold occurs in a specified percentage of a number of days during the specified time period, the load prediction algorithm 312 determines 810 that an electric water heater is present at the simulated premises, and the algorithm 312 ends. If the load prediction algorithm 312 determines 806, 808 that the stated conditions are not met, the load prediction algorithm 312 determines 812 that an electric water heater is not present at the simulated premises, and the algorithm 312 ends.

Figure 9A:
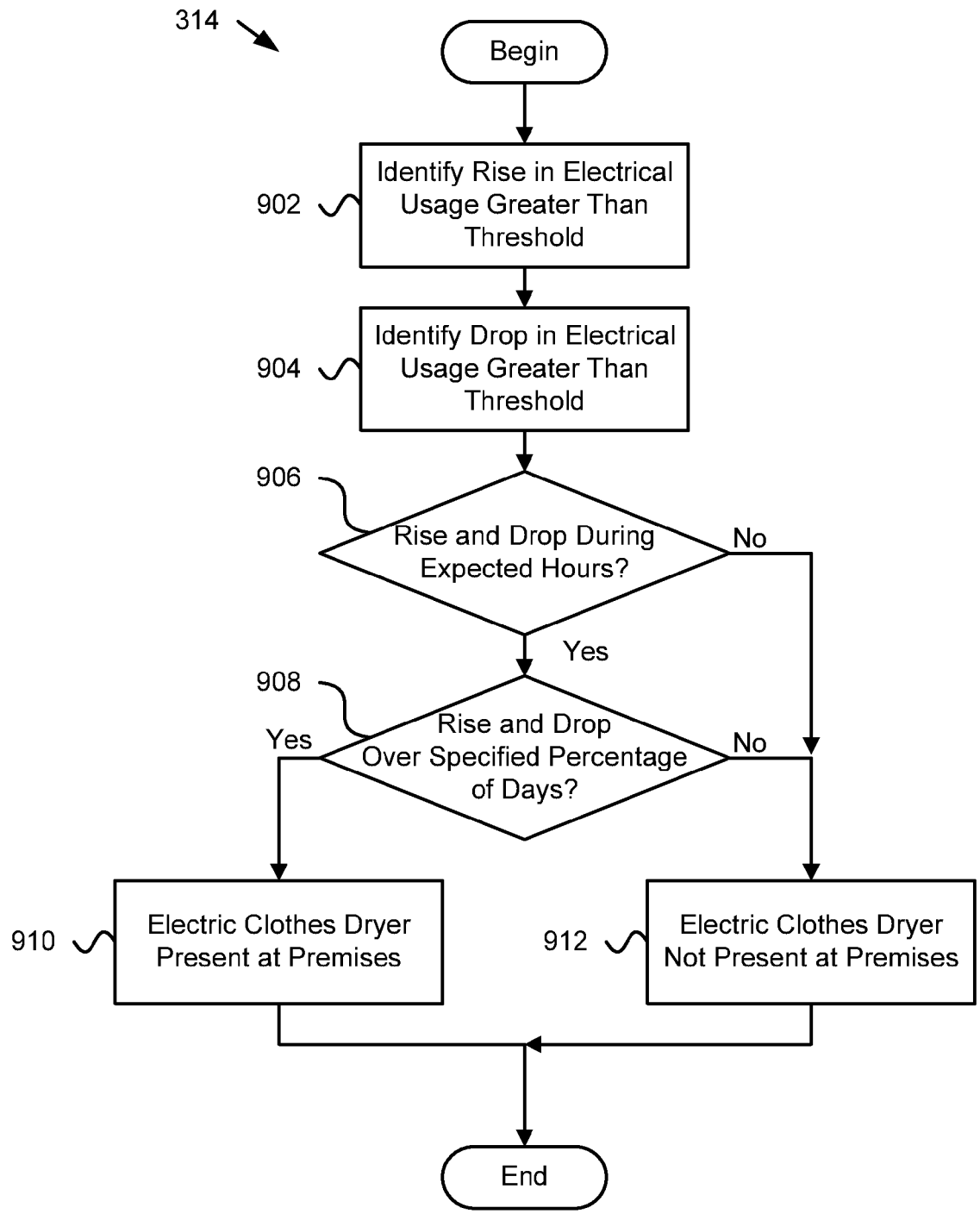
FIG. 9A is a schematic flow chart diagram illustrating one embodiment of a load prediction algorithm for determining whether an electric clothes dryer is present on a premises in accordance with the present invention.

FIG. 9A is a schematic flow chart diagram illustrating one embodiment of a load prediction algorithm 314 for determining whether an electric clothes dryer is present on a simulated premises in accordance with the present invention. The load prediction algorithm 314 starts and the load prediction algorithm 314 identifies 902 a rise in an hourly simulated electrical usage having a magnitude greater than a specified threshold. The load prediction algorithm 314 identifies 904 a drop in an hourly simulated electrical usage having a magnitude greater than the specified threshold. The specified threshold is typically the same for the rise and drop and corresponds to an expected electric clothes dryer load. For example, the specified threshold may be set to 85% (or other percentage) of an expected electrical load for an electric dryer.

The load prediction algorithm 314 determines 908 if the rise in the hourly simulated electrical usage having a magnitude greater than the specified threshold and the drop in the hourly simulated electrical usage having a magnitude greater than the specified threshold occurs within an expected usage time for an electric clothes dryer. In one embodiment, the expected usage time for an electric clothes dryer is during typical hours when users are awake, and may also include a time just after users would be asleep. For example, the expected usage time may be between 7:00 AM and midnight. Selecting a time during waking hours may be beneficial to distinguish an electrical load for an electric clothes dryer from other electric loads, such as an electric water heater.

If the load prediction algorithm 314 determines 908 that the rise in the hourly simulated electrical usage having a magnitude greater than the specified threshold and the drop in the hourly simulated electrical usage having a magnitude greater than the specified threshold occurs within an expected usage time for an electric clothes dryer, the load prediction algorithm 314 determines 908 that the rise in the simulated electrical usage that has a magnitude greater than the specified threshold and the drop in the simulated electrical usage that has a magnitude greater than the specified threshold occurs in a specified percentage of a number of days during the specified time period, the load prediction algorithm 314 determines 910 that an electric clothes dryer is present at the simulated premises, and the algorithm 314 ends. If the load prediction algorithm 314 determines 906, 908 that the stated conditions are not met, the load prediction algorithm 314 determines 912 that an electric clothes dryer is not present at the simulated premises, and the algorithm 314 ends.

Figure 9B:
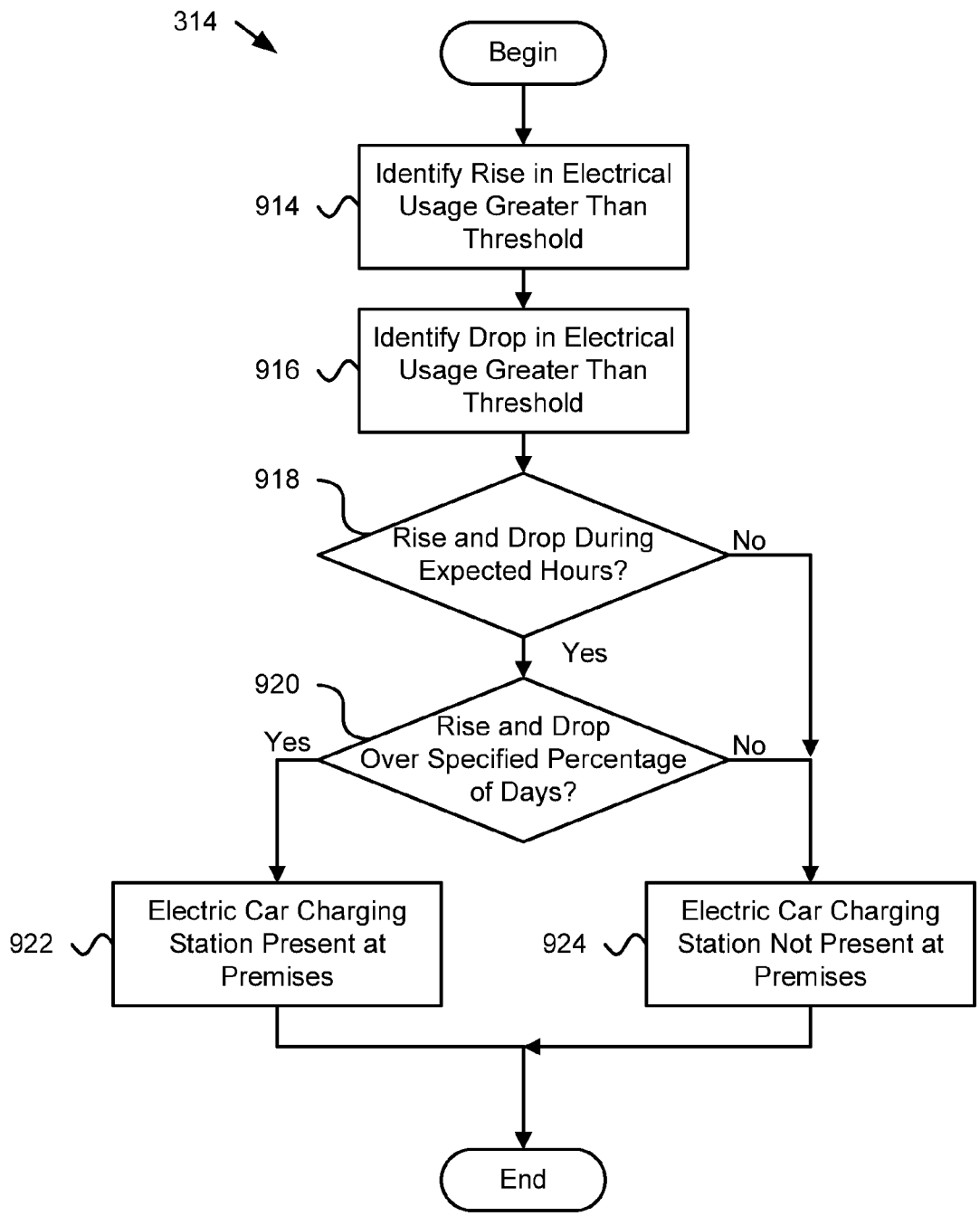
FIG. 9B is a schematic flow chart diagram illustrating one embodiment of a load prediction algorithm for determining whether an electric car charging station is present on a simulated premises in accordance with the present invention.

FIG. 9B is a schematic flow chart diagram illustrating one embodiment of a load prediction algorithm 326 for determining whether an electric car charging station is present on a simulated premises in accordance with the present invention. In certain embodiments the load prediction algorithm 326 for determining whether an electric car charging station is present on a simulated premises includes steps substantially similar to the steps for the load prediction algorithm 314 for determining whether an electric clothes dryer is present on a simulated premises.

The load prediction algorithm 326 starts and the load prediction algorithm 326 identifies 914 a rise in an hourly simulated electrical usage having a magnitude greater than a specified threshold. The load prediction algorithm 326 identifies 916 a drop in an hourly simulated electrical usage having a magnitude greater than the specified threshold. The specified threshold is typically the same for the rise and drop and corresponds to an expected electric car charging station load. For example, the specified threshold may be set to 85% (or other percentage) of an expected electrical load for an electric car charging station.

The load prediction algorithm 326 determines 918 if the rise in the hourly simulated electrical usage having a magnitude greater than the specified threshold and the drop in the hourly simulated electrical usage having a magnitude greater than the specified threshold occurs within an expected usage time for an electric car charging station. In one embodiment, the expected usage time for an electric car charging station is during typical evening or night time hours when users are home. For example, the expected usage time may be between about 6:00 PM and 6:00 AM.

If the load prediction algorithm 326 determines 918 that the rise in the hourly simulated electrical usage having a magnitude greater than the specified threshold and the drop in the hourly simulated electrical usage having a magnitude greater than the specified threshold occurs within an expected usage time for an electric car charging station and the load prediction algorithm 326 determines 920 that the rise in the simulated electrical usage that has a magnitude greater than the specified threshold and the drop in the simulated electrical usage that has a magnitude greater than the specified threshold occurs in a specified percentage of a number of days during the specified time period, the load prediction algorithm 326 determines 922 that an electric car charging station is present at the simulated premises, and the algorithm 326 ends. If the load prediction algorithm 326 determines 918, 920 that the stated conditions are not met, the load prediction algorithm 326 determines 924 that an electric car charging station is not present at the simulated premises, and the algorithm 326 ends.

In exemplary embodiments, the load prediction algorithm 312 for an electric water heater, the load prediction algorithm 314 for an electric clothes dryer, and the load prediction algorithm 326 for an electric car charging station may require a rise in energy usage to have a magnitude greater than a specified threshold followed by a fall in energy usage to have a magnitude greater than a specified threshold. In certain embodiments, the load prediction algorithms 312, 314, and 326 require that the rise in energy usage and the fall in energy usage occur within a specified time period or time periods in a day and requires that at least a specified percentage of predefined days includes the rise in energy usage and the fall in energy usage.

In exemplary embodiments, the parameters that control the performance of the load prediction algorithms 312, 314, and 326 may include the specified thresholds, the specified time period or time periods, the specified percentage of predefined days, and the predefined days. In certain embodiments, the values of the control parameters that define the acceptable performance of a particular load prediction algorithm 312, 314, and 326 are dependent on whether the load prediction algorithm 312, 314, and 326 is designed for an electric water heater, an electric clothes dryer, or for an electric vehicle charging station and may be specifically for a particular electric utility.

Figure 10:
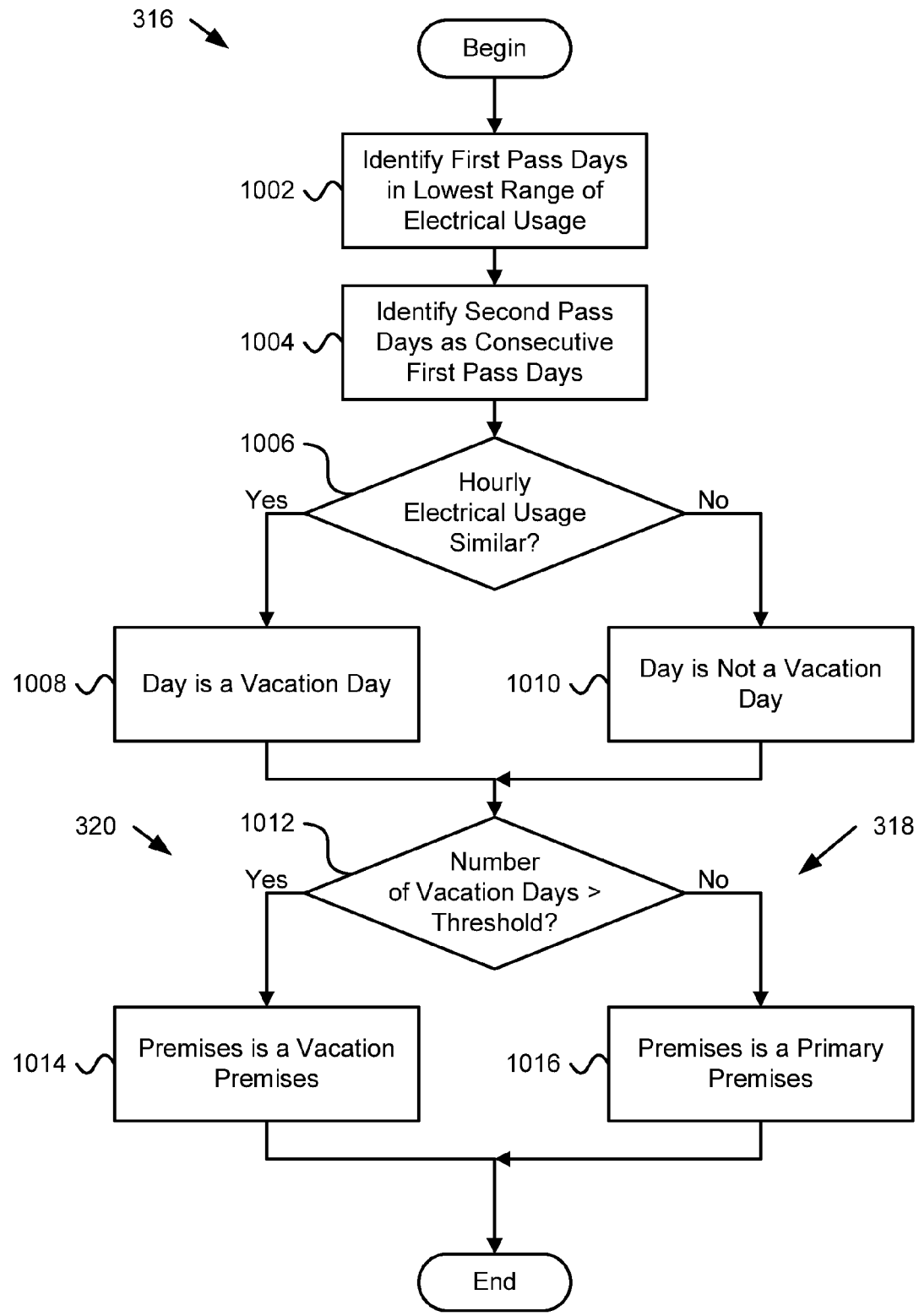
FIG. 10 is a schematic flow chart diagram illustrating one embodiment of a load prediction algorithm for identifying vacation days and for determining whether a premises is a primary premises or a vacation premises in accordance with the present invention.

FIG. 10 is a schematic flow chart diagram illustrating one embodiment of load prediction algorithms 316, 318, 320 for identifying vacation days and for determining whether a simulated premises is a primary premises or a vacation premises in accordance with the present invention. The vacation days load prediction algorithm 316 starts and identifies 1002 a plurality of first pass vacation days as days within the specified period having daily simulated electrical usage ranges at the simulated premises that are in a lowest specified percent of all daily simulated electrical usage ranges for days within the specified period. The daily simulated electrical usage range typically includes a difference between a maximum simulated electrical usage for a day and a minimum simulated electrical usage for the day. The vacation days load prediction algorithm 316 may sort simulated electrical usage ranges for each day in the specified period by an amount corresponding to the difference between the maximum and minimum simulated electrical usage and may order the simulated electrical usage ranges from largest to smallest. The vacation days load prediction algorithms 316 may then determine that first pass vacation days are the days within the lowest 20% of simulated electrical usage ranges.

The vacation days load prediction algorithm 316 identifies 1004 a plurality of second pass vacation days as first pass vacation days that are consecutive. The vacation days load prediction algorithm 316 identifies 1006 a plurality of third pass vacation days as second pass vacation days that have patterns of hourly simulated electrical usage throughout a day that are substantially similar. The vacation days load prediction algorithms 316 may use a variety of methods to determine that patterns of hourly simulated electrical usage throughout a day that are substantially similar.

The vacation days load prediction algorithm 316 may, for example, determine hourly simulated electrical usages of a vacation day and compare the hourly simulated electrical usages with hourly simulated electrical usages of a day that is a nearest neighbor. The nearest neighbor, in one embodiment, is a vacation day with a simulated electrical usage that is closest to the vacation day being tested. Other embodiments of a nearest neighbor may include comparing average simulated electrical usage, may include more than just vacation days, etc. One of skill in the art will recognize other ways to identify a nearest neighbor. Hourly differences in simulated electrical usage may be squared and summed and compared to the sum of squares of the nearest neighbor or other consecutive second pass days.

The vacation days load prediction algorithm 316 may then determine 1008 that a day is a vacation day if the vacation days load prediction algorithm 316 determines 1006 that the day is a third pass day such that patterns of simulated electrical usage throughout the second pass day are substantially similar, or if the vacation days load prediction algorithm 316 determines 1006 that the day is not a third pass day, the vacation days load prediction algorithm 316 determines 1010 that the day is not a vacation day. One of skill in the art will recognize other ways to determine if a day has patterns of hourly simulated electrical usage throughout a day that are substantially similar.

The primary premises load prediction algorithm 318 uses the results of the vacation days load prediction algorithm 316 and determines 1012 if a number of the one or more vacation days taken by the one or more users of the simulated premises is less than a specified threshold. Primary premises are a dwelling where residents spend a majority of time. If the primary premises load prediction algorithm 318 determines 1012 that a number of the one or more vacation days taken by the one or more users of the simulated premises is less than a specified threshold, the primary premises load prediction algorithm 318 determines 1016 that the simulated premises is a primary premises and the algorithm 318 ends.

The vacation premises load prediction algorithm 320 uses the results of the vacation days load prediction algorithm 316 and determines 1012 if a number of the one or more vacation days taken by the one or more users of the simulated premises is greater than a specified threshold. Vacation premises are a dwelling where residents spend less than a majority of time, for example a summer home, a cabin, etc. If the vacation premises load prediction algorithm 320 determines 1012 that a number of the one or more vacation days taken by the one or more users of the simulated premises is greater than a specified threshold, the vacation premises load prediction algorithm 320 determines 1014 that the simulated premises is a vacation premises and the algorithm 320 ends. Note that the specified number of vacation days for the primary premises load prediction algorithm 318 and the vacation premises load prediction algorithm 320 may be different or may be the same.

In an exemplary embodiment, load prediction algorithms 316, 318, 320 for identifying vacation days and for determining whether a simulated premises is a primary premises or a vacation premises begin by identifying first-pass days, second-pass days, and third-pass days in an energy usage record. A first-pass day has its daily range of hourly energy usage in a lowest specified percentage of all daily ranges of hourly energy usages. Second-pass days are those days that belong to clusters of two or more consecutive first-pass days. Each hourly energy usage is averaged over all second-pass days to produce the second-pass average hourly energy usages.

A third-pass day is one for which the sum of squares of, or absolute value of, the sequential differences in hourly energy usages is less than a specified multiple of the sum of squares of, or absolute value of, the sequential differences in second-pass average hourly energy usages. A distance between any two days is defined as the square root of the sum of squares of, or absolute value of, the differences between the energy usage during each hour of the two days. The nearest neighbor of a third-pass day is another day in the actual energy usage record that has the smallest distance to the third-pass day. The nearest neighbors of all third-pass days are identified and the average and standard deviation for the distribution of distances between all third-pass days and their nearest neighbors are calculated. A vacation day is identified as a third-pass day that has a nearest neighbor distance that is no higher than a specified multiple of the standard deviation above the average. A vacation day may also be identified as a third-pass day that has a nearest neighbor distance that is no lower than a specified multiple of the standard deviation below the average.

A specified threshold for the number of vacation days is used to define a residence as a primary residence or a vacation residence. The load prediction algorithm 318 for a primary residence includes the load prediction algorithm 316 for vacation days with the further requirement that the number of vacation days is less than or equal to the specified threshold. The load prediction algorithm 320 for a vacation residence includes the load prediction algorithm 316 for vacation days with the further requirement that the number of vacation days is greater than the specified threshold.

In the exemplary embodiment, the parameters that control the performance of the load prediction algorithms 316, 318, and 320 include the lowest specified percentage, the specified multiple of the sum of squares of, or absolute value of, the sequential differences, the specified multiples of the standard deviation, and the specified threshold that identifies a residence as a primary residence or a vacation residence. The values of the parameters that define the acceptable performance of the load prediction algorithms 316, 318, and 320 may be specific for a particular electric utility.

Figure 11A:
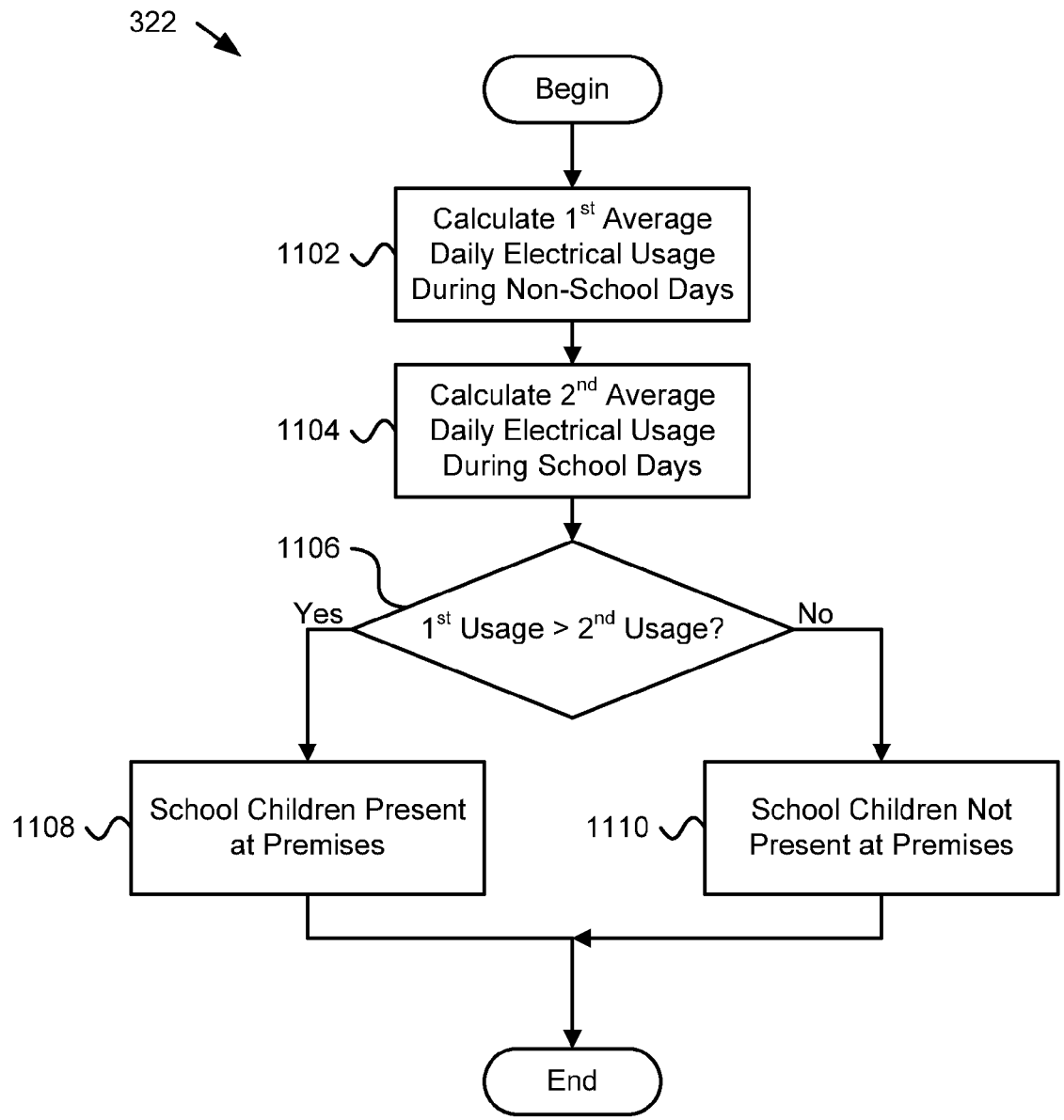
FIG. 11A is a schematic flow chart diagram illustrating one embodiment of a load prediction algorithm for determining whether school children are present at premises in accordance with the present invention.

FIG. 11A is a schematic flow chart diagram illustrating one embodiment of a load prediction algorithm 322 for determining whether school children are present at simulated premises in accordance with the present invention. The load prediction algorithm 322 begins and calculates 1102 a first average daily simulated electrical usage for a specified range of time during days that include a specified percentage of non-school days. For example, non-school days may be during summer, during weekends, during holidays, etc. In another embodiment, the load prediction algorithm 322 calculates 1102 maximum daily simulated electrical usage for non-school days.

The load prediction algorithm 322 calculates 1104 a second average daily simulated electrical usage for a specified range of time that include a specified percentage of school days. In another embodiment, the load prediction algorithm 322 calculates 1104 maximum daily simulated electrical usage for school days, for example when one or more local schools are in session. The specified range of time for school days and non-school days may be certain hours of a day. For example, the specified range of time for school days may include hours when schools are in session.

The load prediction algorithm 322 determines 1106 if the first average is greater than the second average by a specified amount. The specified amount may be an expected additional electrical usage that may be attributed to school children's usage of electrical equipment in a home. If the load prediction algorithm 322 determines 1106 that the first average is greater than the second average by a specified amount, the load prediction algorithm 322 determines 1108 that school children are present at the simulated premises, and the algorithm 322 ends. If the load prediction algorithm 322 determines 1106 that the first average is less than the second average by a specified amount, the load prediction algorithm 322 determines 1110 that school children are not present at the simulated premises, and the algorithm 322 ends.

In an exemplary embodiment, load prediction algorithm 322 for determining whether school children are present at simulated premises includes calculating a first average daily energy usage for a specified range of time during days that have a specified amount or percentage of non-school days. The load prediction algorithm 322 also calculates a second average daily energy usage for a specified range of time for days that have a specified amount or percentage of school days. A residence is identified as being used by one or more school-aged children as if the first average is larger than the second average by a specified amount or percentage.

In the exemplary embodiment, the parameters that control the performance of the load prediction algorithm 322 include the specified ranges of time and the specified amounts or percentages. The values of the parameters that define the acceptable performance of the load prediction algorithm 322 may be specifically for a particular electric utility.

Figure 11B:
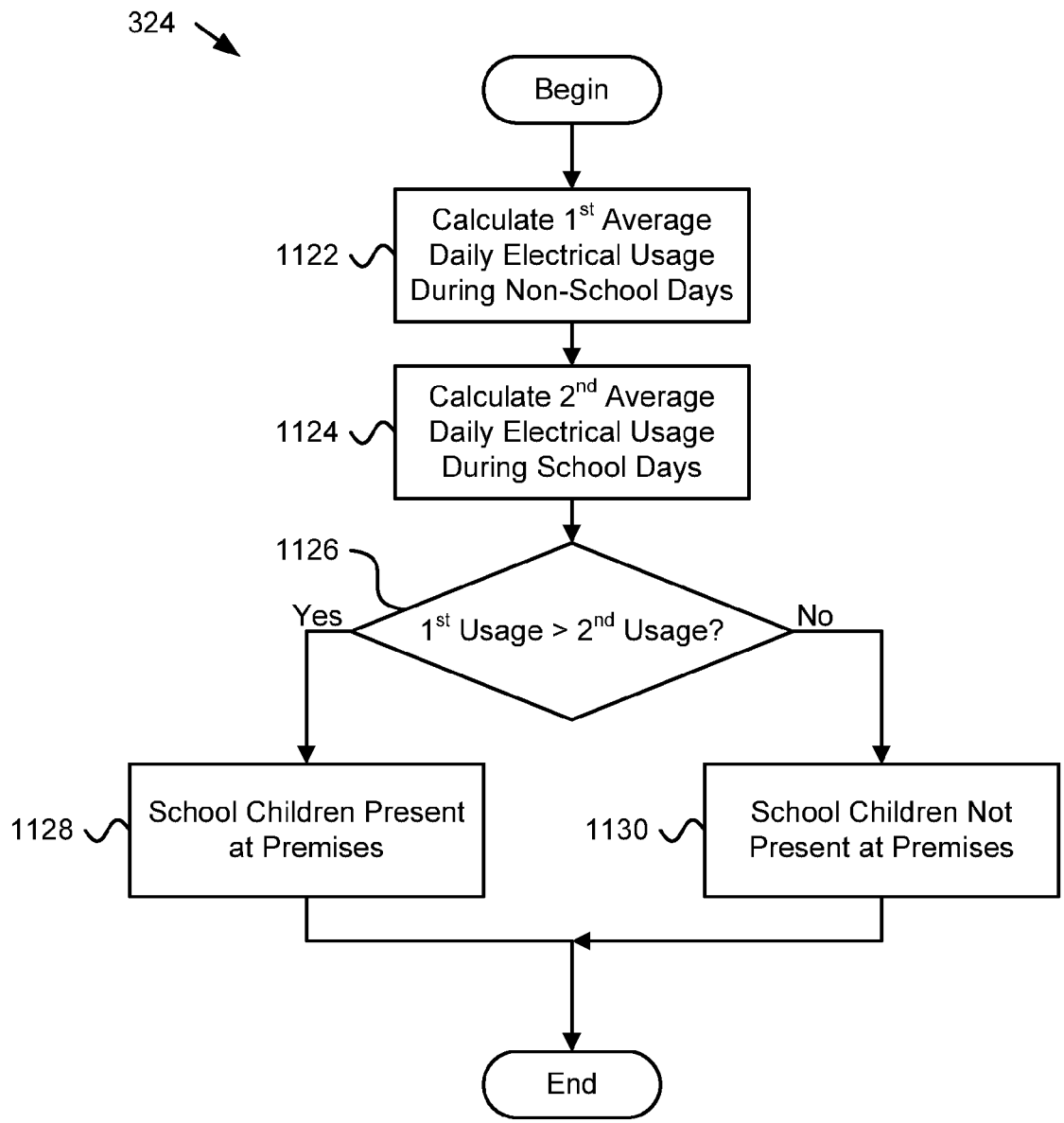
FIG. 11B is a schematic flow chart diagram illustrating one embodiment of a load prediction algorithm for determining whether adults are present at simulated premises during weekday daytime hours in accordance with the present invention.

FIG. 11B is a schematic flow chart diagram illustrating one embodiment of a load prediction algorithm 324 for determining whether adults are present at simulated premises during weekday daytime hours in accordance with the present invention. The load prediction algorithm 324 begins and calculates 1122 a first average daily simulated electrical usage for a specified range of time during days that include a specified percentage of non-work days. For example, non-work days may be during weekends, during holidays, etc. In another embodiment, the load prediction algorithm 324 calculates 1122 maximum daily simulated electrical usage for non-work days.

The load prediction algorithm 324 calculates 1124 a second average daily simulated electrical usage for a specified range of time that include a specified percentage of work days. In another embodiment, the load prediction algorithm 324 calculates 1124 maximum daily simulated electrical usage for work days, for example non-holiday and non-weekend days. The specified range of time for work days and non-work days may be certain hours of a day. For example, the specified range of time for work days may include hours adults typically work (i.e., 9:00 AM to 5:00 PM).

The load prediction algorithm 324 determines 1126 if the first average is greater than the second average by a specified amount. The specified amount may be an expected additional electrical usage that may be attributed to an adult's usage of electrical equipment in a home. If the load prediction algorithm 324 determines 1126 that the first average is greater than the second average by a specified amount, the load prediction algorithm 324 determines 1128 that one or more adult's are present at the simulated premises during weekday daytime hours, and the algorithm 324 ends. If the load prediction algorithm 324 determines 1126 that the first average is less than the second average by a specified amount, the load prediction algorithm 324 determines 1130 that adult's are not present at the simulated premises during weekday daytime hours, and the algorithm 324 ends.

In an exemplary embodiment, the load prediction algorithm 324 for determining whether adults are present at simulated premises during weekday daytime hours includes calculating a first average daily energy usage for a specified range of time for weekdays and calculating a second average daily energy usage for a specified range of times for weekend days. A use of a residence during weekday daylight hours is identified as a simulated premises for which the first average is different from the second average by a specified amount or percentage.

In the exemplary embodiment, the parameters that control the performance of the load prediction algorithm 324 may include the specified ranges of time and the specified amounts or percentages. The values of the parameters that define the acceptable performance of the load prediction algorithm 324 may be specific for a particular electric utility.

Figure 12:
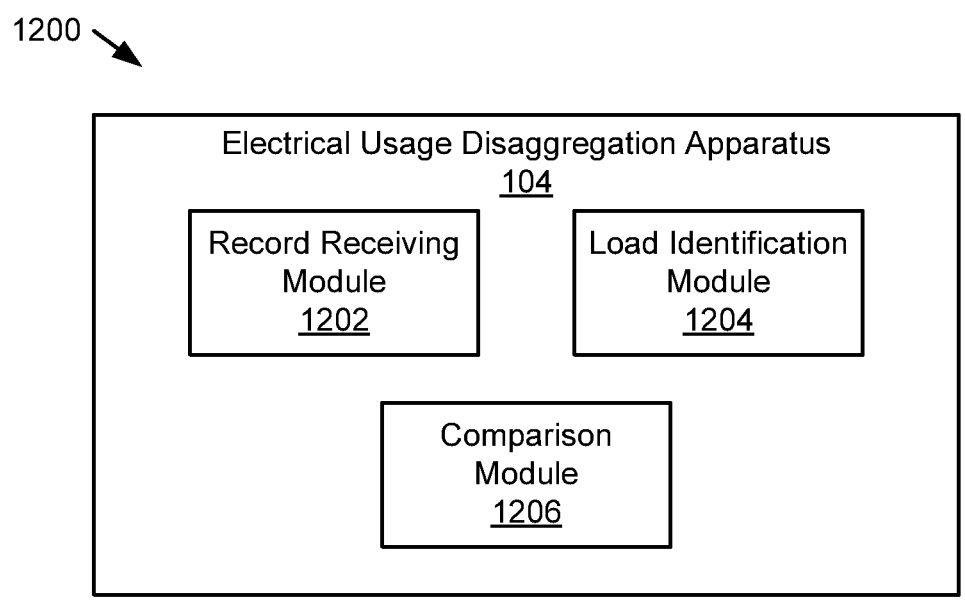
FIG. 12 is a schematic block diagram illustrating one embodiment of an apparatus for determining electrical and lifestyle characteristics in accordance with the present invention.

FIG. 12 is a schematic block diagram illustrating one embodiment of an apparatus 1200 for determining electrical and lifestyle characteristics in accordance with the present invention. The apparatus 1200 includes an embodiment of the electrical usage disaggregation apparatus 114 with a record receiving module 1202, a load identification module 1204, and a comparison module 1206, which are described below. In various embodiments, the electrical usage disaggregation apparatus 114 may include other modules mentioned above.

In one embodiment, the electrical usage disaggregation apparatus 114 includes a record receiving module 1202 that receives an electrical energy usage record for premises for a predefined time period ("record period"). The record period typically is a time period that extends at least over multiple days and may include several weeks, several months, etc. In one embodiment, the record period covers one or more years. The electrical energy usage record (or simply energy usage record) typically is a record maintained by an electrical utility for the premises. Typically the energy usage record includes readings from an electric meter located at the premises and typically readings from the electrical meter are expressed in kilowatts. In one embodiment, the energy usage record includes electrical energy readings that are broken down into specific timeframe for the record period. For example, the energy usage record may include hourly readings, daily readings, etc. In various embodiments, the energy usage record includes demand information, power factor information, etc. One of skill in the art will recognize other forms of an electrical energy usage record.

The record receiving module 1202 may also receive property characteristics for the premises. The property characteristics may include physical characteristics for the premises, environmental characteristics for the premises for the record period, and/or lifestyle characteristics of users of the premises. The energy usage record is typically recorded in such a way so that there is a plurality of energy usage readings for each day within the energy usage record. For example, the energy usage record, in one embodiment, may include hourly readings. In another embodiment, the energy usage record may include readings for every 15 minutes. One of skill in the art will recognize that an energy usage record may be missing some records, for example due to reading error. For example, for hourly readings, some of the hourly readings may be missing from the energy usage record.

The physical characteristics for the premises typically include various physical and other characteristics for the particular premises that may be available from inspection, from government records, aerial photographs, etc. In one embodiment, the physical characteristics of the premises are derived without participation of a resident or user of the premises. Often an electric utility may want to know information about a residence or other building and the tenants, residents, users, etc. may be unwilling to provide information so a utility may gather information available through public or government records to assist in determining electrical loads for the premises and other lifestyle characteristics.

Some of the characteristics may not vary and some may vary over time so are applicable during the record period. The physical characteristics may include a premises size, a premises type, a premises community type, or other information about the premise that may affect electrical load size and type. Other physical characteristics may include age of a structure on the premises, climate, altitude of the premises, community type, etc. This information may be used to deduce construction type, insulation type, etc. for the structure. Orientation and layout of a structure may be other physical characteristics that may be used to determine heat load, sun exposure, etc.

The physical characteristics may include one or more known electrical devices at the premises. For example, an aerial photograph may reveal a pool so a pool pump may be assumed on the premises. The physical characteristics may include structure type of the premises. For example, single family dwelling, multifamily dwelling, etc. Construction type, such as brick, stucco, aluminum siding, etc. may also be a physical characteristic. One of skill in the art will recognize other physical characteristics available and useful in determining electrical load and lifestyle characteristics of premises.

In another embodiment, the environmental characteristics for the premises may include weather data for the premises for the record period, sunrise data for the premises for the record period, sunset data for the premises for the record period, and the like. In one embodiment, the environmental characteristics include temperature readings during the record period for the premises, a location near the premises, city of the premises, or the like.

In another embodiment, environmental characteristics include weather history during the record period for the premises or surrounding area. For example, the environmental characteristics may include a record of rain, wind, snowfall, etc. for the premises during the record period. One of skill in the art will recognize other environmental characteristics useful in determining electrical load and lifestyle characteristics of premises.

The lifestyle characteristics for the premises may include an identification of a use of the premises as a vacation residence, an identification of a use of the premises as a primary residence, an identification of one or more a vacation days taken by the user of the premises, an identification of a school aged child at the premises, and an identification of a user at the premises during weekday daylight hours. Known lifestyle characteristics may be useful in reducing the amount of data required to be derived from the apparatus and may be useful in obtaining more accurate results.

The electrical usage disaggregation apparatus 114, in one embodiment includes a load identification module 1204 that selects a load determination algorithm to determine if a particular type of electrical load is present at the premises. The premises may include various electrical loads that run at various times throughout the record period. Types of electrical loads may include air conditioning equipment, an electric heating unit, lighting, timed lighting, appliances, an electric dryer, an electric range, a pool pump, an electric water heater, an electric clothes dryer, etc. Load determination algorithms have been developed for several types of electrical loads and the load identification module 1204 selects a load determination algorithm for a particular type electrical load suspected to be at the premises.

The electrical usage disaggregation apparatus 114, in one embodiment includes a comparison module 1206 that applies the load determination algorithm to the electrical energy usage record for the premises for at least a portion of the record period ("comparison period") to determine if the particular type of electrical load is present at the premises. In one embodiment the comparison period equals the record period. In other embodiments, the comparison period include one or more time periods within the record period. The load determination algorithm uses the property characteristics of the premises during the comparison period. For example, if the load identification module 1204 selects a load determination algorithm for an air conditioning unit, the comparison module 1206 uses the air conditioning load determination algorithm for at least the comparison period to determine if the premises include an air conditioning unit.

The air conditioning load determination algorithm uses property characteristics for at least the comparison period. For example, temperature and weather readings typically affect air conditioning usage and temperature and weather readings may be used for the comparison period by the air conditioning load determination algorithm. Typically size of a structure on the premises affects air conditioning equipment size so the air conditioning load determination algorithm may use structure size information. Other physical characteristics may also be used, such as assumed insulation characteristics, structure orientation, shading effects, etc. The air conditioning load determination algorithm uses the energy usage record to determine if an air conditioning unit is present and in use on the premises. Various load determination algorithms are discussed below.

Figure 13:
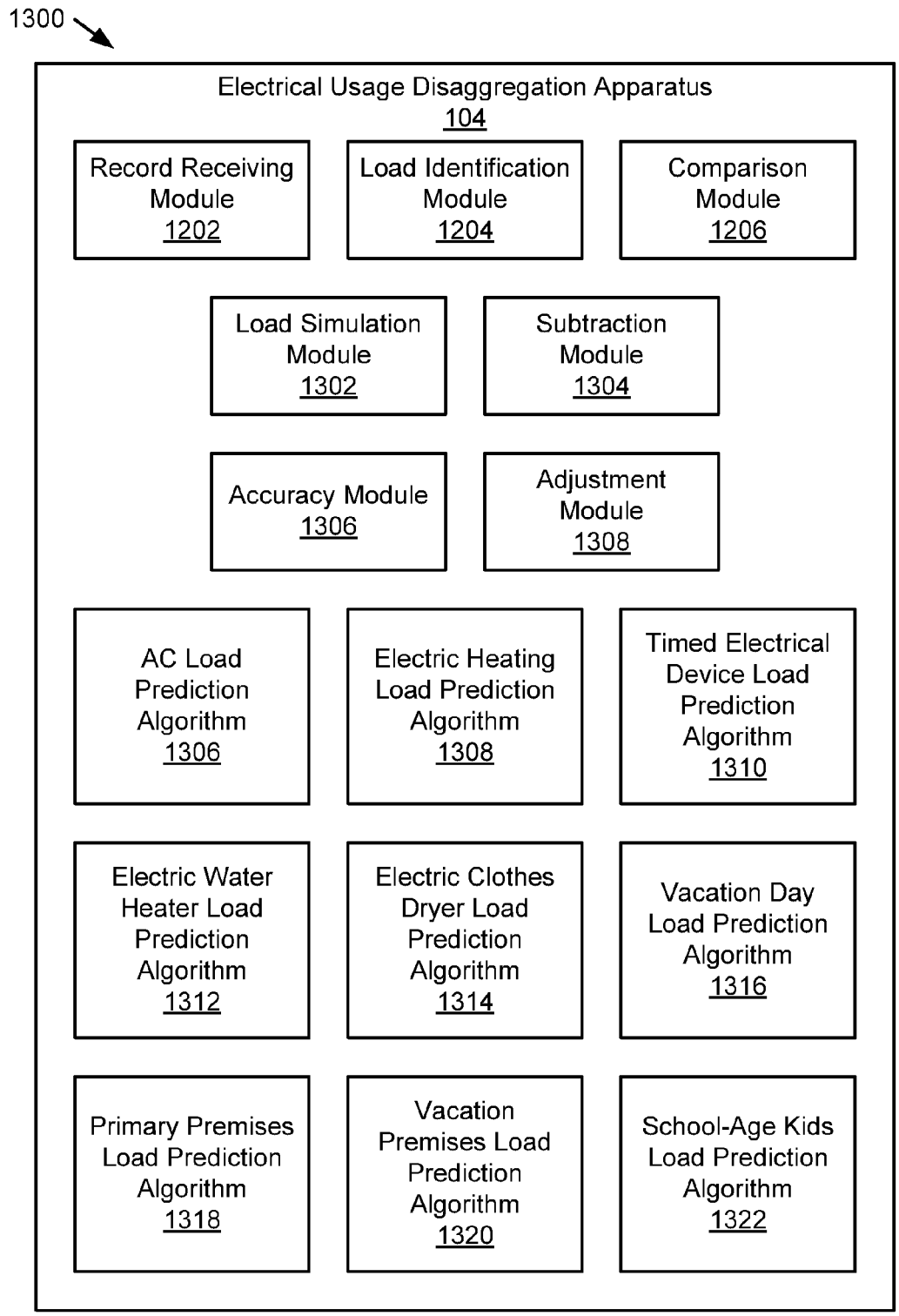
FIG. 13 is a schematic block diagram illustrating another embodiment of an apparatus for determining electrical and lifestyle characteristics in accordance with the present invention.

FIG. 13 is a schematic block diagram illustrating another embodiment of an apparatus 1300 for determining electrical and lifestyle characteristics in accordance with the present invention. In one embodiment, the apparatus 1300 includes an embodiment of the electrical usage disaggregation apparatus 114 with a record receiving module 1202, a load identification module 1204, and a comparison module 1206, which are substantially similar to those described above in relation to the apparatus 1200 of FIG. 12. In addition, the electrical usage disaggregation apparatus 114 may include a load simulation module 1302, a subtraction module 1304, an accuracy module 1306, and an adjustment module 1308. In various embodiments, the apparatus 1300 may include one or more load determination algorithms such as an air conditioning load determination algorithm 1306, an electric heating load determination algorithm 1308, a timed electrical device load determination algorithm 1310, an electric water heater load determination algorithm 1312, an electric clothes dryer load determination algorithm 1314, a vacation day load determination algorithm 1316, a primary premises load determination algorithm 1318, a vacation premises load determination algorithm 1320, and a school-age kids load determination algorithm 1322.

The load determination algorithms 1306-1322 include steps for determining load types that are substantially similar to the steps used in predicting the load types in simulated properties as discussed above with reference to the load determination algorithms 306-322 of FIGS. 5-11. The load determination algorithms 1306-1322 are discussed below with respect to FIGS. 16-22. In one embodiment, the load determination algorithms 1306-1322 may be interchangeable with the load determination algorithms 306-322. In other embodiments, the load determination algorithms 1306-1322 may include steps unique to the load determination algorithms 1306-1322 and the load determination algorithms 306-322 may include steps unique to the load determination algorithms 306-322.

In one embodiment, the electrical usage disaggregation apparatus 114 includes a load simulation module 1302 that uses an electrical device usage model corresponding to the particular type of electrical load determined to be at the premises to create a projected energy load by simulating electrical usage of the electrical load at the premises for the comparison period. The electrical device usage model uses the property characteristics of the premises for the comparison period. The electrical device usage model is typically a model that simulates electrical usage of the electrical load during the comparison period. For example, if the electrical device is an air conditioning unit, the electrical device usage model receives as input a selected group of property characteristics, such as daily temperature variations, size of a structure on the premises, etc. and simulates electrical energy usage for the comparison period.

The load simulation module 1302 may use information from the energy usage record to create the projected energy load. For example, the load simulation module 1302 may use information from a load determination algorithm to identify when an electrical load is turned on and off. If the predicted load is timed outdoor lighting, the timed electrical device load determination algorithm 1310 may be used to identify when the timed electrical device is turning on and off in the comparison period and the load simulation module 1302 may generate the projected energy load that corresponds with identified on and off times for the timed electrical device. Typically the load simulation module 1302 creates the projected energy load in response to the comparison module 1206 determining that the electrical load is present and/or in use on the premises.

The electrical usage disaggregation apparatus 114 may also include a subtraction module 1304 that subtracts the projected energy load for the electrical load from the energy usage record. Subtracting the projected energy load for the electrical load from the energy usage record, in one embodiment, facilitates easier prediction of other electrical loads on the premises. For example, an air conditioning load is typically large in comparison to other equipment at the premises so subtracting the projected energy load corresponding to the electrical load from the energy usage record may allow prediction of other smaller loads more accurate or easier.

In one embodiment, the load identification module 1204 selects one or more an additional load determination algorithms to determine if one or more an additional types of electrical loads are present at the premises. Also, the comparison module 1206 applies the one or more additional load determination algorithms to the electrical energy usage record for the comparison period to determine if the one or more additional types of electrical loads are present at the premises. The load simulation module 1302 may then use an electrical device usage model corresponding to the one or more additional types of electrical loads determined to be at the premises to create a projected energy load for each determined load by simulating electrical usage of the determined additional types of electrical loads at the premises for the comparison period. The subtraction module 1304 may then subtract a projected energy load from the energy usage record for each additional electrical load determined to be at the premises. In this way, the electrical usage disaggregation apparatus 114 may be used to predict if more than one electrical load is present at the premises.

In one embodiment, the load identification module 1204 identifies potential electrical loads at the premises and orders the potential electrical loads based on size of the electrical loads. For example, the potential electrical loads may be ordered from largest to smallest. The load identification module 1204 may then select load determination algorithms starting from a presumed largest electrical load. For example, in a hot climate an air conditioning unit may be the largest load so the load identification module 1204 may select an air conditioning load determination algorithm 1306 before selecting other load determination algorithms. If an air conditioning unit is determined to be present by the comparison module 1206, the load simulation module 1302 and the subtraction module 1304 are used to remove a projected energy load of the air conditioning unit from the energy usage algorithm before other load determination algorithms are selected. One of skill in the art will recognize other way to order and use load determination algorithms to predict multiple electrical loads at the premises.

In one embodiment, the electrical usage disaggregation apparatus 104 includes an accuracy module 1306 that determines an accuracy of the load prediction algorithm in determining if the particular type of electrical load is present in the subset of simulations. Typically, the load prediction algorithm includes one or more algorithm parameters. In the embodiment, the electrical usage disaggregation apparatus 104 includes an adjustment module 1308 that adjusts one or more of the algorithm parameters for the load prediction algorithm used by the load prediction module in response to the determined accuracy. This embodiment may work together with the various inventions described in the Calibration Patent to calibrate load prediction algorithms. For example, this algorithm may be used for calibrating load prediction algorithms where one or more electrical loads and/or lifestyle characteristics for actual residences are available where the inventions disclosed in the Calibration Patent may be used for calibrating load prediction algorithms with various simulations associated with simulated premises. In another embodiment, both simulated electrical usages and energy usage records and other knowledge of electrical loads and lifestyle characteristics from actual residences may be used together to calibrate one or more load prediction algorithms.

Figure 14:
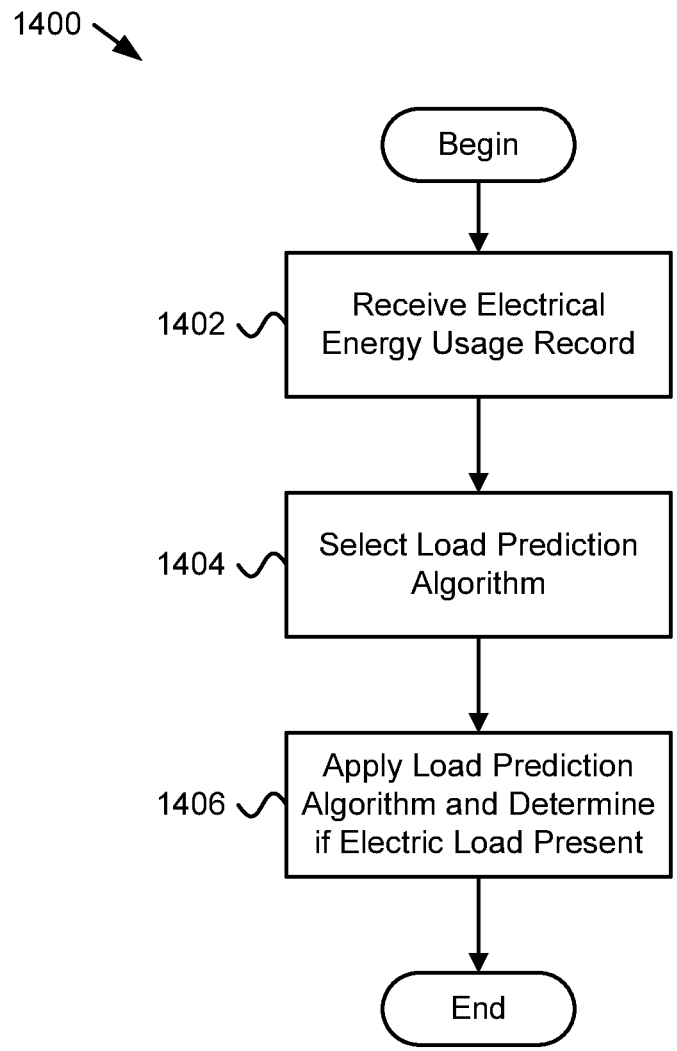
FIG. 14 is a schematic flow chart diagram illustrating one embodiment of a method for determining electrical and lifestyle characteristics in accordance with the present invention.

FIG. 14 is a schematic flow chart diagram illustrating one embodiment of a method 1400 for determining electrical and lifestyle characteristics in accordance with the present invention. The method 1400 begins and the record receiving module 1200 receives 1402 an electrical energy usage record for premises for a record period and property characteristics for the premises. The property characteristics include physical characteristics, environmental characteristics, and/or lifestyle characteristics. The load identification module 1204 selects 1404 a load determination algorithm to determine if a particular type of electrical load is present at the premises. The comparison module 1206 applies 1406 the load determination algorithm to the electrical energy usage record for the premises using the property characteristics for the premises for at least the comparison period to determine if the particular type of electrical load is present at the premises, and the method 1400 ends.

Figure 15:
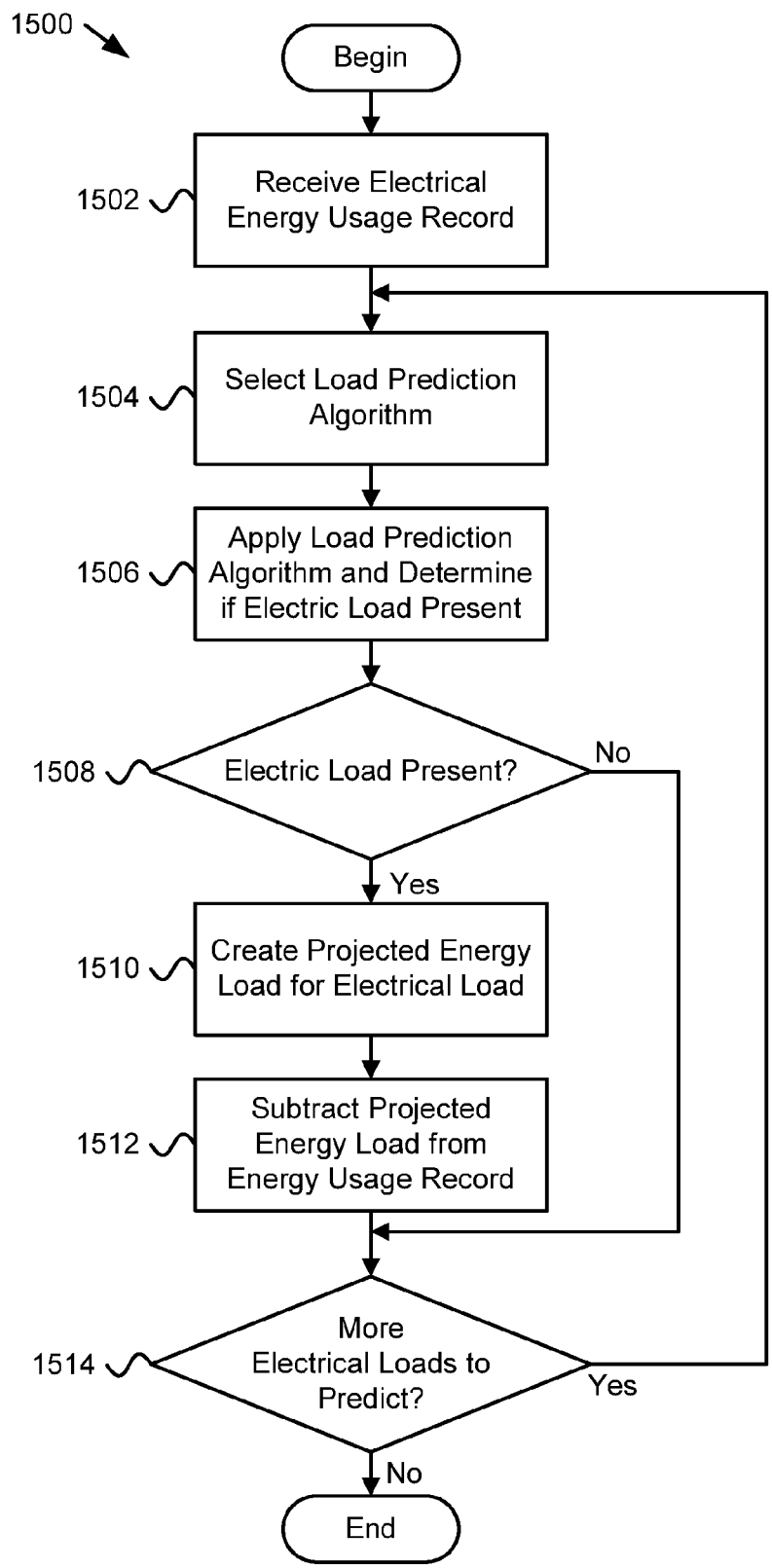
FIG. 15 is a schematic flow chart diagram illustrating another embodiment of a method for determining electrical and lifestyle characteristics in accordance with the present invention.

FIG. 15 is a schematic flow chart diagram illustrating another embodiment of a method 1500 for determining electrical and lifestyle characteristics in accordance with the present invention. The method 1500 begins and the record receiving module 1200 receives 1502 an electrical energy usage record for premises for a record period and property characteristics for the premises. The property characteristics include physical characteristics, environmental characteristics, and/or lifestyle characteristics. The load identification module 1204 selects 1504 a load determination algorithm 1306-1322 to determine if a particular type of electrical load is present at the premises.

The comparison module 1206 applies 1506 the load determination algorithm 1306-1322 to the electrical energy usage record for the premises using the property characteristics for the premises for at least the comparison period and determines 1508 if the particular type of electrical load is present at the premises. If the comparison module 1206 determines 1508 that the particular type of electrical load is present at the premises, the load simulation module 1302 uses an electrical device usage model corresponding to the particular type of electrical load determined to be at the premises to create 1510 a projected energy load by simulating electrical usage of the electrical load at the premises for the comparison period and using the property characteristics. The subtraction module 1304 subtracts 1512 the projected energy load for the electrical load from the energy usage record and the load identification module 1204 determines 1514 if there are any more electrical loads to predict on the premises.

If the comparison module 1206 determines 1508 that the particular electrical load is not present at the premises, the method 1500 skips the creation 1510 and subtraction 1512 steps and the load identification module 1204 determines 1514 if there are any more electrical loads to predict on the premises. If the load identification module 1204 determines 1514 that there are more electrical loads to predict on the premises, the method 1500 returns and the load identification module 1204 selects 1504 an additional load determination algorithm 1306-1322 for an additional electrical load. If the load identification module 1204 determines 1514 that there are not more electrical loads to predict on the premises, the method 1500 ends.

Figure 16:
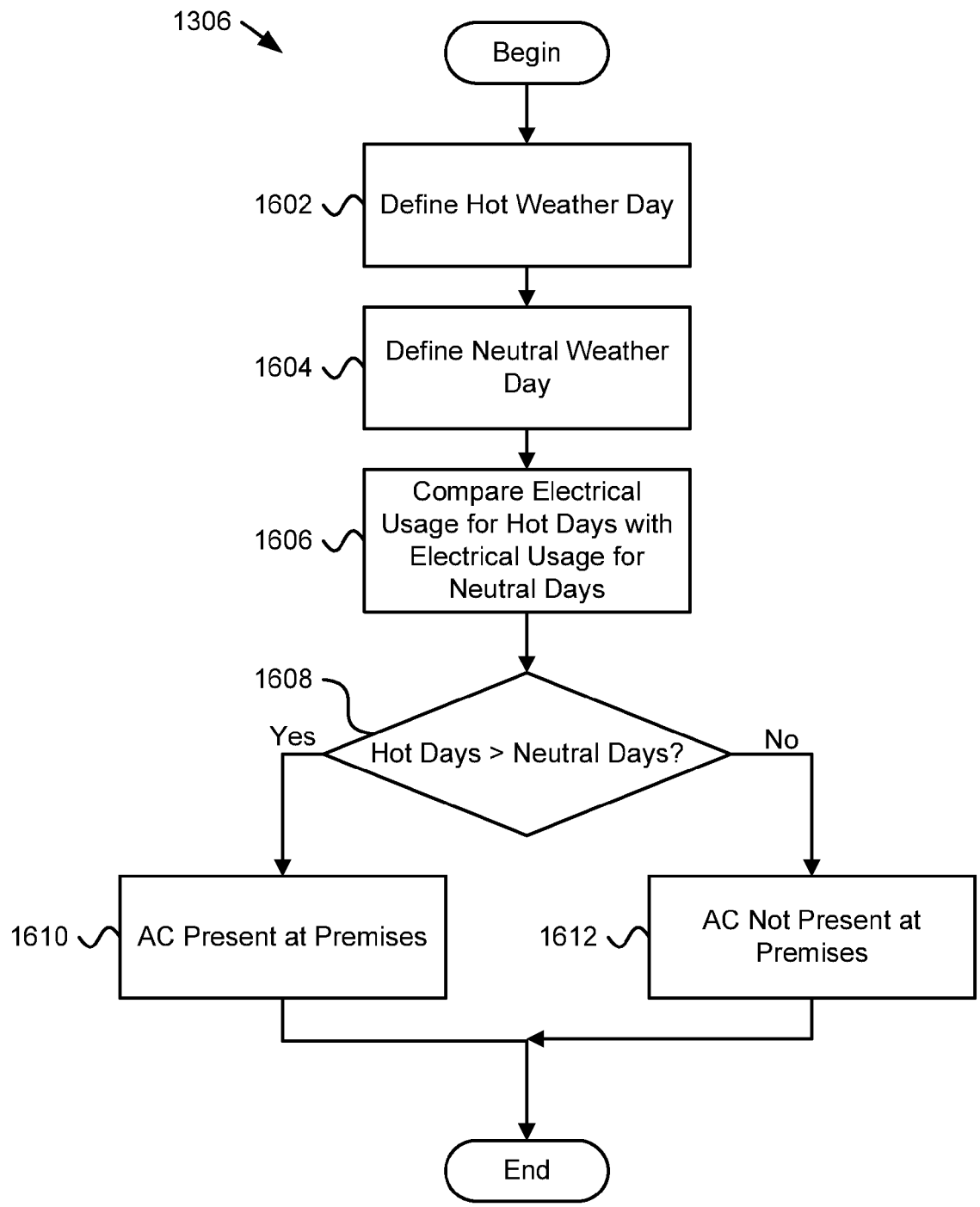
FIG. 16 is a schematic flow chart diagram illustrating one embodiment of a load determination algorithm for determining whether an air conditioner is present on a premises in accordance with the present invention.

FIG. 16 is a schematic flow chart diagram illustrating one embodiment of a load determination algorithm 1306 for determining whether an air conditioner is present on a premises in accordance with the present invention. The load determination algorithm 1306 begins by defining 1602 a hot weather day. For example, a hot weather day may be a day above a certain temperature. In another embodiment, a hot weather day may use a combination of temperature, humidity, and/or cloudiness to define a hot weather day. The load determination algorithm 1306 then defines 1604 a neutral weather day. For example, a neutral weather day may be a day that has a temperature within a specified range. The temperatures to define a hot or a neutral day may be maximum temperature, temperature at a particular hour, average temperature, etc.

The load determination algorithm 1306 compares 1606 electrical usage from the electrical energy usage record for the premises for at least a portion of the hot weather days with an electrical usage from the electrical energy usage record for at least a portion of the neutral weather days. In one embodiment, the load determination algorithm 1306 selects hot weather days that have an energy usage that is within a specified percentage of the highest energy usage among hot weather days. For example, the load determination algorithm 1306 may select hot weather days that have an energy usage that are among the highest 20% of energy usage for the hot weather days. The load determination algorithm 1306 may use average electrical energy usage, peak energy usage, etc. and may use a portion of the hot weather days or all of the hot weather days. One of skill in the art will recognize other ways to determine an energy usage for comparison among hot weather days.

The load determination algorithm 1306 may select neutral weather days that have an energy usage that is within a specified percentage of some metric, such as lowest energy usage, midpoint energy usage, highest energy usage, etc. For example the load determination algorithm 1306 may select neutral weather days with an energy usage among the energy usage for neutral weather days. In one embodiment, the load determination algorithm 1306 selects neutral weather days with energy usages within the lowest 20% of energy usages among neutral weather days. The load determination algorithm 1306 may select a comparison period during a particular season, such as summer or may simply choose hot and neutral weather days among all days in the record period.

In certain embodiments, the load determination algorithm 1306 determines 1608 if the premises include air conditioning equipment if the difference between energy usage for hot weather days and neutral weather days is above an AC load threshold. If the load determination algorithm 1306 determines 1608 that the difference is above the AC load threshold, the load determination algorithm 1306 determines 1610 that the premises include air conditioning equipment, and the load determination algorithm 1306 ends. If the load determination algorithm 1306 determines 1608 that the difference is not above the AC load threshold, the load determination algorithm 1306 determines 1614 that the premises do not include air conditioning equipment, and the load determination algorithm 1306 ends.

In another embodiment, the load determination algorithm 1306 determines 1608 if the premises include air conditioning equipment if the energy usage for hot weather days is greater than the energy usage for neutral weather days in a predefined percentage of hot weather days versus neutral weather days. If the load determination algorithm 1306 determines 1608 that the energy usage for hot weather days is greater than the energy usage for neutral weather days in a predefined percentage of hot weather days versus neutral weather days, the load determination algorithm 1306 determines 1610 that the premises include air conditioning equipment, and the load determination algorithm 1306 ends. If the load determination algorithm 1306 determines 1608 that the energy usage for hot weather days is less than or equal to the energy usage for neutral weather days in a predefined percentage of hot weather days versus neutral weather days, the load determination algorithm 1306 determines 1614 that the premises do not include air conditioning equipment, and the load determination algorithm 1306 ends.

Figure 17A:
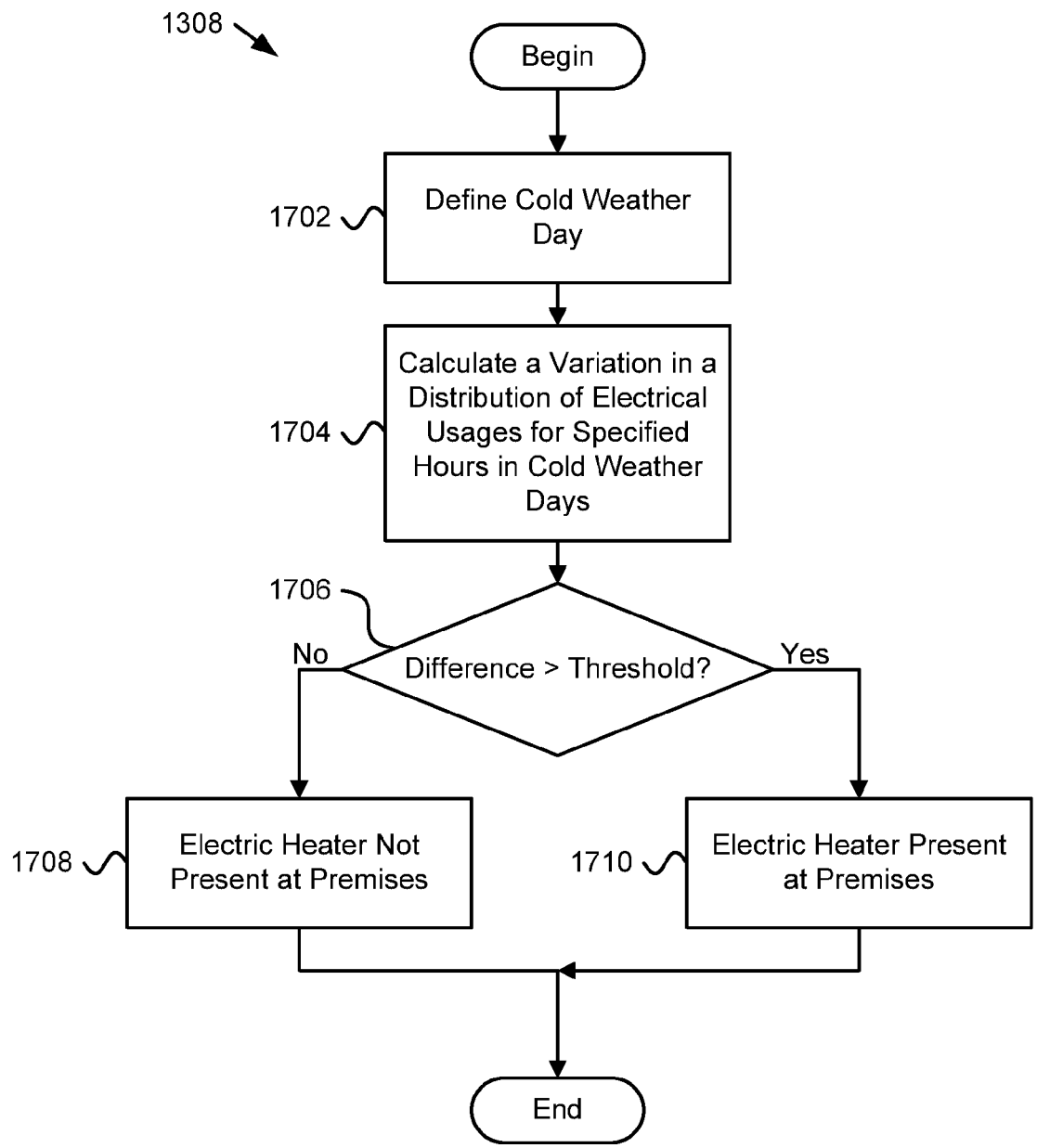
FIG. 17A is a schematic flow chart diagram illustrating one embodiment of a load determination algorithm for determining whether an electric heating unit is present on a premises in accordance with the present invention.

FIG. 17A is a schematic flow chart diagram illustrating one embodiment of a load determination algorithm 1308 for determining whether an electric heating unit is present on a premises in accordance with the present invention. The load determination algorithm 1308 begins by defining 1702 a cold weather day. For example, a cold weather day may be a day below a certain temperature. In another embodiment, a cold weather day may use a combination of temperature, humidity, and/or cloudiness to define a cold weather day. The load determination algorithm 1308 then calculates 1704 a variation in a distribution of electrical usages during the specified hours of the day for a plurality of cold weather days. For example, the load determination algorithm 1308 may include finding an average electrical usage during the specified hours of the day and then finding a standard deviation of electrical usage during the specified hours. In one embodiment, the specified hours include hours around breakfast time. For example the specified hours may be from 5 AM to 10 AM. In another embodiment, the specified hours include hours around dinner time. For example the specified hours may be from 4 PM to 8 PM. The temperatures to define a cold or a neutral day may be maximum temperature, temperature at a particular hour, average temperature, etc.

The load determination algorithm 1308 determines 1706 if the variation in the distribution of electrical usages during the specified hours of the day for the cold weather days is greater than a specified threshold. If the load determination algorithm 1308 determines 1706 that the variation in the distribution of electrical usages during the specified hours of the day for the cold weather days is greater than a specified threshold, the load determination algorithm 1308 determines 1708 that the premises include an electric heating unit, and the load determination algorithm 1308 ends. If the load determination algorithm 1308 determines 1708 that the variation in the distribution of electrical usages during the specified hours of the day for the cold weather days is not greater than a specified threshold, the load determination algorithm 1308 determines 1710 that the premises do not include an electric heating unit, and the load determination algorithm 1308 ends.

Figure 17B:
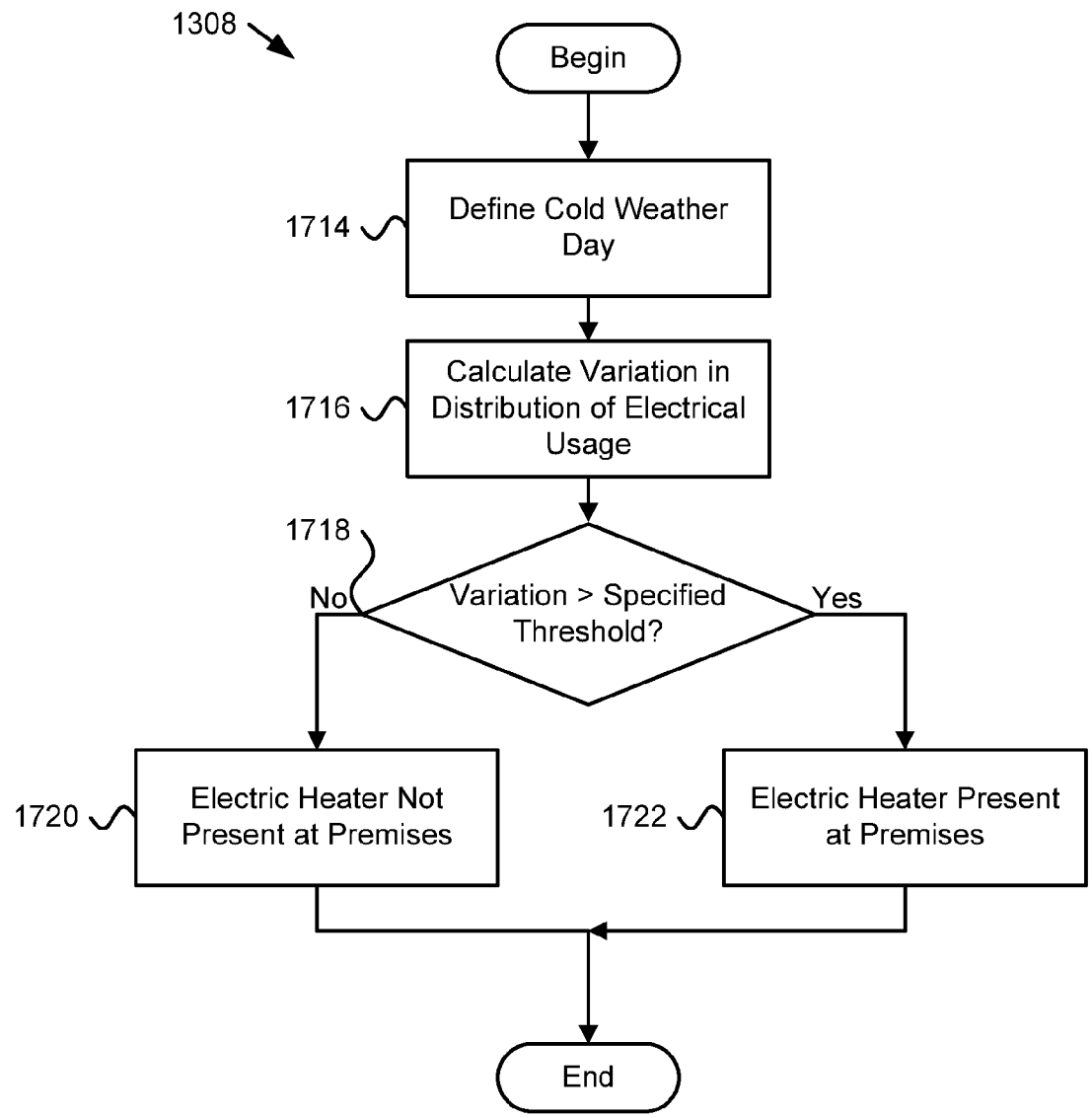
FIG. 17B is a schematic flow chart diagram illustrating another embodiment of a load determination algorithm for determining whether an electric heating unit is present on a premises in accordance with the present invention.

FIG. 17B is a schematic flow chart diagram illustrating another embodiment of a load determination algorithm 1308 for determining whether an electric heating unit is present on a premises in accordance with the present invention. The load determination algorithm 1308 begins by defining 1714 criteria for a cold weather day during specified hours of a day. For example, a cold weather day may be a day below a certain temperature during the specified hours. In another embodiment, a cold weather day may use a combination of temperature, humidity, and/or cloudiness to define a cold weather day during the specified hours. In one embodiment the specified hours may be at least one of breakfast hours (i.e., about 5:00 AM through about 9:00 AM) and dinner hours (i.e., about 6:00 PM through about 9:00 PM). In other embodiments, the specified hours may include a single breakfast time hour or a single dinner time hour.

The load determination algorithm 1308 calculates 1716 a variation in a distribution of electrical usages during the specified hours for a plurality of cold weather days. For example, in certain embodiments, an average of the electrical usages during the specified hours of the plurality of cold weather days and the variation is the standard deviation from the average. One of skill in the art will recognize other ways of calculating 1716 the variation in the distribution of electrical usages during the specified hours in the cold weather days.

The load determination algorithm 1308 determines 1718 whether the variation in the average of the electrical usages during the specified hours is greater than a specified threshold. If the load determination algorithm 1308 determines 1720 that the variation in the average of the electrical usages during the specified hours is less than a specified threshold, the load determination algorithm 1308 determines that the premises does not include the electric heating unit and the load prediction algorithm 1308 ends. If the load determination algorithm 1308 determines 1722 that the variation in the average of the electrical usages during the specified hours is greater than a specified threshold, the load determination algorithm 1308 determines that the premises includes the electric heating unit and the load prediction algorithm 1308 ends.

Figure 18:
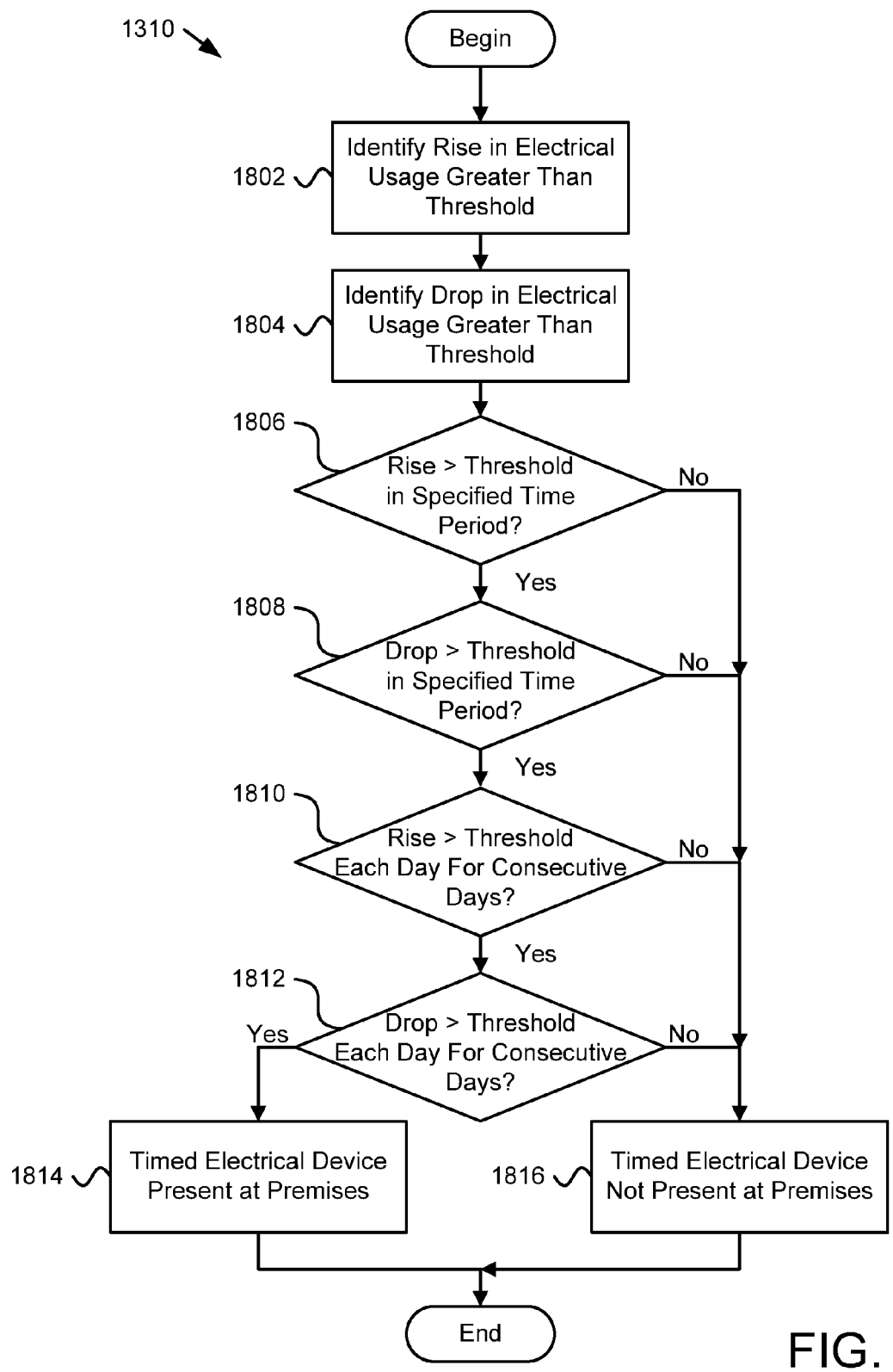
FIG. 18 is a schematic flow chart diagram illustrating one embodiment of a load determination algorithm for determining whether a timed electrical device is present on a premises in accordance with the present invention.

FIG. 18 is a schematic flow chart diagram illustrating one embodiment of a load determination algorithm 1310 for determining whether a timed electrical load is present on a premises in accordance with the present invention. The load determination algorithm 1310 begins and the load determination algorithm 1310 identifies 1802 a rise in an hourly electrical usage of the electrical energy usage record having a magnitude greater than a specified threshold. The timed electrical load, in various embodiments, may be pool pumping equipment, timed lighting, and the like. The rise in hourly electrical usage typically corresponds with turning on electrical equipment and may potentially be a timer turning on a timed electrical load. Typically the specified threshold is selected to reflect an expected size of the timed electrical load. For example, if a pool pump is expected to be greater than 2 kilowatt ("kW"), the specified threshold may be set at 1 kW or some other value less than 2 kW. Typically the load determination algorithm 1310 identifies 1802 rises and identifies 1804 drops within a 24-hour period, but shorter or longer time periods may be used depending upon the timed electrical load.

The load determination algorithm 1310 identifies 1804 a drop in an hourly electrical usage of the electrical energy usage record having a magnitude greater than the specified threshold. The load determination algorithm 1310 determines 1806 if the rise in the hourly electrical usage having a magnitude greater than the specified threshold occurs during a specified time period. For example, for timed outdoor lighting, the specified time period may be in the evening hours, maybe between 5:00 PM and 10:00 PM. If the load determination algorithm 1310 determines 1808 that the rise in the hourly electrical usage having a magnitude greater than the specified threshold occurs during a specified time period, the load determination algorithm 1310 determines 1808 if the drop in the hourly electrical usage having a magnitude greater than the specified threshold occurs during a specified time period. For example, for timed outdoor lighting, the specified time period for a drop in electrical load may be in the late night hours or early morning, maybe between 11:00 PM and 7:00 AM.

If the load determination algorithm 1310 determines 1808 that the drop in the hourly electrical usage having a magnitude greater than the specified threshold occurs during a specified time period, the load determination algorithm 1310 determines 1810 if the rise in electrical load occurs at approximately a same starting time in a threshold number of consecutive days. For example, the threshold number of days may be 30 days, or some other amount of days that typically indicates a repeated pattern of a timed electrical load. The rise may vary due to various reasons, such as sunset changes over time. If the load determination algorithm 1310 determines 1810 that the rise in electrical load occurs at approximately a same starting time in a threshold number of consecutive days, the load determination algorithm 1310 determines 1812 if the drop in the hourly electrical usage having a magnitude greater than the specified threshold occurs at approximately a same finishing time in the threshold number of consecutive days.

Typically the consecutive number of days for a rise should approximately correspond to the consecutive number of days for a drop.

If the load determination algorithm 1310 determines 1812 that the drop in the hourly electrical usage having a magnitude greater than the specified threshold occurs at approximately a same finishing time in the threshold number of consecutive days, the load determination algorithm 1310 determines 1814 that the premises includes the particular timed electric load being predicted, and the algorithm 1310 ends. If the load determination algorithm 1310 determines 1806, 1808, 1810, 1812 that the tested conditions are not met, the load determination algorithm 1310 determines 1814 that the particular timed electric load is not present at the premises, and the algorithm 1310 ends.

Figure 19:
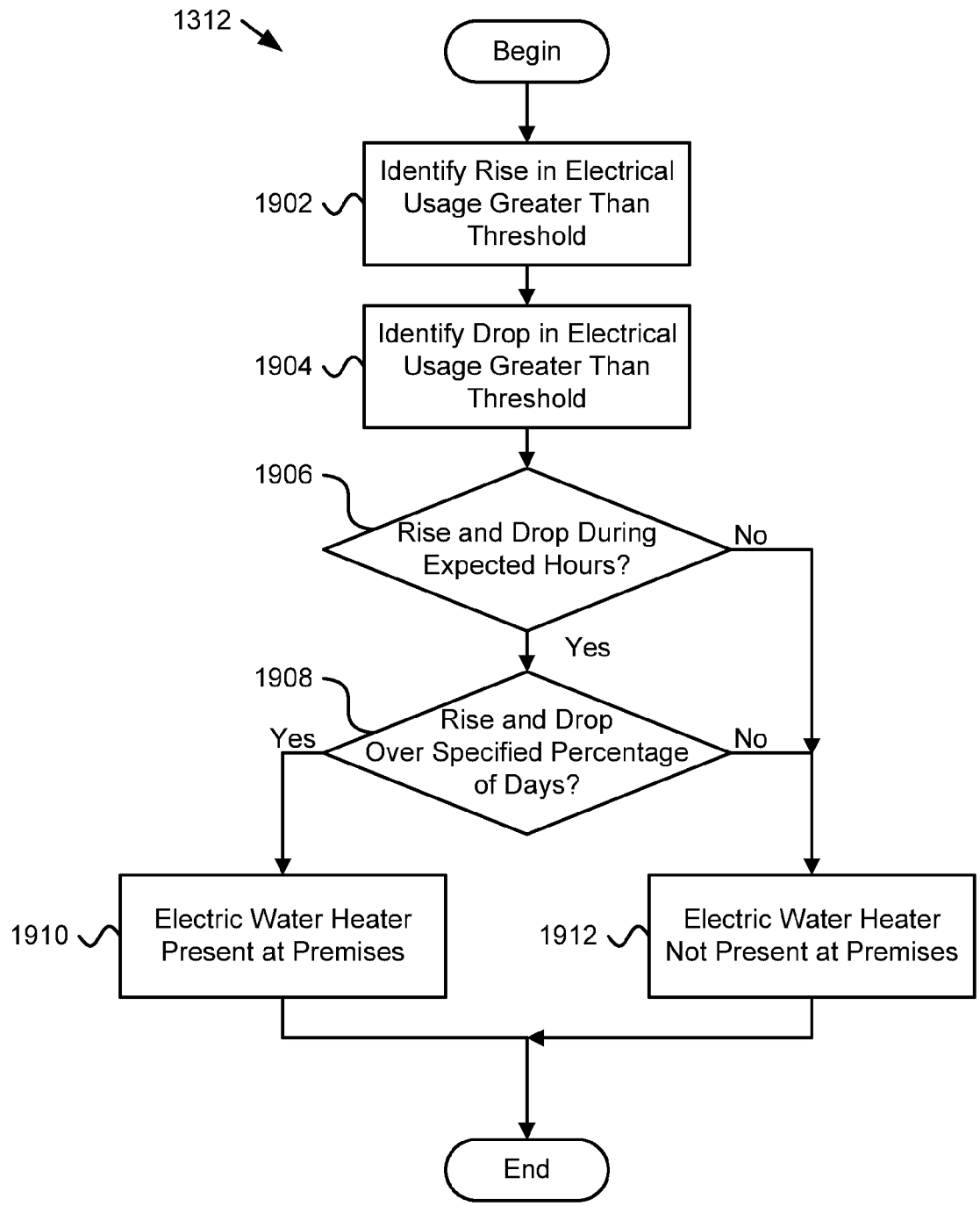
FIG. 19 is a schematic flow chart diagram illustrating one embodiment of a load determination algorithm for determining whether an electric water heater is present on a premises in accordance with the present invention.

FIG. 19 is a schematic flow chart diagram illustrating one embodiment of a load determination algorithm 1312 for determining whether an electric water heater is present on a premises in accordance with the present invention. The load determination algorithm 1312 starts and the load determination algorithm 1312 identifies 1902 a rise in an hourly electrical usage of the electrical energy usage record having a magnitude greater than a specified threshold. The specified threshold is typically set to a value below an expected electrical load for an electric water heater. For example, the specified threshold may be set to 90% of the expected electrical load for an electric water heater.

The load determination algorithm 1312 identifies 1904 a drop in an hourly electrical usage of the electrical energy usage record having a magnitude greater than the specified threshold. The load determination algorithm 1312 determines 1906 if the rise in the electrical usage that has a magnitude greater than the specified threshold and the drop in the electrical usage that has a magnitude greater than the specified threshold occurs within an expected usage time for a water heater. For example, an electric water heater may operate at various times throughout the day and night, while other similar loads, such as an electric clothes dryer, typically would not often occur in the middle of the night. The expected usage time may be selected in the middle of the night so to not be confused with an electric clothes dryer load.

If the load determination algorithm 1312 determines 1906 that the rise in the electrical usage that has a magnitude greater than the specified threshold and the drop in the electrical usage that has a magnitude greater than the specified threshold occurs within the expected usage time for a water heater, the load determination algorithm 1312 determines 1908 if the rise in the electrical usage that has a magnitude greater than the specified threshold and the drop in the electrical usage that has a magnitude greater than the specified threshold occurs in a specified percentage of a number of days during the specified time period. A water heater may not turn on during the specified time every day so the load determination algorithm 1906 may require a rise and drop during the expected usage time for a specified percentage of days less than 100%. However, in another embodiment, the specified percentage of days may be 100%. The specified number of days typically is chosen to be enough days to indicate a pattern for a electric water heater rather than another electrical load that may change over time.

If the load determination algorithm 1312 determines 1908 that the rise in the electrical usage that has a magnitude greater than the specified threshold and the drop in the electrical usage that has a magnitude greater than the specified threshold occurs in a specified percentage of a number of days during the specified time period, the load determination algorithm 1312 determines 1910 that an electric water heater is present at the premises, and the algorithm 1312 ends. If the load determination algorithm 1312 determines 1906, 1908 that the stated conditions are not met, the load determination algorithm 1312 determines 1912 that an electric water heater is not present at the premises, and the algorithm 1312 ends.

Figure 20:
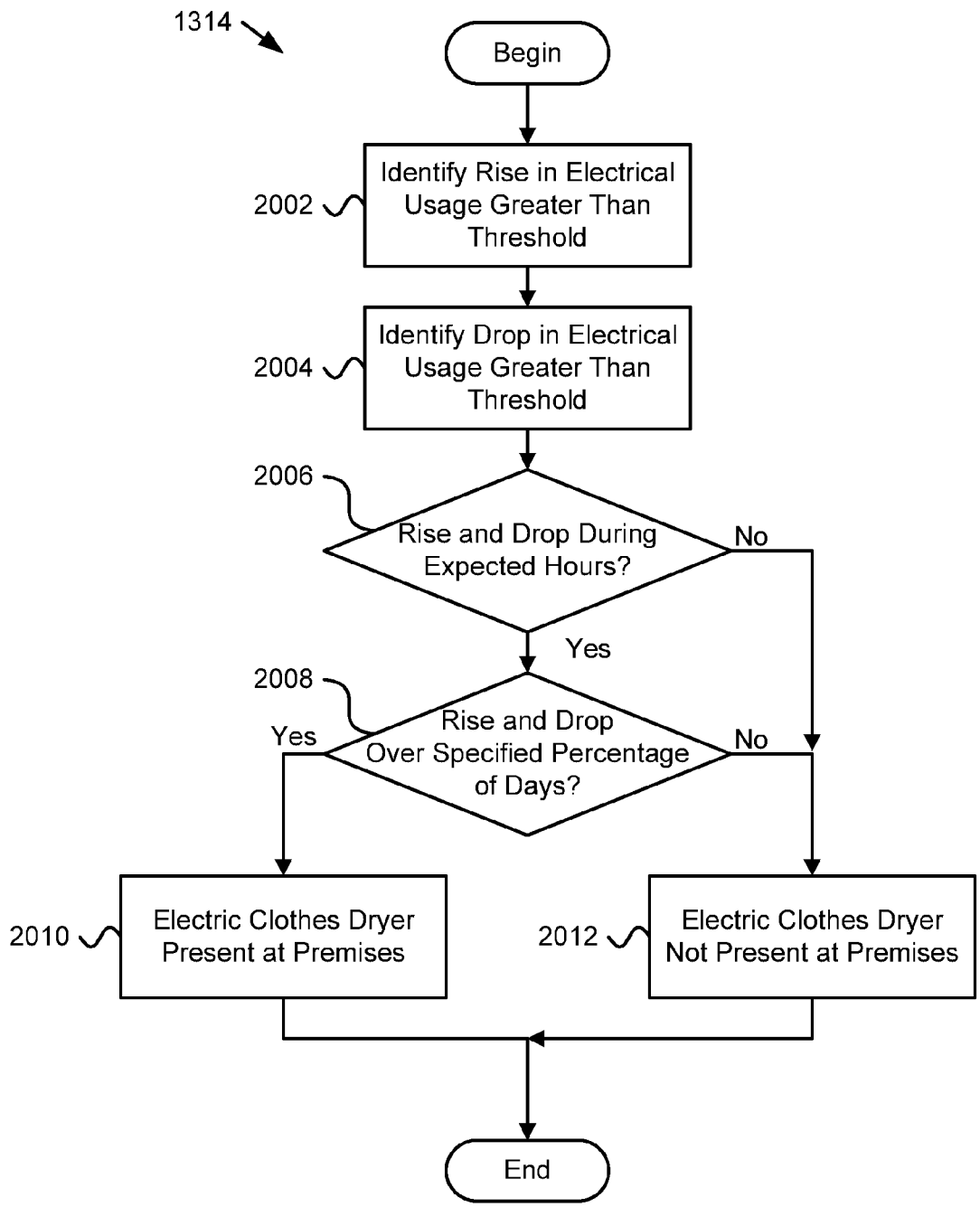
FIG. 20 is a schematic flow chart diagram illustrating one embodiment of a load determination algorithm for determining whether an electric clothes dryer is present on a premises in accordance with the present invention.

FIG. 20 is a schematic flow chart diagram illustrating one embodiment of a load determination algorithm 1314 for determining whether an electric clothes dryer is present on a premises in accordance with the present invention. The load determination algorithm 1314 starts and the load determination algorithm 1314 identifies 2002 a rise in an hourly electrical usage of the electrical energy usage record having a magnitude greater than a specified threshold. The load determination algorithm 1314 identifies 2004 a drop in an hourly electrical usage of the electrical energy usage record having a magnitude greater than the specified threshold. The specified threshold is typically the same for the rise and drop and corresponds to an expected electric clothes dryer load. For example, the specified threshold may be set to 85% (or other percentage) of an expected electrical load for an electric dryer.

The load determination algorithm 1314 determines 2008 if the rise in the hourly electrical usage having a magnitude greater than the specified threshold and the drop in the hourly electrical usage having a magnitude greater than the specified threshold occurs within an expected usage time for an electric clothes dryer. In one embodiment, the expected usage time for an electric clothes dryer is during typical hours when users are awake, and may also include a time just after users would be asleep. For example, the expected usage time may be between 7:00 AM and midnight. Selecting a time during waking hours may be beneficial to distinguish from other electric loads, such as an electric water heater.

If load determination algorithm 1314 determines 2008 that the rise in the hourly electrical usage having a magnitude greater than the specified threshold and the drop in the hourly electrical usage having a magnitude greater than the specified threshold occurs within an expected usage time for an electric clothes dryer, the load determination algorithm 1314 determines 2008 that the rise in the electrical usage that has a magnitude greater than the specified threshold and the drop in the electrical usage that has a magnitude greater than the specified threshold occurs in a specified percentage of a number of days during the specified time period, the load determination algorithm 1314 determines 2010 that an electric clothes dryer is present at the premises, and the algorithm 1314 ends. If the load determination algorithm 1314 determines 2006, 2008 that the stated conditions are not met, the load determination algorithm 1314 determines 2012 that an electric water heater is not present at the premises, and the algorithm 1314 ends.

Figure 21:
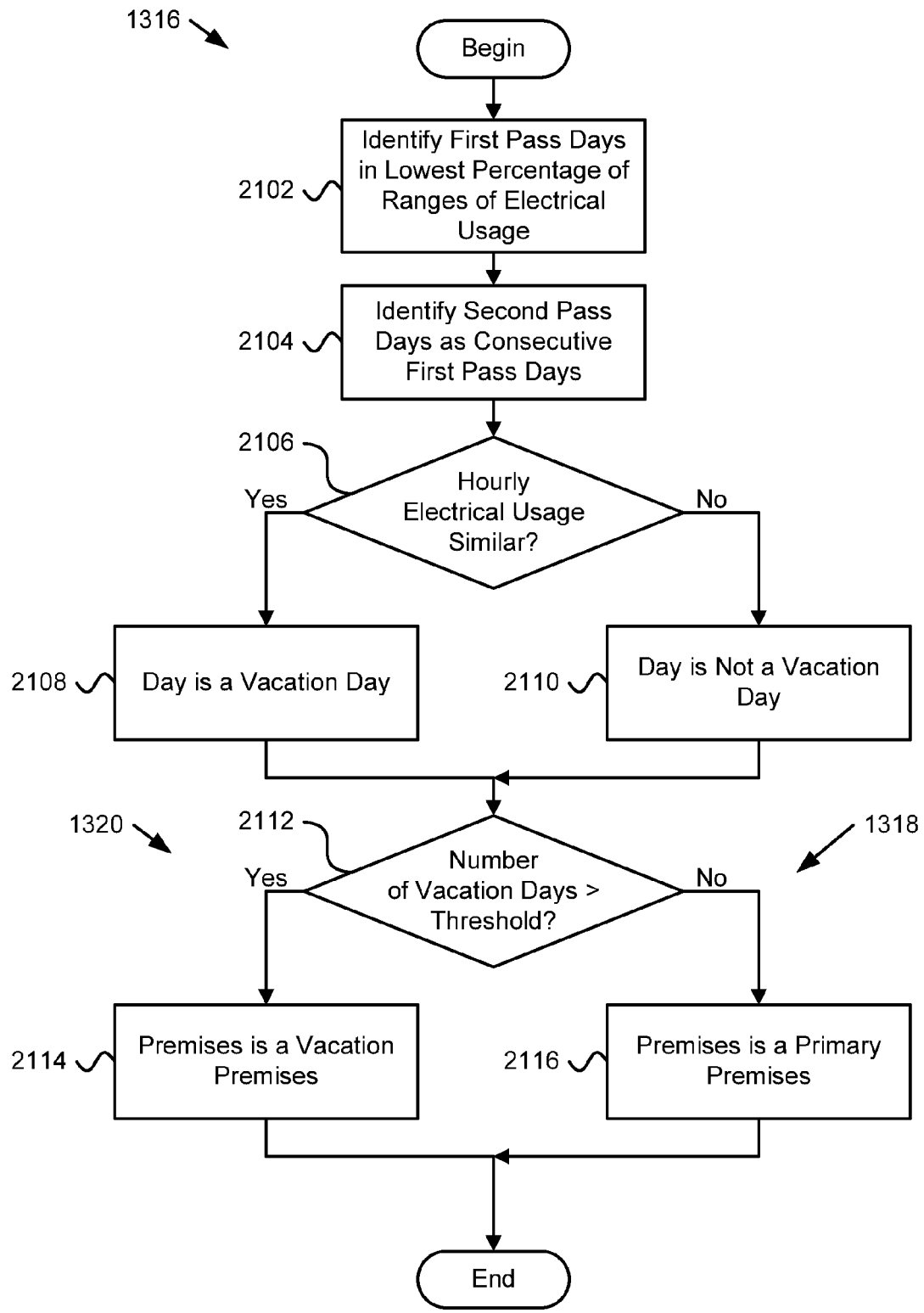
FIG. 21 is a schematic flow chart diagram illustrating one embodiment of a load determination algorithm for identifying vacation days and for determining whether a premises is a primary premises or a vacation premises in accordance with the present invention.

FIG. 21 is a schematic flow chart diagram illustrating one embodiment of load determination algorithms 1316, 1318, 1320 for identifying vacation days and for determining whether a premises is a primary premises or a vacation premises in accordance with the present invention. The vacation days load determination algorithm 1316 starts and identifies 2102 a plurality of first pass vacation days as days within the comparison period having an electrical usage range from the electrical energy usage record that are in a lowest specified percent of all daily electrical usage ranges for days within the comparison period. For example, the vacation days load determination algorithm 1316 may sort electrical usage ranges for each day in the comparison period by amount of electrical usage variation for each day and may order the electrical usage ranges from largest to smallest. The vacation days load determination algorithms 1316 may then determine that first pass vacation days are the days within the lowest 20% of electrical usage ranges. A daily electrical usage range typically includes a difference between a maximum electrical usage for a day and a minimum electrical usage for the day. The maximum and minimum electrical usage may be for some unit of measurement within the energy usage record. The unit of measurement, for example, may be every hour, every 15 minutes, etc.

The vacation days load determination algorithm 1316 identifies 2104 a plurality of second pass vacation days as first pass vacation days that are consecutive. The vacation days load determination algorithm 1316 identifies 2106 a plurality of third pass vacation days as second pass vacation days that have patterns of hourly electrical usage throughout a day that are substantially similar. The vacation days load determination algorithms 1316 may use a variety of methods to determine that patterns of hourly electrical usage throughout a day that are substantially similar.

The vacation days load determination algorithm 1316 may, for example, determine hourly electrical usages of a vacation day and compare the hourly electrical usages with hourly electrical usages of a day that is a nearest neighbor. The nearest neighbor, in one embodiment, is a vacation day with an electrical usage that is closest to the vacation day being tested. Other embodiments of a nearest neighbor may include comparing average usage, may include more than just vacation days, etc. One of skill in the art will recognize other ways to identify a nearest neighbor. Hourly differences may be squared and summed and compared to the sum of squares of the nearest neighbor or other consecutive second pass days.

The vacation days load determination algorithm 1316 may then determine 2108 that a day is a vacation day if the vacation days load determination algorithm 1316 determines 2106 that the day is a third pass day such that patterns of electrical usage throughout the second pass day are substantially similar, or if the vacation days load determination algorithm 1316 determines 2106 that the day is not a third pass day, the vacation days load determination algorithm 1316 determines 2110 that the day is not a vacation day. One of skill in the art will recognize other ways to determine if a day has patterns of hourly electrical usage throughout a day that are substantially similar.

In some embodiments, the primary premises load determination algorithm 1318 and/or the vacation premises load determination algorithm 1320 may be incorporated with the vacation days load determination algorithm 1316 and may use the results of the vacation days load determination algorithm 1316, as shown in FIG. 21. In other embodiments, the primary premises load determination algorithm 1318 and/or the vacation premises load determination algorithm 1320 may use a different way to calculate vacation days. The primary premises load determination algorithm 1318 uses the results of the vacation days load determination algorithm 1316 and determines 2112 if a number of the one or more vacation days taken by the one or more users of the premises is less than a specified threshold. Primary premises are a dwelling where residents spend a majority of time. If the primary premises load determination algorithm 1318 determines 2112 that a number of the one or more vacation days taken by the one or more users of the premises is less than a specified threshold, the primary premises load determination algorithm 1318 determines 2116 that the premises is a primary premises and the algorithm 1318 ends.

The vacation premises load determination algorithm 1320 uses the results of the vacation days load determination algorithm 1316 and determines 2112 if a number of the one or more vacation days taken by the one or more users of the premises is greater than a specified threshold. Vacation premises are a dwelling where residents spend less than a majority of time, for example a summer home, a cabin, etc. If the vacation premises load determination algorithm 1320 determines 2112 that a number of the one or more vacation days taken by the one or more users of the premises is greater than a specified threshold, the vacation premises load determination algorithm 1320 determines 2114 that the premises is a vacation premises and the algorithm 1320 ends. Note that the specified number of vacation days for the primary premises load determination algorithm 1318 and the vacation premises load determination algorithm 1320 may be different or may be the same.

Figure 22:
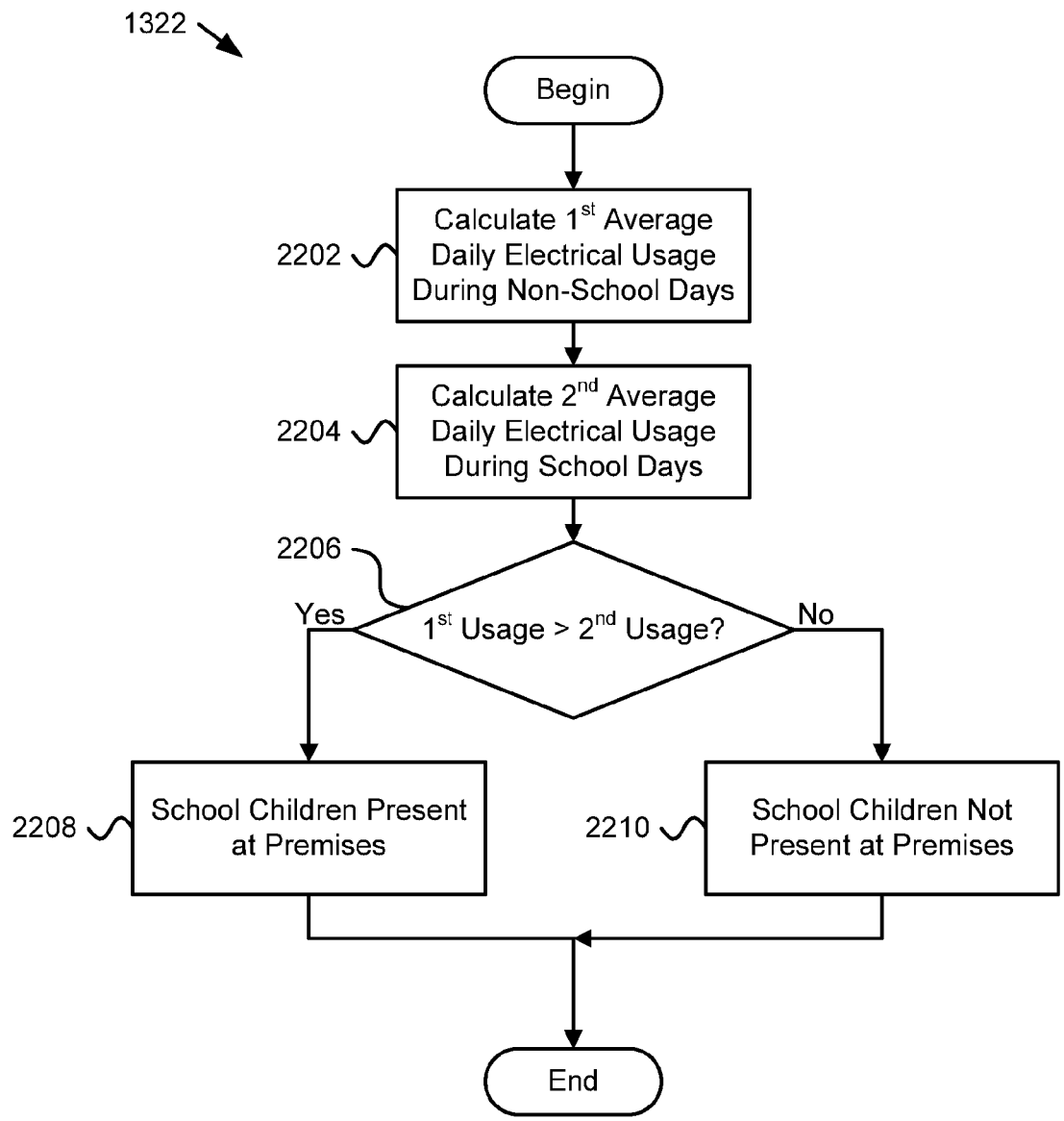
FIG. 22 is a schematic flow chart diagram illustrating one embodiment of a load determination algorithm for determining whether school children are present at premises in accordance with the present invention.

FIG. 22 is a schematic flow chart diagram illustrating one embodiment of a load determination algorithm 1322 for determining whether school children are present at premises in accordance with the present invention. The load determination algorithm 1322 begins and calculates 2202 a first average daily electrical usage for a specified range of time during days that include a specified percentage of non-school days. For example, non-school days may be during summer, during weekends, during holidays, etc. In another embodiment, the load determination algorithm 1322 calculates 2202 maximum daily usage for non-school days.

The load determination algorithm 1322 calculates 2204 a second average daily electrical usage for a specified range of time that include a specified percentage of school days. In another embodiment, the load determination algorithm 1322 calculates 2204 maximum daily usage for school days, for example when one or more local schools are in session. The specified range of time for school days and non-school days may be certain hours of a day. For example, the specified range of time for school days may include hours when schools are in session.

The load determination algorithm 1322 determines 2206 if the first average is greater than the second average by a specified amount. The specified amount may be an expected additional electrical usage that may be attributed to school children's usage of electrical equipment in a home. If the load determination algorithm 1322 determines 2206 that the first average is greater than the second average by a specified amount, the load determination algorithm 1322 determines 2208 that school children are present at the premises, and the algorithm 1322 ends. If the load determination algorithm 1322 determines 2206 that the first average is less than the second average by a specified amount, the load determination algorithm 1322 determines 2210 that school children are not present at the premises, and the algorithm 1322 ends.

Figure 23:
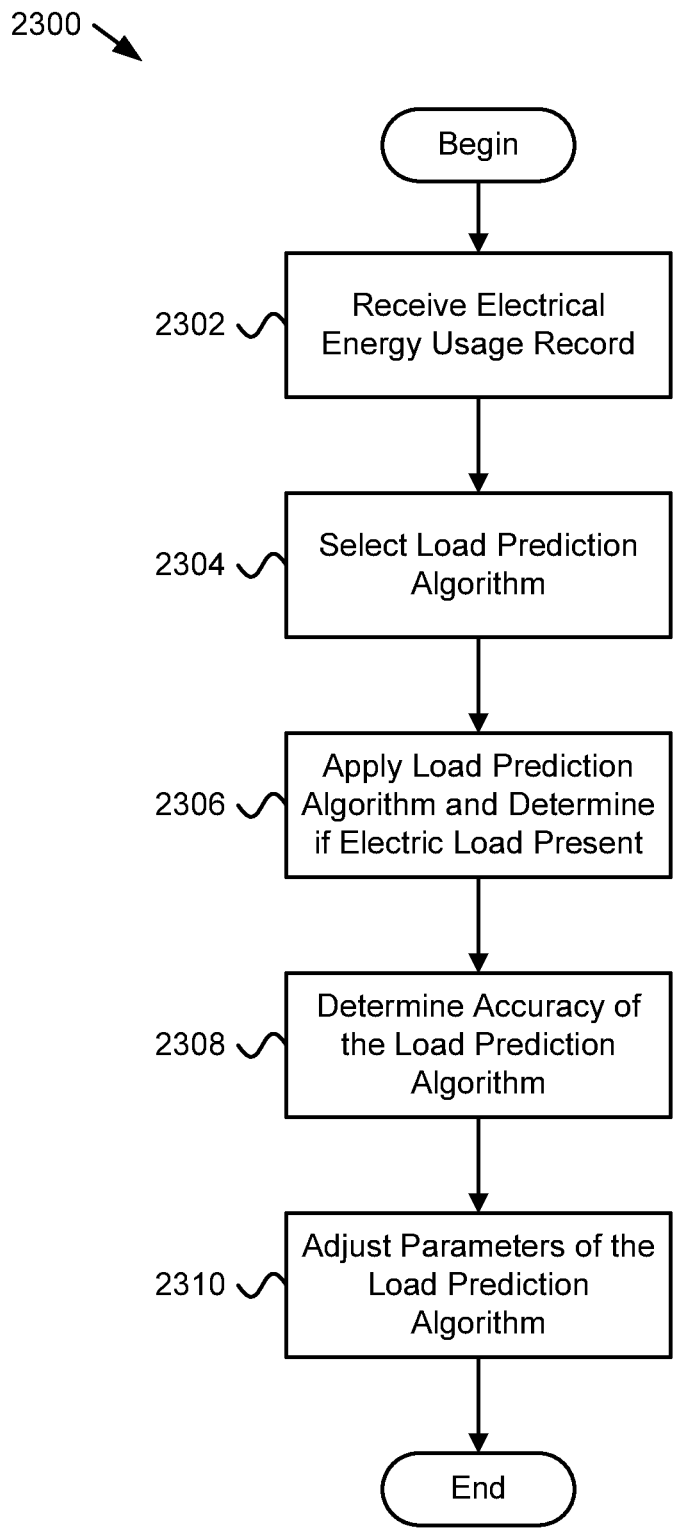
FIG. 23 is a schematic flow chart diagram illustrating one embodiment for calibrating a load prediction algorithm using electrical energy usage records from actual residences in accordance with the present invention.

FIG. 23 is a schematic flow chart diagram illustrating one embodiment of a method 2300 for determining electrical and lifestyle characteristics in accordance with the present invention. The method 2300 begins and the record receiving module 1202 receives 2302 an electrical energy usage record for premises for a record period and property characteristics for the premises. The property characteristics include physical characteristics, environmental characteristics, and/or lifestyle characteristics. The load identification module 1204 selects 2304 a load prediction algorithm to determine if a particular type of electrical load is present at the premises. The comparison module 1206 applies 2306 the load prediction algorithm to the electrical energy usage record for the premises using the property characteristics for the premises for at least the comparison period to determine if the particular type of electrical load is present at the premises.

The accuracy module 1306 determines 2308 an accuracy of the load prediction algorithm in determining if the particular type of electrical load is present in the subset of simulations.

The adjustment module 1308 adjusts 2310 one or more of the algorithm parameters for the load prediction algorithm used by the comparison module 1206 in response to the determined accuracy, and the method 2300 ends.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a model creation module that creates an electrical usage model, the electrical usage model comprising an electrical device usage model for each electrical load assumed to be at simulated premises, the assumed electrical loads comprising an assumed load set, the simulated premises comprising characteristics from actual premises within an area serviced by an electric utility;
   a simulation module that simulates, using the electrical usage model, electrical usage at the simulated premises during a specified time period, the electrical usage model comprising a set of location-specific parameters for the simulated premises, wherein the simulation module simulates electrical usage for a plurality of simulated premises and for a plurality of assumed load sets for each simulated premises;
   a load prediction module that uses a load prediction algorithm to predict if a particular type of electrical load is present within each of a plurality of the simulated premises, the plurality of simulated premises comprising at least a subset of the simulated premises used for simulations by the simulation module, each load prediction algorithm comprising one or more algorithm parameters;
   an accuracy module that determines an accuracy of the load prediction algorithm in predicting if the particular type of electrical load is present in the subset of simulations, wherein the accuracy module determines a percentage of times that the prediction module accurately predicts that the particular type of electrical load is present in the subset of simulations; and
   an adjustment module that adjusts one or more of the algorithm parameters for the load prediction algorithm used by the load prediction module in response to the determined accuracy, wherein the adjustment module dynamically adjusts one or more of the algorithm parameters for the load prediction algorithm to maximize the percentage of times that the prediction module accurately predicts that the particular type of electrical load is present in the subset of simulations;
   wherein at least a portion of the model creation model, the simulation module, the load prediction module, the accuracy module, and the adjustment module comprise one of hardware, hardware and executable code, and one or more non-transitory, tangible computer readable storage medium storing executable code.

2. The apparatus of claim 1, wherein the simulated electrical usage model comprises electrical usage data for a plurality of time periods for each day within the specified time period.

3. The apparatus of claim 1, wherein the set of location-specific parameters are derived from one or more of:
   physical characteristics from the actual premises within the area served by the electrical utility;
   environmental variations for the actual premises within the specified time period;
   assumed electrical usage by one or more assumed users of actual electrical equipment corresponding to the electrical equipment of the assumed load set; and
   time of day variations in actual electrical usage of the electrical equipment of the assumed load set for days within the specified time period.

4. The apparatus of claim 1, wherein the electrical device usage model for each electrical load assumed to be at the simulated premises comprises a time-based projected electrical usage of an electrical device at the simulated premises.

5. The apparatus of claim 4, wherein the time-based projected electrical usage of the electrical device includes at least one of a time of use of the electrical device and an amplitude of the electrical usage of the electrical device.

6. The apparatus of claim 1, wherein the accuracy module determines the accuracy of the load prediction algorithm by comparing a particular type of electrical load predicted to be at a plurality of simulated premises with load sets used in simulating the electrical usages for the plurality of simulated premises to determine a percentage of times that the load prediction module accurately predicts that the particular type of electrical load is present in the plurality of simulated premises.

7. The apparatus of claim 1, wherein the adjustment module adjusts one or more of the algorithm parameters to optimize the accuracy, determined by the accuracy module, of the load prediction module in predicting if the particular type of electrical load is present in the particular simulated premises, wherein the adjustment module adjusts the one or more algorithm parameters in a manner selected from one or more of:
   adjusting one or more of the algorithm parameters for a particular type of electrical load in the load set while holding the algorithm parameters for other types of electrical loads in the load set constant;
   adjusting one or more of the algorithm parameters for a plurality of types of electrical loads in the load set; and
   adjusting one or more of the algorithm parameters for a first type of electrical load in the load set and iterating through adjusting one or more of the algorithm parameters for additional types of electrical loads present in the load set and then repeating adjusting the one or more of the algorithm parameters for at least one electrical load in the load set.

8. The apparatus of claim 1, wherein the one or more algorithm parameters of the load prediction algorithm comprises one or more of:
   an amplitude of electrical usage for the particular type of electrical load;
   a frequency of the electrical usage for the particular type of electrical load;
   a time of day of the electrical usage for the particular type of electrical load;
   a duration of electrical usage for the particular type of electrical load;
   a temperature dependent electrical usage for the particular type of electrical load; and
   a lifestyle dependent electrical usage pattern for the particular type of electrical load.

9. The apparatus of claim 1, wherein the particular type of electrical load comprises a load for an air conditioning unit and wherein the load prediction algorithm for the air conditioning unit comprises:
   defining criteria for a hot weather day during the specified time period;

defining criteria for a neutral weather day during the specified time period;

comparing a simulated electrical usage for the simulated premises for at least a portion of the hot weather days with a simulated electrical usage for at least a portion of the neutral weather days; and determining that the simulated premises includes the air conditioning unit in response to determining that the simulated electrical usages for the at least a portion of the hot weather days is greater than the simulated electrical usages for the at least a portion of neutral weather days.

10. The apparatus of claim 1, wherein the particular type of electrical load comprises a load for an electric heating unit and wherein the load prediction algorithm for the electric heating unit comprises:

defining criteria for a cold weather day during specified hours of a day in the specified time period;

calculating a variation in a distribution of simulated electrical usages during the specified hours of the day for a plurality of cold weather days; and determining that the simulated premises includes the electric heating unit in response to determining that the variation in the distribution of simulated electrical usages during the specified hours of the day for the plurality of cold weather days is greater than a specified threshold.

11. The apparatus of claim 1, wherein the particular type of electrical load comprises a load for a timed electrical device and wherein the load prediction algorithm for the timed electrical device comprises:

identifying a rise in a simulated hourly electrical usage at a simulated premises having an magnitude greater than a specified threshold;

identifying a drop in the simulated hourly electrical usage at the simulated premises having a magnitude greater than the specified threshold; and determining that the simulated premises includes the timed electrical device in response to determining that the rise in the simulated hourly electrical usage at the simulated premises having a magnitude greater than the specified threshold occurs at approximately a same starting time in a threshold number of consecutive days during the specified time period and the drop in the simulated hourly electrical usage at the premises having a magnitude greater than the specified threshold occurs at approximately a same finishing time in the threshold number of consecutive days during the specified time period.

12. The apparatus of claim 11, wherein the timed electrical device comprises one of pool pumping equipment and timed lighting.

13. The apparatus of claim 1, wherein the particular type of electrical load comprises a load for an electric water heater and wherein the load prediction algorithm for the electric water heater comprises:

identifying a rise in a simulated hourly electrical usage at a simulated premises having a magnitude greater than a specified threshold;

identifying a drop in the simulated hourly electrical usage at the simulated premises having a magnitude greater than the specified threshold; and determining that the simulated premises includes the electric water heater in response to determining that the rise in the simulated hourly electrical usage at the simulated premises having a magnitude greater than the specified threshold and the drop in the simulated hourly electrical usage at the simulated premises having a magnitude greater than the specified threshold occurs within an expected usage time for a water heater and occurs during a specified time period in a specified percentage of a number of days during the specified time period.

14. The apparatus of claim 1, wherein the particular type of electrical load comprises a load for an electric car charging station and wherein the load prediction algorithm for the electric car charging station comprises:

identifying a rise in a simulated hourly electrical usage at a simulated premises having a magnitude greater than a specified threshold;

identifying a drop in the simulated hourly electrical usage at the simulated premises having a magnitude greater than the specified threshold; and determining that the simulated premises includes the electric car charging station in response to determining that the rise in the simulated hourly electrical usage at the simulated premises having a magnitude greater than the specified threshold and the drop in the simulated hourly electrical usage at the simulated premises having a magnitude greater than the specified threshold occurs within an expected usage time for an electric car charging station and occurs during a specified time period in a specified percentage of a number of days during the specified time period.

15. The apparatus of claim 1, wherein the particular type of electrical load comprises a load for an electric clothes dryer and wherein the load prediction algorithm for an electric clothes dryer comprises:

identifying a rise in a simulated hourly electrical usage at a simulated premises having a magnitude greater than a specified threshold;

identifying a drop in the simulated hourly electrical usage at the simulated premises having a magnitude greater than the specified threshold; and determining that the simulated premises includes the electric water heater in response to determining that the rise in the simulated hourly electrical usage at the simulated premises having a magnitude greater than the specified threshold and the drop in the simulated hourly electrical usage at the simulated premises having a magnitude greater than the specified threshold occurs within an expected usage time for an electric clothes dryer and occur during a specified time period in a specified percentage of a number of days during the specified time period.

16. The apparatus of claim 1, wherein the particular type of electrical load comprises electrical usage for a vacation day taken by one or more users of the simulated premises and wherein the load prediction algorithm for the vacation day comprises:

identifying a plurality of first pass vacation days as days within specified time period having daily simulated electrical usage ranges at the simulated premises that are in a lowest specified percent of all daily simulated electrical usage ranges for days within the specified time period, a daily simulated electrical usage range comprising a difference between a maximum simulated electrical usage for a day and a minimum simulated electrical usage for the day;

identifying a plurality of second pass vacation days as first pass vacation days that are consecutive;

identifying a plurality of third pass vacation days as second pass vacation days that have patterns of hourly simulated electrical usage throughout a day that are substantially similar; and determining that a particular day comprises a vacation day in response to determining that the particular day comprises the third pass vacation day.

17. The apparatus of claim 1, wherein the particular type of electrical load comprises a use of the simulated premises as a primary premises and wherein the load prediction algorithm for the use of the simulated premises as a primary premises comprises:
   identifying one or more vacation days taken by one or more users of the simulated premises; and
   determining that the simulated premises is a primary premises if a number of the one or more vacation days taken by the one or more users of the simulated premises is less than a specified threshold.

18. The apparatus of claim 1, wherein the particular type of electrical load comprises a use of the simulated premises as a vacation premises and wherein the load prediction algorithm for the use of the simulated premises as a vacation premises comprises:
   identifying one or more vacation days taken by one or more users of the simulated premises; and
   determining that the simulated premises is a vacation premises if a number of the one or more vacation days taken by the one or more users of the simulated premises is greater than a specified threshold.

19. The apparatus of claim 1, wherein the particular type of electrical load comprises a use of the simulated premises by one or more school-aged children and wherein the load prediction algorithm for the use of the simulated premises by one or more school-aged children comprises:
   calculating a first average daily electrical usage for a specified range of time during days that include a specified percentage of non-school days;
   calculating a second average daily electrical usage for a specified range of time that include a specified percentage of school days; and
   determining that the simulated premises is used by one or more school-aged child in response to determining that the first average is greater than the second average by a specified amount.

20. The apparatus of claim 1, wherein the particular type of electrical load comprises a use of the simulated premises by one or more adults during weekday daytime hours and wherein the load prediction algorithm for the use of the simulated premises by one or more adults during weekday daytime hours comprises:
   calculating a first average daily electrical usage for a specified range of time during days that include a specified percentage of non-work days;
   calculating a second average daily electrical usage for a specified range of time that include a specified percentage of work days; and
   determining that the simulated premises is used by one or more adults during weekday daytime hours in response to determining that the first average is greater than the second average by a specified amount.

21. The apparatus of claim 1, wherein the load prediction module predicting if the particular type of electrical load is present further comprises the load prediction module determining whether a variation in an average of the electrical usage during the specified hours is greater than a specified threshold, and wherein, in response to the variation being less than the specified threshold, predicting that the particular type of electrical load is not present.

22. A computer program product comprising a non-transitory, tangible computer readable storage medium having computer usable program code executable to perform operations for electrical load and lifestyle characterization, the operations of the computer program product comprising:
   creating an electrical usage model, the electrical usage model comprising an electrical device usage model for each electrical load assumed to be at simulated premises, the assumed electrical loads comprising an assumed load set, the simulated premises comprising characteristics from actual premises within an area serviced by an electric utility;
   simulating, using the electrical usage model, electrical usage at the simulated premises during a specified time period, the electrical usage model comprising a set of location-specific parameters for the simulated premises, wherein the electrical usage is simulated for a plurality of simulated premises and for a plurality of assumed load sets for each simulated premises;
   predicting if a particular type of electrical load is present within each of a plurality of the simulated premises using a load prediction algorithm, the plurality of simulated premises comprising at least a subset of the simulated premises used for the simulated electrical usage, each load prediction algorithm comprising one or more algorithm parameters, wherein predicting if the particular type of electrical load is present further comprises determining whether a variation in an average of the electrical usage during the specified hours is greater than a specified threshold, and wherein, in response to the variation being less than the specified threshold, predicting that the particular type of electrical load is not present;
   determining an accuracy of the load prediction algorithm in determining if the particular type of electrical load is present in the subset of simulations; and
   adjusting one or more of the algorithm parameters for the load prediction algorithm in response to the determined accuracy.

23. The computer program product of claim 22, wherein the operations of the computer program product further comprise adjusting one or more of the algorithm parameters for the load prediction algorithm to maximize a number of times that the load prediction algorithm accurately determines that the particular type of electrical load is present in the subset of simulations.

24. The computer program product of claim 22, wherein the operations of the computer program product further comprises determining a percentage of times that the particular type of electrical load is accurately predicted to be present in the subset of simulations and dynamically adjusting the one or more of the algorithm parameters for the load prediction algorithm to maximize the percentage of times that the particular type of electrical load is predicted to be present in the subset of simulations.

25. A computer implemented method comprising:
   creating an electrical usage model, the electrical usage model comprising an electrical device usage model for each electrical load assumed to be at simulated premises, the assumed electrical loads comprising an assumed load set, the simulated premises comprising characteristics from actual premises within an area serviced by an electric utility;
   simulating, using the electrical usage model, electrical usage at the simulated premises during a specified time period, the electrical usage model comprising a set of location-specific parameters for the simulated premises, wherein the electrical usage is simulated for a plurality of simulated premises and for a plurality of assumed load sets for each simulated premises;

predicting if a particular type of electrical load is present within each of a plurality of the simulated premises using a load prediction algorithm, the plurality of simulated premises comprising at least a subset of the simulated premises used for the simulated electrical usage, each load prediction algorithm comprising one or more algorithm parameters, wherein predicting if the particular type of electrical load is present further comprises determining whether a variation in an average of the electrical usage during the specified hours is greater than a specified threshold, and wherein, in response to the variation being less than the specified threshold, predicting that the particular type of electrical load is not present;

determining an accuracy of the load prediction algorithm in determining if the particular type of electrical load is present in the subset of simulations, wherein determining the accuracy of the load prediction algorithm further comprises determining a percentage of times that the particular type of electrical load is accurately predicted to be present in the subset of simulations; and adjusting one or more of the algorithm parameters for the load prediction algorithm in response to the determined accuracy, wherein adjusting the one or more of the algorithm parameters further comprises dynamically adjusting the one or more of the algorithm parameters for the load prediction algorithm to maximize the percentage of times that the particular type of electrical load is predicted to be present in the subset of simulations.

26. The computer implemented method of claim 25, further comprising adjusting one or more of the algorithm parameters for the load prediction algorithm to maximize a number of times that the load prediction algorithm accurately predicts that the particular type of electrical load is present in the subset of simulations.

* * * * *

UNITED STATES PATENT AND TRADEMARK OFFICE
CERTIFICATE OF CORRECTION

| | | |
|---|---|---|
| PATENT NO. | : 9,081,374 B2 | Page 1 of 1 |
| APPLICATION NO. | : 13/418308 | |
| DATED | : July 14, 2015 | |
| INVENTOR(S) | : Michael A. Madrazo | |

It is certified that error appears in the above-identified patent and that said Letters Patent is hereby corrected as shown below:

Title Page

"(73) Assignee: Decteotent Inc., Escondido, CA (US)"

---should read,

"(73) Assignee: Dectectent Inc., Escondido, CA (US)"

Signed and Sealed this
Ninth Day of February, 2016

Michelle K. Lee
*Director of the United States Patent and Trademark Office*